United States Patent
Yamauchi et al.

(10) Patent No.: US 7,392,362 B2
(45) Date of Patent: Jun. 24, 2008

(54) SYSTEM AND METHOD FOR VOLUME MANAGEMENT

(75) Inventors: Hirokazu Yamauchi, Yokohama (JP); Kenji Baba, Ebina (JP)

(73) Assignee: Hitachi, Ltd., Tokyo (JP)

( * ) Notice: Subject to any disclaimer, the term of this patent is extended or adjusted under 35 U.S.C. 154(b) by 275 days.

(21) Appl. No.: 11/197,472

(22) Filed: Aug. 5, 2005

(65) Prior Publication Data

US 2006/0282637 A1 Dec. 14, 2006

(30) Foreign Application Priority Data

Jun. 8, 2005 (JP) .............................. 2005-167866

(51) Int. Cl.
*G06F 12/00* (2006.01)
(52) U.S. Cl. .................... 711/170; 711/4; 711/100; 711/114; 711/161; 711/162; 711/169; 711/171; 707/204; 707/205; 714/5; 714/6
(58) Field of Classification Search ......... 711/170–171, 711/161–162, 4, 100, 112–114; 714/5–6; 707/204–205
See application file for complete search history.

(56) References Cited

U.S. PATENT DOCUMENTS 5,737,743 A * 4/1998 Ooe et al. ................... 711/112
6,078,990 A * 6/2000 Frazier ....................... 711/114
2004/0039891 A1* 2/2004 Leung et al. ................ 711/165
2005/0015475 A1* 1/2005 Fujita et al. ................. 709/223
2005/0015547 A1* 1/2005 Yokohata et al. ............ 711/114

FOREIGN PATENT DOCUMENTS

JP    2003-337721    11/2003
JP    2004-334561    11/2004

* cited by examiner

*Primary Examiner*—Sanjiv Shah
*Assistant Examiner*—Zhuo H Li
(74) *Attorney, Agent, or Firm*—Antonelli, Terry, Stout & Kraus, LLP.

(57) ABSTRACT

A volume management system includes a management server which includes a memory and a processor, the memory stores an area level indicative of released or unreleased, a priority level indicative of a priority for establishing a redundancy, a use status indicative of used or unused, and a state indicative of presence or absence of redundancies, for each of logic areas of a storage device. When there is a logic area whose capacity is insufficient among the logic areas of the storage, the arrangement performs a number of operations to allocate capacities of other logic areas to a logic area whose capacity is insufficient.

11 Claims, 62 Drawing Sheets

FIG. 5

Master Table

System Information

| System Level | Setting Level | Upper-Limit Level | Operation Type | User Setting |
|---|---|---|---|---|
| 3 | 2 | 8 | Write | Completed |

Logic Area Information

| Logic Area Name | Area Level | State of Logic Area | Activity Ratio | Threshold of Activity Ratio | Capacity of Logic Area |
|---|---|---|---|---|---|
| unit0 | 0 | Unmirrored | 0% | 99% | 30GB |
| unit1 | 3 | Unmirrored | 40% | 90% | 10GB |
| unit2 | 8 | Mirrored | 60% | 70% | 5GB |
| unit3 | 5 | Mirrored | 80% | 99% | 25GB |
| unit4 | 2 | Broken | 95% | 99% | 25GB |

Disk Information

| Disk Number | Disk Capacity | Start Time of Use | Endurance Time | Use Time |
|---|---|---|---|---|
| Disk1 | 5GB | 2005/01/01 | 20000 Hours | 600 Hours |
| Disk2 | 5GB | 2005/01/01 | 20000 Hours | 600 Hours |
| Disk3 | 55GB | 2005/01/01 | 20000 Hours | 600 Hours |
| Disk4 | 5GB | 2003/01/01 | 20000 Hours | 18120 Hours |
| Disk5 | 50GB | 2003/01/01 | 20000 Hours | 18120 Hours |
| Disk6 | 20GB | 2000/01/01 | 20000 Hours | 43800 Hours |
| Disk7 | 10GB | 2005/02/01 | 20000 Hours | 0 Hours |

FIG. 6

Master Table
Corresponding Block Information

| Logic Area Name | Logic Block Number | Use Status | Information of Corresponding Physical Block | | |
|---|---|---|---|---|---|
| | | | Disk Number | Physical Block Number | Mark |
| unit1 | Block 1 | Use | Disk 1 | Block 1 | Available |
| | | | : | : | : |
| | | | Disk 4 | Block 1 | Available |
| unit1 | Block 2 | Use | Disk 1 | Block 2 | |
| | | | : | : | : |
| | | | Disk 4 | Block 2 | Unavailable |
| : | : | : | : | : | : |
| unit2 | Block 1 | Use | Disk 3 | Block 1 | Available |
| : | : | : | : | : | : |
| unit3 | Block 1 | Use | Disk 3 | Block 501 | Available |
| unit3 | Block 2 | Unuse | Disk 3 | Block 502 | Available |
| : | : | : | : | : | : |
| unit0 | Block 1 | Unuse | Disk 6 | Block 1 | Available |
| : | : | : | : | : | : |

Information of Change in Activity Ratio

| Logic Area Name | Present | Last | Last But One | ... |
|---|---|---|---|---|
| unit1 | 40% | 35% | 40% | ... |
| unit2 | 60% | 45% | 70% | ... |
| unit3 | 80% | 45% | 70% | ... |
| unit4 | 95% | 70% | 50% | ... |

FIG. 7

User Setting Table
User Logic Area Information

| Logic Area Name | Area Level | Threshold | Capacity of Logic Area |
|---|---|---|---|
| unit0 | 0 | 99% | 30GB |
| unit1 | 3 | 90% | 10GB |
| unit2 | 8 | 70% | 5GB |
| unit3 | 5 | 99% | 25GB |
| unit4 | 2 | 99% | 25GB |

User Disk Information

| Disk Number | Endurance Time |
|---|---|
| Disk1 | 20000 Hours |
| Disk2 | 20000 Hours |
| Disk3 | 20000 Hours |
| Disk4 | 20000 Hours |
| Disk5 | 20000 Hours |
| Disk6 | 20000 Hours |
| Disk7 | 25000 Hours |

Acquiring Period Information

| | |
|---|---|
| Interval of Periodical Signal | One Hour |
| Number of Times to Log Information of Change in Activity Ratio | 20 Times |

FIG. 8

Write Area Table

| Write/Read | Logic Area Name | Data Name | Size |
|---|---|---|---|
| Write | unit4 | Data A | 8MB |
| Delete | unit2 | Data B | |

Write Location Table

| Write/Read | Data Name | Logic Area Name | Logic Block Number |
|---|---|---|---|
| Write | Data A | unit1 | Block 1 |
| | | unit1 | Block 2 |
| | | unit2 | Block 3 |

Data Corresponding Table

| Data Name | Logic Area Name | Logic Block Number |
|---|---|---|
| Data A | unit1 | Block 1 |
| | unit1 | Block 2 |
| | unit1 | Block 3 |
| Data B | unit1 | Block 8 |
| | unit1 | Block 10 |
| | unit1 | Block 11 |
| Data C | unit2 | Block 1 |
| | unit2 | Block 2 |
| : | : | : |

Mirror Table

| Mirror Source Disk Number | Mirror Source Physical Block Number | Mirror Destination Disk Number | Mirror Destination Physical Block Number |
|---|---|---|---|
| Disk1 | Block 100 | Disk6 | Block 1 |
| Disk1 | Block 101 | Disk6 | Block 2 |
| Disk2 | Block 100 | Disk6 | Block 3 |
| Disk2 | Block 101 | Disk6 | Block 4 |

Disk Information Table

| Disk Number | Disk Capacity | Start Time of Use |
|---|---|---|
| Disk1 | 5GB | 2005/01/01 |
| Disk2 | 5GB | 2005/01/01 |
| : | : | : |
| Disk6 | 20GB | 2000/01/01 |
| Disk7 | 10GB | 2005/02/01 |

Access Location Table

| Disk Number | Physical Block Number |
|---|---|
| Disk4 | Block 1 |
| Disk4 | Block 2 |
| : | : |

Configuration Information Table

| Disk Number | Physical Block Number | Logic Area Name | Logic Block Number |
|---|---|---|---|
| Disk1 | Block 1 | unit1 | Block 1 |
| : | : | : | : |
| Disk3 | Block 1 | unit2 | Block 1 |
| : | : | : | : |
| Disk3 | Block 501 | unit3 | Block 1 |
| Disk3 | Block 502 | unit3 | Block 2 |
| : | : | : | : |
| Disk3 | Block 3001 | unit4 | Block 1 |
| : | : | : | : |
| Disk6 | Block 1 | unit0 | Block 1 |
| : | : | : | : |

FIG. 51 Specific Operations for Avoiding Capacity Shortage
Case 1 in Using Capacity of Unit0

Specific Operations for Avoiding Capacity Shortage
Case 2 in Using Unused Capacities Specific Operations of Redundancy Case 1 in Recovery of Redundancy FIG. 55 Specific Operations of Redundancy — Case 2 in Release of Redundancy FIG. 56 Specific Operations Regarding Endurance Time And Redundancy

FIG. 58

File System Request Table

| Request | Extension |
|---|---|
| Used Logic Area Name | unit1 |
| Size of File System | 10GB |
| Start Logic Block | Block 1 |
| End Logic Block | Block 100 |
| Requested Capacity for Change | 5GB |

FIG. 59

File System Registration Table

| Used Logic Area Name | Size of File System | Start Logic Block | End Logic Block |
|---|---|---|---|
| unit1 | 10GB | Block 1 | Block 100 |
| unit2 | 5GB | Block 1 | Block 50 |
| unit3 | 15GB | Block 1 | Block 150 |

SYSTEM AND METHOD FOR VOLUME MANAGEMENT

CROSS REFERENCE TO RELATED APPLICATIONS

This application claims the foreign priority benefit under Title 35, United States Code, §119(a)-(d) of Japanese Patent Application No. 2005-167866, filed on Jun. 8, 2005 in the Japan Patent Office, the disclosure of which is herein incorporated by reference in its entirety.

BACKGROUND OF THE INVENTION

1. Field of the Invention

The present invention relates to a volume management system which provides an automatic configuration change of storage areas and the method thereof 2. Description of the Related Art In general, where a user who is not aware of capacity shortage of a storage device writes in the storage device short in capacity, data inconsistency and process halt can occur. Therefore, it is necessary to constantly supervise the capacity of storage areas in a storage device and add or extend storage areas when necessary so as to prevent capacity shortage. In order to judge capacity shortage and respond to an abrupt capacity change in storage area, a system is employed which dynamically supervises possible capacity shortage and extends a storage area. In extending the storage area, it is necessary to allocate the previously prepared capacity.

In conventional methods, a timing for changing configurations such as extension of storage areas is decided according to the schedule decided by a user (for example, Patent Document 1) and the timing is decided where physical configurations are changed (for example, Patent Document 2).

The prior art described above is disclosed in Japanese Patent Publications JP 2003-337721A and JP 2004-334561A.

SUMMARY OF THE INVENTION

However, the following disadvantages have been found in the Patent Documents 1 and 2. That is, when a storage device short in capacity is subjected to be written in and a user is not aware of the fact, the writing is executed in such state, thereby making it impossible to obtain consistent data and attain a smooth process. Therefore, it was required to constantly supervise possible capacity shortage of a storage area and add or extend the storage area, whenever necessary.

Further, where a necessary capacity is not allocated in advance on addition or extension of the capacity, a user needs to obtain the capacity necessary for such addition or extension from other storage areas on his or her decision. Therefore, the process may not go smoothly unless the user is aware of the necessary capacity. Under these circumstances, it was necessary to automatically execute all processes such as supervision, change and judgment on the storage capacity, thereby decreasing the burden of a user and preventing problems resulting from the capacity shortage.

Therefore, the present invention has been made for preventing these disadvantages, with an object of providing an automatic configuration change of storage areas and executing a smooth process so as to avoid a shortage of storage capacity.

In order to solve the above problem, the present invention is provided with a storage device having a plurality of logic area capacities, a computer making a processing request to the storage device and a management server communicating between the storage device and the computer. The management server is provided with a memory and a processor, and the memory stores a use status which indicates a used or unused status, with regard to the logic area in the storage device. With reference to the use status of the memory, the processor of the management server determines availability of any other logic areas which indicate the unused status, among logic areas in the storage device, when the logic area of the storage device is short in capacity, and allocates the other capacity of logic area to a logic area short in capacity, if the other logic areas which indicate the unused status are available.

In one aspect of the present invention, there is provided a volume management system including a storage device which has a plurality of logic areas, a computer which requests processes to the storage device, and a management server which communicates with the storage device and the computer. In the volume management system, the management server includes a memory and a processor. The memory stores an area level indicative of released or unreleased, a priority level indicative of a priority for establishing a redundancy, a use status indicative of used or unused, and a state indicative of presence or absence of redundancies, for each of the logic areas of the storage device. When there is a logic area whose capacity is insufficient among the logic areas of the storage, the processor of the management server determines availability of one or more released logic areas among the other logic areas of the storage device by referring to the area levels in the memory. When there are the one or more released logic areas, the processor allocates capacities of the one or more released logic areas to the logic area whose capacity is insufficient. When there are not enough capacities of the one or more released logic areas, the processor determines availability of one or more other unused logic areas by referring to the use statuses in the memory, when there are the one or more other unused logic areas, the processor allocates unused capacities of each logic area to the logic area whose capacity is insufficient. When there are not enough unused capacities of each logic area, the processor specifies one or more other logic areas whose priority levels are below a predetermined upper-limit level of the priority level by referring to the priority levels and the states indicative of presence or absence of redundancies in the memory, releases redundancies of the one or more other logic areas whose priority levels are below the predetermined upper-limit level of the priority level, and allocates released capacities of the one or more other logic areas whose priority levels are below the predetermined upper-limit level of the priority level, to the logic area whose capacity is insufficient.

In another aspect of the invention, there is provided a volume management system including a storage device which has a plurality of logic areas, a computer which requests processes to the storage device, and a management server which communicates with the storage device and the computer. In the volume management system, the management server includes a memory and a processor. The memory stores an area level indicative of released or unreleased, a priority level indicative of a priority for establishing a redundancy, a use status indicative of used or unused, and a state indicative of presence or absence of redundancies, for each of the logic areas of the storage device. When there is a logic area whose capacity is insufficient among the logic areas of the storage device, the processor of the management server determines availability of one or more other unused logic areas by referring to the use statuses in the memory. When there are the one or more other unused logic areas, the processor allocates unused capacities of each logic area to the logic area whose capacity is insufficient.

In the volume management system according to the invention, the memory may store a use status for each of predetermined blocks of each of the logic areas. The processor of the management server may allocate unused capacities of one or more unused blocks of each logic area, by referring to the use statuses stored in the memory.

The memory further may store an activity ratio indicative of a ratio of a used capacity to a whole capacity of each of the logic areas. The processor of the management server may determine whether a logic area has unused capacities based on the activity ratio of the logic area stored in the memory.

The processor of the management server may calculate an unused capacity of each logic area based on the activity ratio of the logic area stored in the memory, and allocate the unused capacity to the logic area whose capacity is insufficient.

The memory further may store a threshold of the activity ratio for each of the logic areas of the storage device. The processor of the management server may allocate an unused capacity of each logic area within capacity not beyond the threshold of the activity ratio in the memory, to the logic area whose capacity is insufficient.

The activity ratio may be stored in the memory for a predetermined number of times as a history of the activity ratio, for each of the logic areas of the storage device. The processor of the management server may estimate a necessary capacity of the logic area whose capacity is insufficient, based on change of the activity ratio indicated by the history of the activity ratio stored in the memory. The processor may allocate the estimated capacity to the logic area whose capacity is insufficient.

The activity ratio may be periodically calculated and stored at predetermined intervals as the history of the activity ratio in the memory.

The memory may further store a state indicative of presence or absence of redundancies, for each of the logic areas of the storage device. The processor of the management server may calculate an unused capacity of each logic area based on an overlapping multiplicity of redundancy by referring to the state indicative of presence or absence of redundancies of the logic area in the memory.

In an additional aspect of the present invention, there is provided a volume management system including a storage device which has a plurality of logic areas, a computer which requests processes to the storage device, and a management server which communicates with the storage device and the computer. In the volume management system, the management server includes a memory and a processor. The memory stores an upper-limit level of a priority level indicative of a priority for establishing a redundancy, and a state indicative of presence or absence of redundancies for each of the logic areas of the storage device. When there is a logic area whose capacity is insufficient among the logic areas of the storage device, the processor of the management server specifies one or more other logic areas whose priority levels are below a predetermined upper-limit level of the priority level by referring to the priority levels and the states indicative of presence or absence of redundancies in the memory, releases redundancies of the one or more other logic areas whose priority levels are below the predetermined upper-limit level of the priority level, and allocates released capacities of the one or more other logic areas whose priority levels are below the predetermined upper-limit level of the priority level, to the logic area whose capacity is insufficient.

In another aspect of the invention, there is provided a volume management system including a storage device which has a plurality of logic areas consists of one or more physical disks, a computer which requests processes to the storage device, and a management server which communicates with the storage device and the computer. In the volume management system, the management server comprises a memory and a processor. The memory stores a lifetime for each of the physical disks and an upper-limit level of a priority level indicative of priority for establishing a redundancy. The processor of the management server establishes redundancies for one or more logic areas whose priority levels are below the upper-limit level and which correspond to a physical disk which has been used for time exceeding the lifetime. The processor allocates capacities of the one or more logic areas for which redundancies are established, to logic areas which correspond to a physical disk which has been used for time not exceeding the lifetime, after the physical disk which has been used for time exceeding the lifetime is removed.

In a further aspect of the invention, there is provided a volume management method for use in a computer system including a storage device which has a plurality of logic areas, a computer which requests processes to the storage device, and a management server which communicates with the storage device and the computer. In the volume management method, the management server comprises a memory and a processor. The memory storing an area level indicative of released or unreleased, a priority level indicative of a priority for establishing a redundancy, a use status indicative of used or unused, and a state indicative of presence or absence of redundancies, for each of the logic areas of the storage device. When there is a logic area whose capacity is insufficient among the logic areas of the storage, determining availability of one or more other unused logic areas by referring to the use statuses in the memory. When there are the one or more other unused logic areas, allocating unused capacities of each logic area to the logic area whose capacity is insufficient.

The volume management method according to the invention may further include allocating unused capacities of one or more unused blocks of each of logic area, by referring to use statuses stored for each of predetermined blocks of each of the logic areas in the memory.

The volume management method may further include determining whether a logic area has unused capacities based on an activity ratio indicative of a ratio of a used capacity to a whole capacity of each of logic areas, stored for each of the logic areas in the memory.

The volume management method may further include calculating an unused capacity of each logic area based on the activity ratio of the logic area stored in the memory, and allocating the unused capacity to the logic area whose capacity is insufficient.

The volume management method may further include allocating an unused capacity of each logic area within capacity not beyond a threshold of the activity ratio stored for each of the logic areas of the storage device in the memory, to the logic area whose capacity is insufficient.

The volume management method may further include estimating a necessary capacity of the logic area whose capacity is insufficient, based on change of the activity ratio indicated by a history of the activity ratio in which the activity ratio is stored for a predetermined number of times for each of the logic areas in the memory, and allocating the estimated capacity to the logic area whose capacity is insufficient.

The volume management method may further include when there is a logic area whose capacity is insufficient among the logic areas of the storage device, specifying one or more other logic areas whose priority levels are below a predetermined upper-limit level of the priority level by referring to an upper-limit level of the priority level indicative of the priority for establishing a redundancy and the states indicative of presence or absence of redundancies stored for each of the logic areas of the storage device in the memory, releasing redundancies of the one or more other logic areas whose priority levels are below the predetermined upper-limit level of the priority level, and allocating released capacities of the one or more other logic areas whose priority levels are below the predetermined upper-limit level of the priority level, to the logic area whose capacity is insufficient.

In the volume management method according to the invention, the logic areas may consist of one or more physical disks in the storage device. The volume management method may further include establishing redundancies for logic areas whose priority levels are below the upper-limit level and which correspond to a physical disk which has been used for time exceeding a lifetime stored for each of the physical disks in the memory, and allocating capacities of the logic areas for which redundancies are established, to logic areas which correspond to a physical disk which has been used for time not exceeding the lifetime, after the physical disk which has been used for time exceeding the lifetime is removed.

BRIEF DESCRIPTION OF THE DRAWINGS

FIG. 5 is a view showing the master table shown in FIG. 3.

FIG. 6 is a view showing another master table.

FIG. 7 is a view showing the user setting table shown in FIG. 3.

FIG. 8 is a view showing the write area table shown in FIG. 3.

FIG. 9 is a view showing the write location table shown in FIG. 3.

FIG. 10 is a view showing the data corresponding table shown in FIG. 3.

FIG. 11 is a view showing the mirror table shown in FIG. 3.

FIG. 12 is a view showing the disk information table shown in FIG. 4.

FIG. 13 is a view showing the access location table shown in FIG. 4.

FIG. 14 is a view showing the configuration information table shown in FIG. 4.

FIG. 58 is a view showing the file system request table shown in FIG. 57.

FIG. 59 is a view showing the file system registration table shown in FIG. 57.

DESCRIPTION OF THE PREFERRED EMBODIMENTS

Here will be described an embodiment of the present invention in detail, referring to drawings as needed.

Figure 1:
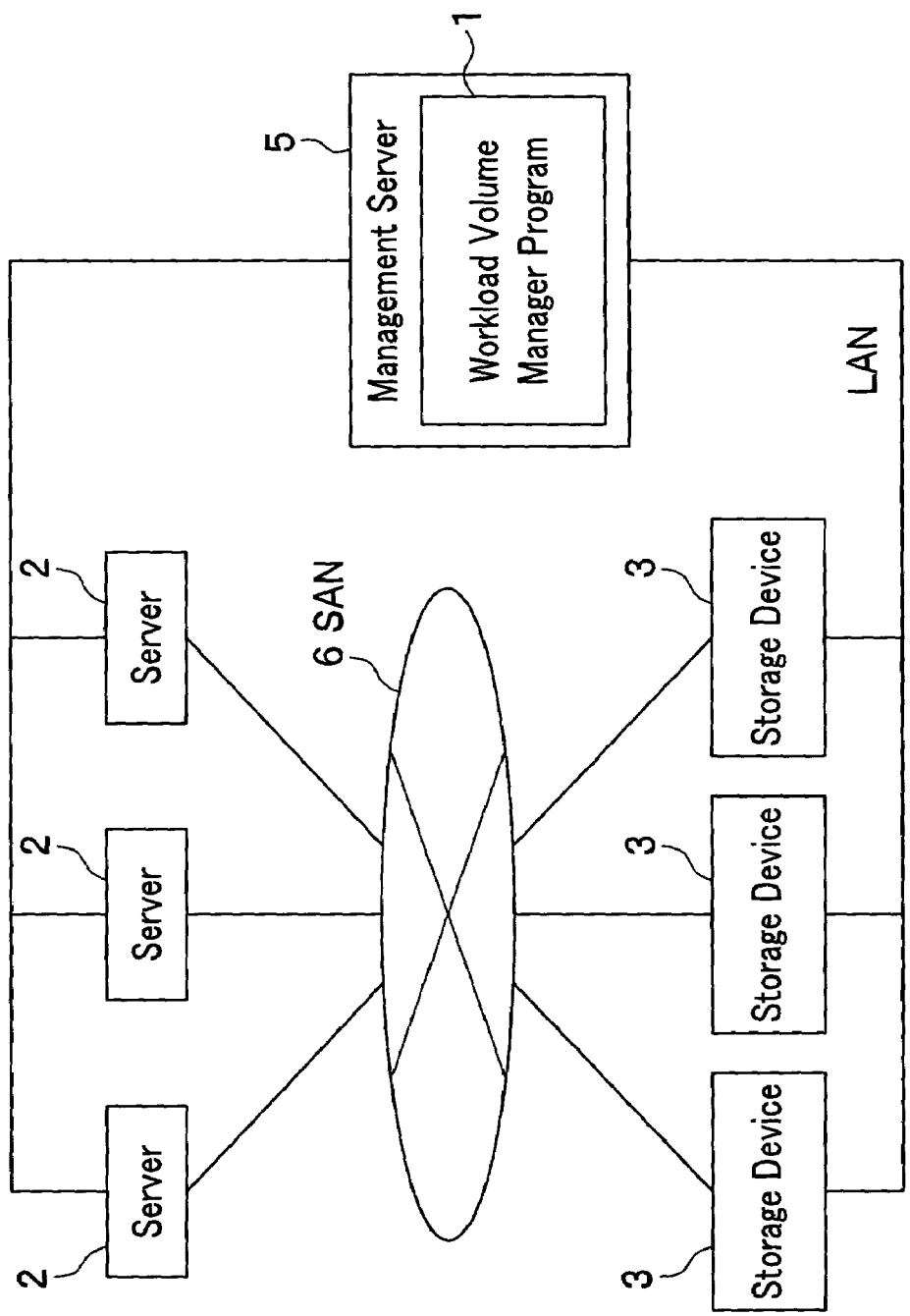
FIG. 1 is a view showing an overall configuration example of the volume management system in the embodiment of the present invention.

FIG. 1 is a block diagram showing an overall configuration example of the volume management system in an embodiment of the present invention.

As shown in FIG. 1, in the volume management system, a plurality of servers (alternatively referred to as computer) 2 are connected to a plurality of storage devices 3 via, SAN (Storage Area Network) 6, for example. These servers 2 and storage devices 3 are respectively connected to a management server 5 via LAN (Local Area Network), for example. The storage device 3 is provided with logic areas (storage areas) configured with a plurality of magnetic disks. The logic area means each area acquired by theoretically dividing RAID (Redundant Arrays of Independent Disks) groups formed of a plurality of disk devices, for example.

A work load volume manager program (hereinafter, simply referred to as "manager program") 1 is embedded in the management server 5, the details of which will be described later.

The configuration shown in FIG. 1 may be changed. For example, one unit of the servers 2 also may have a function of a management server 5 and the server 2 is connected to the storage device 3 via a common carrier leased line, thereby constituting a volume management system. Further, SAN or LAN is used for communication, however, for example, SCSI (Small Computer System Interface) and iSCSI (Internet Small Computer System Interface), and others may be used for communication.

Hereinafter, a detailed description will be made for the management server 5, server 2 and storage device 3 in this order.

(Configuration of Management Server)

Figure 2:
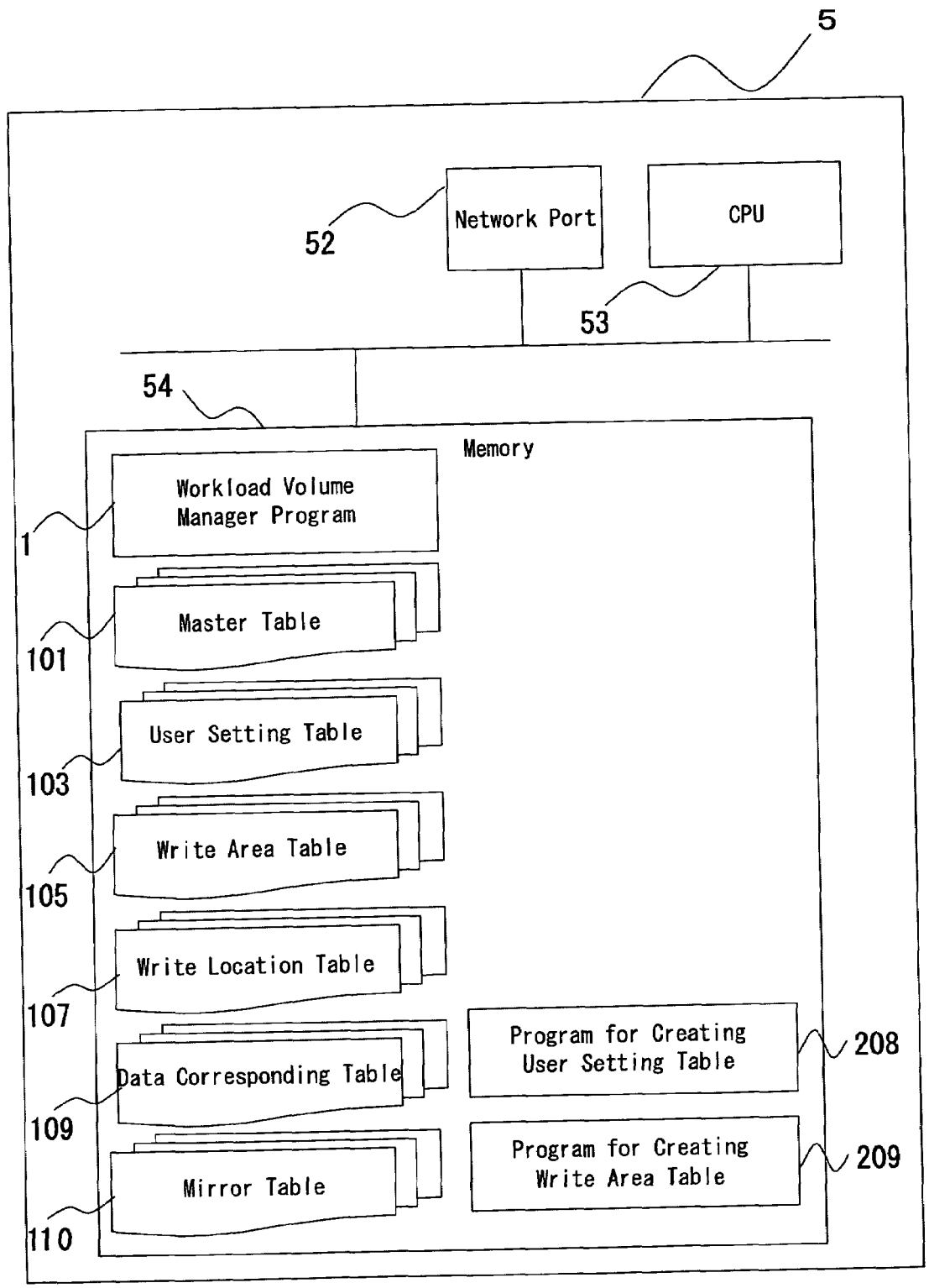
FIG. 2 is a view showing a configuration example of the management server shown in FIG. 1.

As shown in FIG. 2, the management server 5 is provided with a network port 52, a CPU 53 and a memory 54 and executes various programs stored in the memory 54 using the CPU 53.

The memory 54 stores a manager program 1, a program for creating user setting table 208 and a program for creating a write area table 209. The memory 54 also stores a master table 101, a user setting table 103, a write area table 105, a write location table 107, a data corresponding table 109 and a mirror table 110.

The master table 101 is a table for managing the configuration information of the storage device 3, having system information (refer to FIG. 5), logic area information (refer to FIG. 5), disk information (refer to FIG. 5), corresponding block information (refer to FIG. 6) and information of change in activity ratios (refer to FIG. 6).

As shown in FIG. 5, the system information contains information of the system level, setting level, upper-limit level, operation type and user setting.

The system level indicates a boundary value for dividing logic areas into redundant logic areas and non-redundant logic areas in the storage device 3. The logic area means a set of logic blocks which have a predetermined size. The system level is given as a numeric value (for example, 3) which indicates one level among a plurality of levels previously defined by a user (for example, 1 to 10). The level indicates a priority of redundancy and is also referred to as a priority level. Further, level 0 indicates a level of released logic areas (disk pool) which is a set of logic blocks not registered in the logic area, namely, a level of logic areas which are not used by any of the server 2. The higher the numeric values of system level, the more difficult to make the logic area redundant.

The setting level is given a numeric value which indicates a lower-limit of the system level and the upper-limit level is given a numeric value which indicates an upper-limit of the system level.

The operation type indicates a necessity for configuration change in relation to the logic area, for example, type of writing and others.

The user setting indicates a state of reflecting the contents of the user setting table 103 to be described later, for example, completion and others.

Further, only one type of the operation can be memorized in the item of the operation type in the master table 101. Therefore, when a new value is added to the operation type, a value of the previous operation type is overwritten.

As shown in FIG. 5, the logic area information contains information of a logic area name, an area level, a state of logic area, an activity ratio, a threshold of activity ratio, and a capacity of logic area.

The logic area name includes, for example, unit 0 and unit 1. The area level means a system level of the logic area. The state of logic area includes, for example, Unmirrored which indicates the absence of redundancy, Mirrored which indicates the presence of redundancy, and Broken.

The activity ratio means a ratio of actual use of the logic area to the capacity of logic area. The threshold of activity ratio is defined by a user in advance. The capacity of logic area includes, for example, 30 GB and 10 GB.

As shown in FIG. 5, the disk information contains information of the disk number, disk capacity, start time of use, endurance time (lifetime), and use time.

Figure 4:
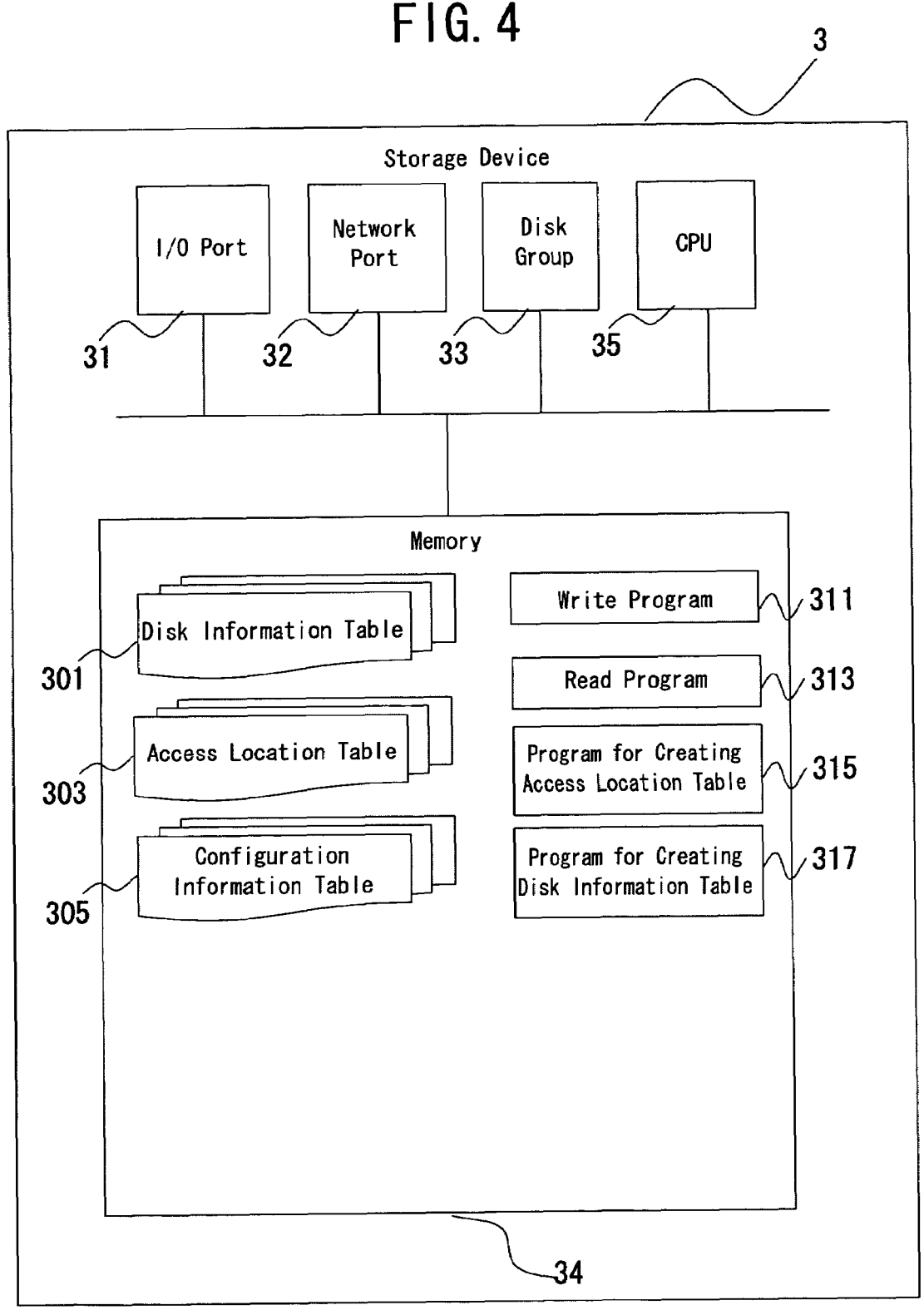
FIG. 4 is a view showing a configuration example of the storage device shown in FIG. 1.

The disk number is a number for specifying a disk contained in a disk group 33 (refer to FIG. 4). The disk capacity includes, for example, 5 GB and 50 GB.

The start time of use means a date of starting to use the disk, and the endurance time means an endurance time (lifetime) of the disk. The use time means an actual time of having used the disk.

As shown in FIG. 6, the corresponding block information contains information of the logic area name, logic block number, use status and corresponding physical block. Of the information, the logic area name is the same as the logic area name in FIG. 5.

The logic block number is a number for specifying a logic block, for example, block 1 and block 2. The use status includes Use indicating a used status and Unuse indicating an unused status.

The information of the corresponding physical block is information corresponding to the logic block, and consists of disk number (refer to FIG. 5), physical block number and mark. The physical block number is a number for specifying a physical block made of one or more of disks. In the present embodiment, the physical block is described as consistence in capacity with the logic block, but a capacity of a physical block may be different from that of a logic block.

The mark has two possible values, "Available" indicating availability of the physical disk and "Unavailable" indicating unavailability of the physical disk.

The information of change in activity ratios has the history of activity ratio in the capacity of the logic area (same as the activity ratio of logic area information shown in FIG. 5) for each logic area name. The number of rows in the history depends on the number specified as "Number of Times to Log Information of Change in Activity" (refer to FIG. 7) of the acquiring period information in the user setting table 103 to be described later.

As shown in FIG. 7, the user setting table 103 contains user logic area information, user disk information, and acquiring period information, which are values set by a user as criteria for changing the configuration of storage areas.

The user logic area information contains information of the logic area name, area level, threshold of activity ratio and capacity of logic area, similarly to the logic area information (refer to FIG. 5) in the master table 101.

The user disk information contains information of the disk number and endurance time (lifetime), similarly to the disk information (refer to FIG. 5) in the master table 101.

The acquiring period information contains information of intervals of periodical signals (for example, 1 hour) and the number of times to log the information of change in the activity ratio, that is, how many times the information of change in the activity ratio to be stored, (for example, 20 times).

As shown in FIG. 8, the write area table 105 contains information of Write/Delete indicating write or delete, logic area name to be written or deleted (for example, unit 4, etc.), data name (for example, data A, etc.) and data size (for example, 8 MB, etc.). The data size is registered only in the case of writing.

As shown in FIG. 9, the write location table 107 contains information of the Write/Read indicating write or read, data name to be written or read (for example, data A, etc.), logic area name to be written or read (for example, unit 1, etc.) and logic block number (for example, block 1, etc.).

As shown in FIG. 10, the data corresponding table 109 contains information of the data name, logic area name, and logic block number.

As shown in FIG. 11, the mirror table 110 contains information of the mirror source disk number (for example, Disk 1, etc.), mirror source physical block number (for example, block 100, etc.), mirror destination disk number (for example, Disk 6) and mirror destination physical block number (for example, block 1, etc.).

Next, a description will be made for functions for various programs, 208 and 209.

A program for creating a user setting table 208 has functions for updating a user setting table 103 according to a user's operation of an input device (mouse, etc.). Program for creating a write area table 209 creates a write area table 105 by which writing or deleting is requested by user operation.

(Server Configuration)

Figure 3:
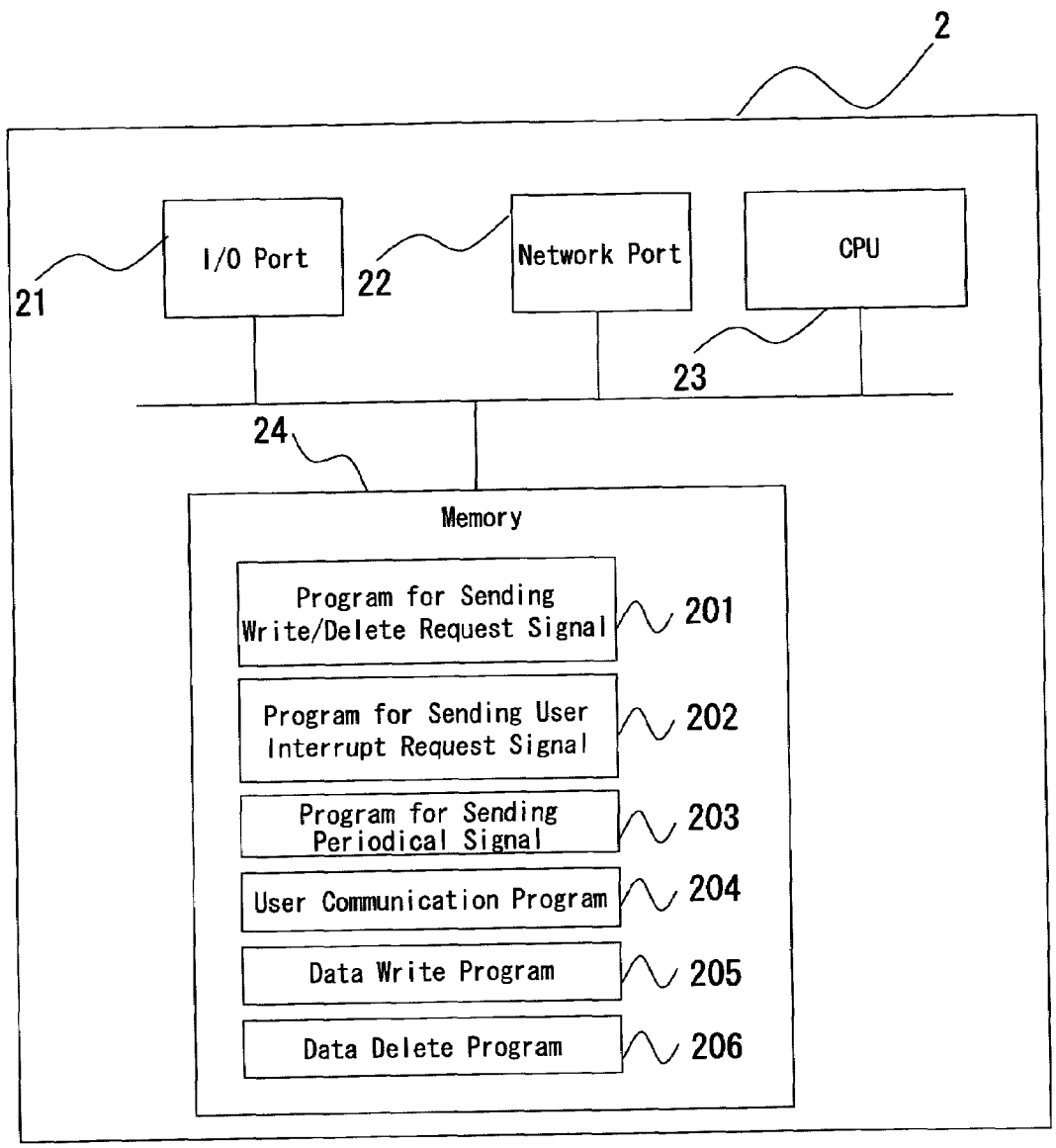
FIG. 3 is a view showing a configuration example of the server shown in FIG. 1.

Next, a detailed description will be made for the configuration of server 2. As shown in FIG. 3, the server 2 is provided with I/O port 21, network port 22, CPU 23 and memory 24 to execute various program stored in the memory 24 on the CPU 23.

The memory 24 stores a program for sending write/delete request signal 201, a program for sending user interrupt request signal 202, a program for sending periodical signal 203, a user communication program 204, a data write program 205 and a data delete program 206.

When a user uses an input device to make a write or delete request, the program for sending write/delete request signals 201 sends the write or delete signals to the manager program 1 in the management server 5.

The program for sending user interrupt request signals 202 has functions for sending user interrupt signals to the manager program 1 of the management server 5. The program for sending periodical signals 203 has functions for sending periodical signals to the manager program 1 in the management server 5 at intervals set in the user setting table 103 in the management server 5.

The user communication program 204 has functions for sending information to users according to the signals (for example, displaying the information to a computer display device, etc.) on receipt of various signals from the manager program 1 in the management server 5. The data write program 205 makes a request to the storage device 3 for writing the corresponding data on receipt of contents of the write location table 107 from the manager program 1 in the management server 5.

The data delete program 206 makes a request to the storage device 3 for writing the corresponding data on receipt of contents of the write location table 107 from the manager program 1.

(Configuration of Storage Device)

Next, a detailed description will be made for the configuration of the storage device 3. As shown in FIG. 4, the storage device 3 is provided with I/O port 31, network port 32, disk group 33 consisting of one or more disks, memory 34 and CPU 35 to execute various programs stored in the memory 34 using CPU 35. The CPU 35 controls an output to a logic area in the disk group 33.

The memory 34 stores a disk information table 301, an access location table 303 and a configuration information table 305. The memory 34 also stores a writing program 311, a reading program 313, a program for creating access location table 315, and a program for creating disk information table 317.

As shown in FIG. 12, the disk information table 301 contains information of the disk number, disk capacity, and Start Time of Use (corresponding to Start Time of Use information of FIG. 5).

As shown in FIG. 13, the access location table 303 contains information of the disk number and physical block number.

As shown in FIG. 14, the configuration information table 305 has a corresponding relationship with disk number, physical block number, logic area name and logic block number.

Next, a description will be made for functions for various programs 311, 313, 315, and 317 (refer to FIG. 4).

The writing program 311 has functions for writing a physical block corresponding to the logic block requested by the server 2 when a request for writing is sent from the data write program 205 (refer to FIG. 2) in the server 2.

The reading program 313 has functions for reading a physical block corresponding to the logic block requested by the server 2 when a request for reading is sent from the data delete program 206 (refer to FIG. 2) in the server 2.

The program for creating access location table 315 has functions for creating an access location table 303 according to the location where write or read are executed on the physical blocks.

The program for creating disk information table 317 has functions for creating a disk information table 301 according to the information of the disk capacity and start time of use and sending a configuration change signal to the manager program 1 in the management server 5, when addition or deletion of capacity is performed in the disk group 33.

(Principle of Redundancy in Logic Area)

The thus configured volume management system is used to make addition or extension of capacity in a logic area short in capacity, thereby making the logic area redundant, avoiding the capacity shortage and attaining data consistency, etc. To do this, unused capacities are prioritized in advance to determine which capacities are to be used for adding or extending a logic area facing capacity shortage. In the present embodiment, unused capacities to be used are prioritized as follows; (1) capacity of Unit 0, (2) capacity of unused component in other logic areas and (3) capacity acquired by releasing redundancy of other logic areas.

Figure 51:
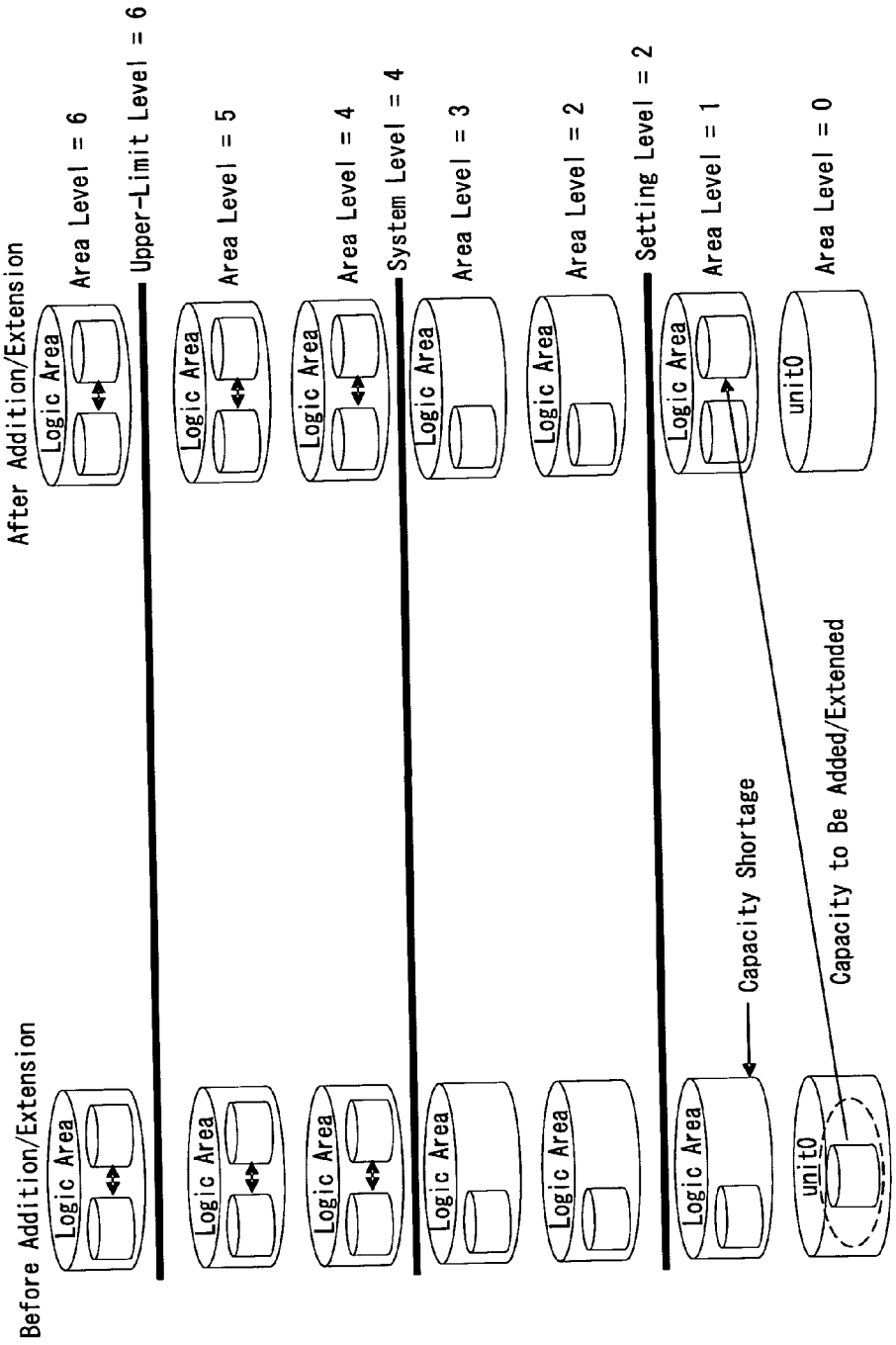
FIG. 51 is an explanatory view showing a specific operation 1 for avoiding capacity shortage.

Here, FIG. 51 shows behavior in case where (1) capacity of Unit 0 is used. In this instance, when the capacity of area level 1 is short (refer to the "area level 1" on "before addition/extension" side in FIG. 51), the capacity of Unit 0 (area level=0) is used for adding or extending the capacity of area level 1 (refer to the "area level 1" on "after addition/extension" side in FIG. 51).

Figure 52:
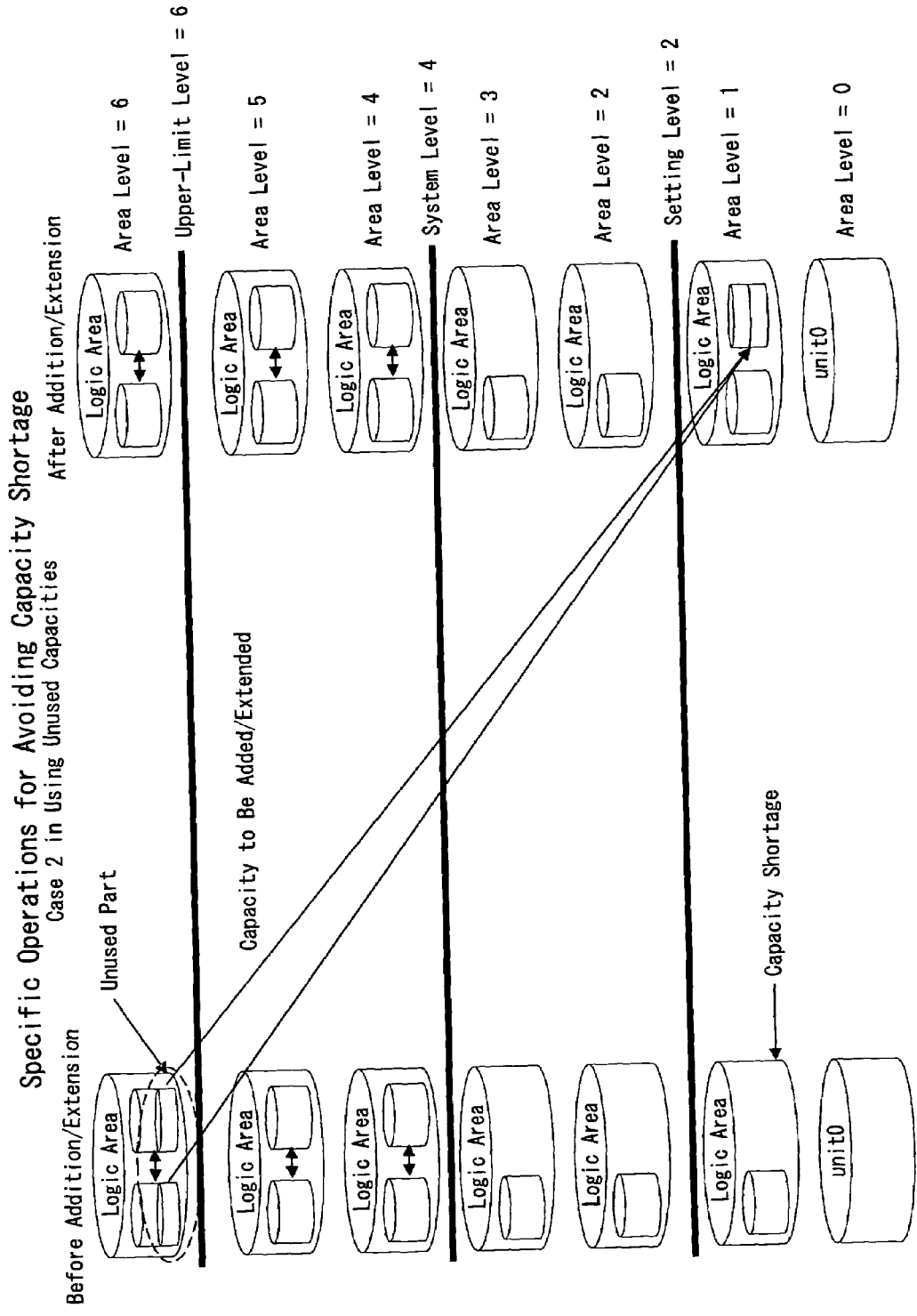
FIG. 52 is an explanatory view showing a specific operation 2 for avoiding capacity shortage.

Next, FIG. 52 shows the behavior in case of using (2) capacity of the unused component in other logic areas. In this instance, when the capacity of area level 1 is short (refer to the "area level 1" on "after addition/extension" side in FIG. 52), the capacity of logic area whose area level is 6 (unused component) is used for adding or extending the capacity of area level 1 (refer to the "area level 1" on "after addition/extension" side in FIG. 52).

Figure 53:
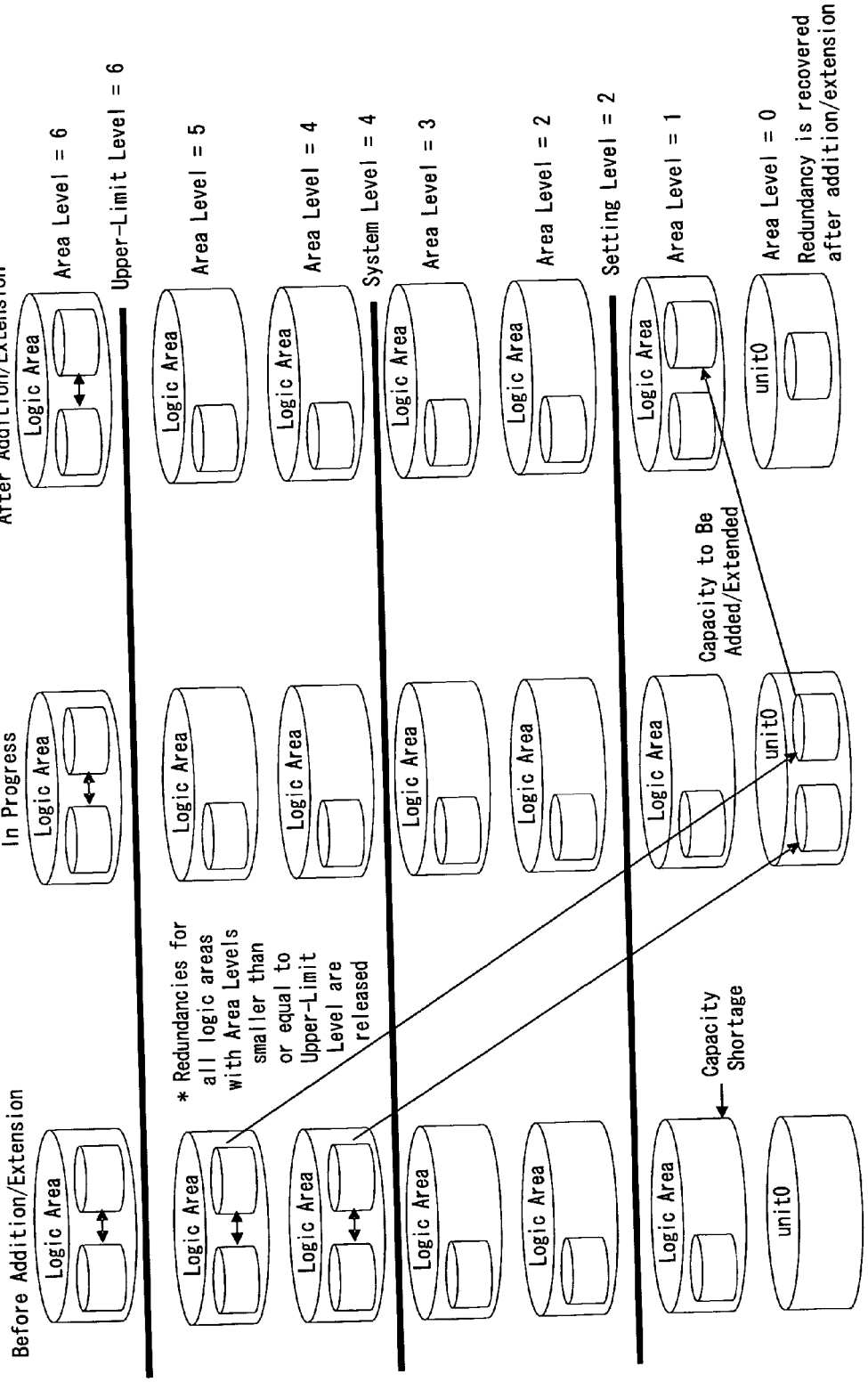
FIG. 53 is an explanatory view showing a specific operation 3 for avoiding capacity shortage.

Next, FIG. 53 shows the behavior in case of using (3) capacity acquired by releasing redundancy of other logic areas. In this instance, when the capacity of area level 1 is short (refer to the "area level 1" on "after addition/extension" side in FIG. 53), redundancies in logic areas upper-limit level 6 or lower are removed and released mirror destination logic areas are allocated to Unit 0 (refer to the process "in progress" in FIG. 53). Then, capacities of the logic areas allocated in Unit 0 are used for adding or extending the capacity of area level 1 (refer to the "area level 1" on "after addition/extension" side in FIG. 53). The redundancy once removed is thereafter recovered.

Figure 54:
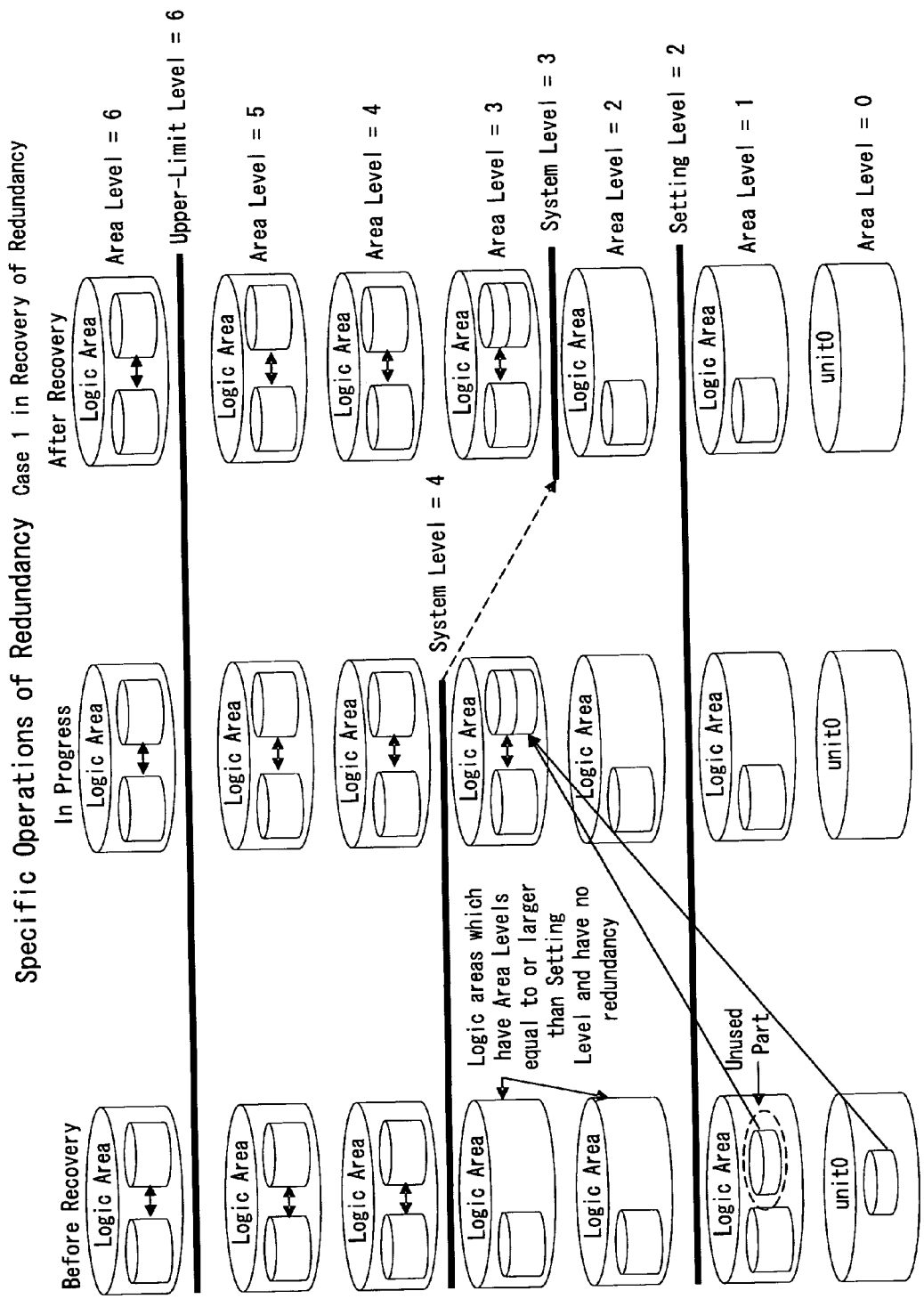
FIG. 54 is an explanatory view showing a specific operation 1 on redundancy.

FIG. 54 shows an example of such recovery of the redundancy. For example, when there is an unused capacity of logic area whose area level is 1 and there is an available capacity in Unit 0 (refer to "before recovery" in FIG. 54), such capacity is allocated in a logic area whose area level is lower than the system level (4 in this example) and higher than or equal to the setting level (2 in this example), to give redundancy to the logic area (refer to the process "in progress" in FIG. 54). Then, the system level is lowered by 1 (refer to "before recovery" in FIG. 54).

Figure 55:
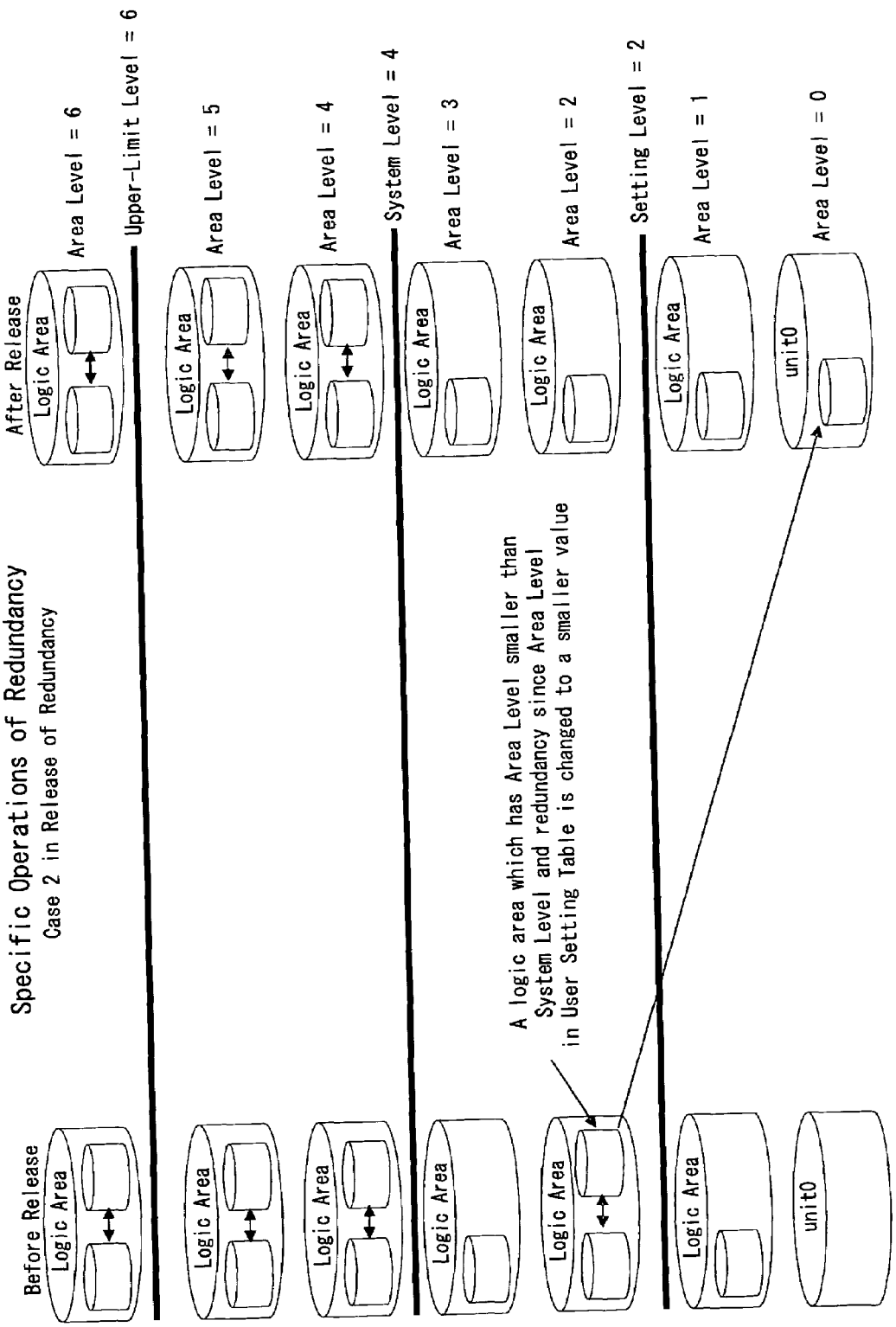
FIG. 55 is an explanatory view showing specific operation 2 on redundancy.

Next, FIG. 55 shows an example of removing redundancy from the logic area. For example, when an area level whose level is greater than or equal to system level (4) (specified in the user setting table 103 refer to FIG. 7) is changed to smaller values, and whose area level becomes smaller than system level (4), the redundancy of the logic area is removed, and its mirror destination blocks are allocated to Unit 0 (refer to the "level after release" in FIG. 55).

Figure 56:
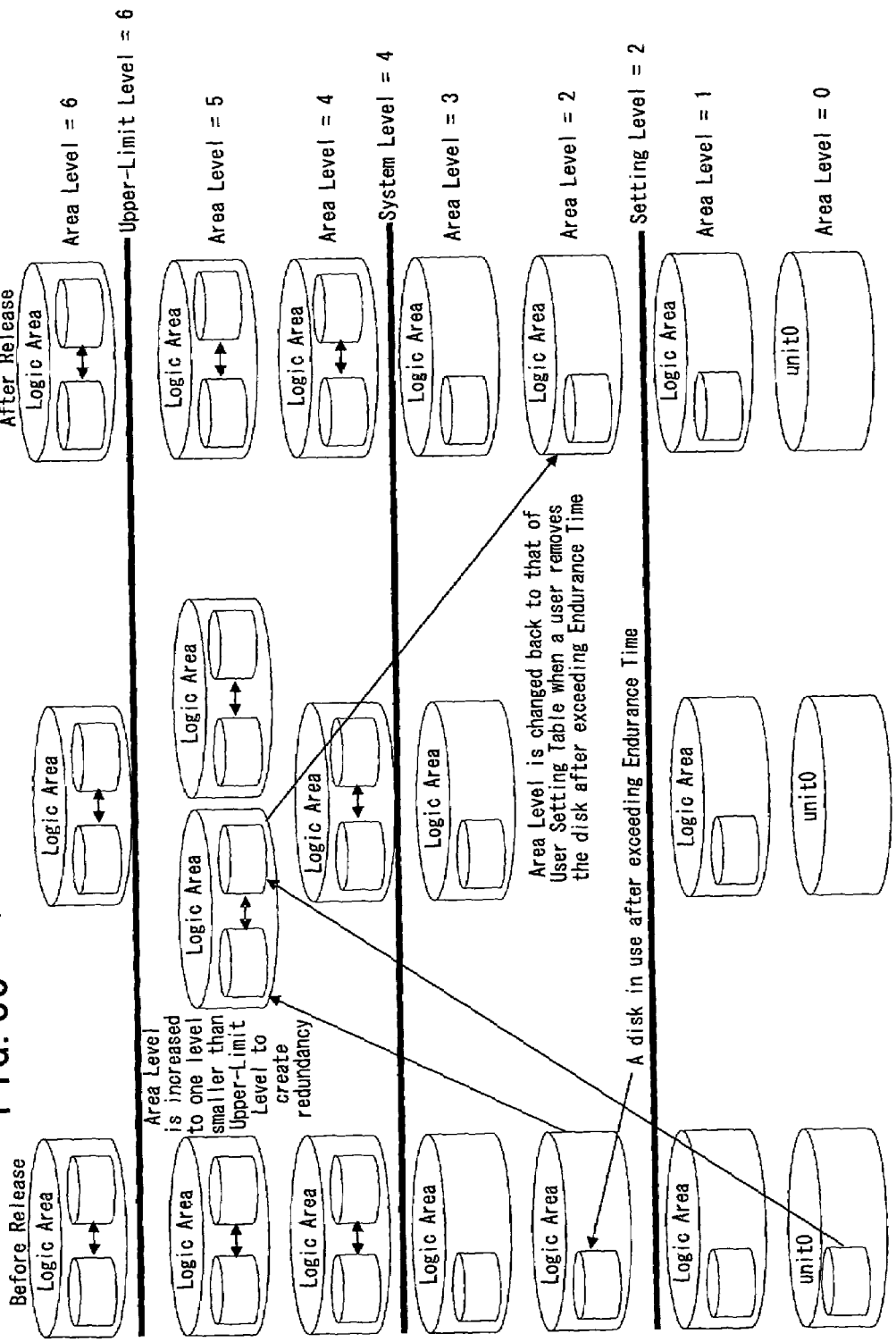
FIG. 56 is an explanatory view showing specific operations on endurance time and redundancy.

Further, in the present embodiment, when a physical disk has been used for time exceeding an endurance time (defined by a user), data of the logic area corresponding to the physical disk also can be protected. FIG. 56 shows this example. For example, for a logical disk corresponding to a physical disk which has been used for time exceeding the endurance time (see logic area whose area level is 2 in FIG. 56), its logical level is temporarily set to 5 (one level below the upper-limit level (6)). Then, the logic area is mirrored because the logical level is 5. Then, when the physical disk used for time exceeding endurance time is removed by a user, the area level is set back to its original value specified in the user setting table 103 (refer to FIG. 7) (for example, 2) to allocate the logic areas to which redundancy is given, to the area level 2. In other words, the area levels of the logic areas to which redundancy are given are set back to the original levels (for example, 2). Therefore with this procedure, even when the physical disk has been used for time exceeding an endurance time, the data can be protected.

(Managing Method for Redundancy in Logic Area)

A description will be further made for a managing method for redundancy in the logic area.

Logic areas with larger area level have priority to be redundant. A system level represented by a numeric value is a boundary value for dividing the logic areas into redundant logic areas and non-redundant ones. An upper-limit level is set as an upper limit of the system level and a setting level is set as a lower limit, and these parameters have numeric values. The redundancy is managed according to the following regulations. When a value of the area level in the logic area is smaller than that of the system level, the redundancy of the corresponding logic area is removed. The capacity acquired by removing the redundancy is assigned to Unit 0. When a value of the area level in the logic area is that of the setting level or higher and smaller than that of the system level, logic areas higher in area level are sequentially subjected to the following processes in order to automatically impart redundancy to the corresponding logic area. Both or either of the capacity of an unused component in other logic areas and/or the capacity assigned to Unit 0 is used to make the corresponding logic area redundant, by importing redundancy to the non-redundant logic areas, the value of the system level is changed to the area level where redundancy is given. When both or either of the capacity of an unused component in other logic areas and/or the capacity of Unit 0 is used to fail in securing a sufficient capacity for imparting redundancy, redundancy is not given to the corresponding logic area.

(Criteria for Capacity Shortage)

Next, a description will be made for criteria for capacity shortage.

Thresholds (indicating percent used) are set in each logic area and numeric values from 0 to 100 are set to the thresholds. A value acquired by dividing the number of used logic blocks by the number of total logic blocks in each logic area and by multiplying the divided value with 100 is defined as activity ratio. When the activity ratio exceeds a threshold, the logic area is judged to be short in capacity.

Next, a description will be made by referring to FIG. 15 through FIG. 50 for a processing example of the workload volume manager in which CPU 53 of the management server 5 makes addition or extension of capacity to a logic area short in capacity according to the manager program 1 in the memory 54, thereby giving redundancy, etc.

Figure 15:
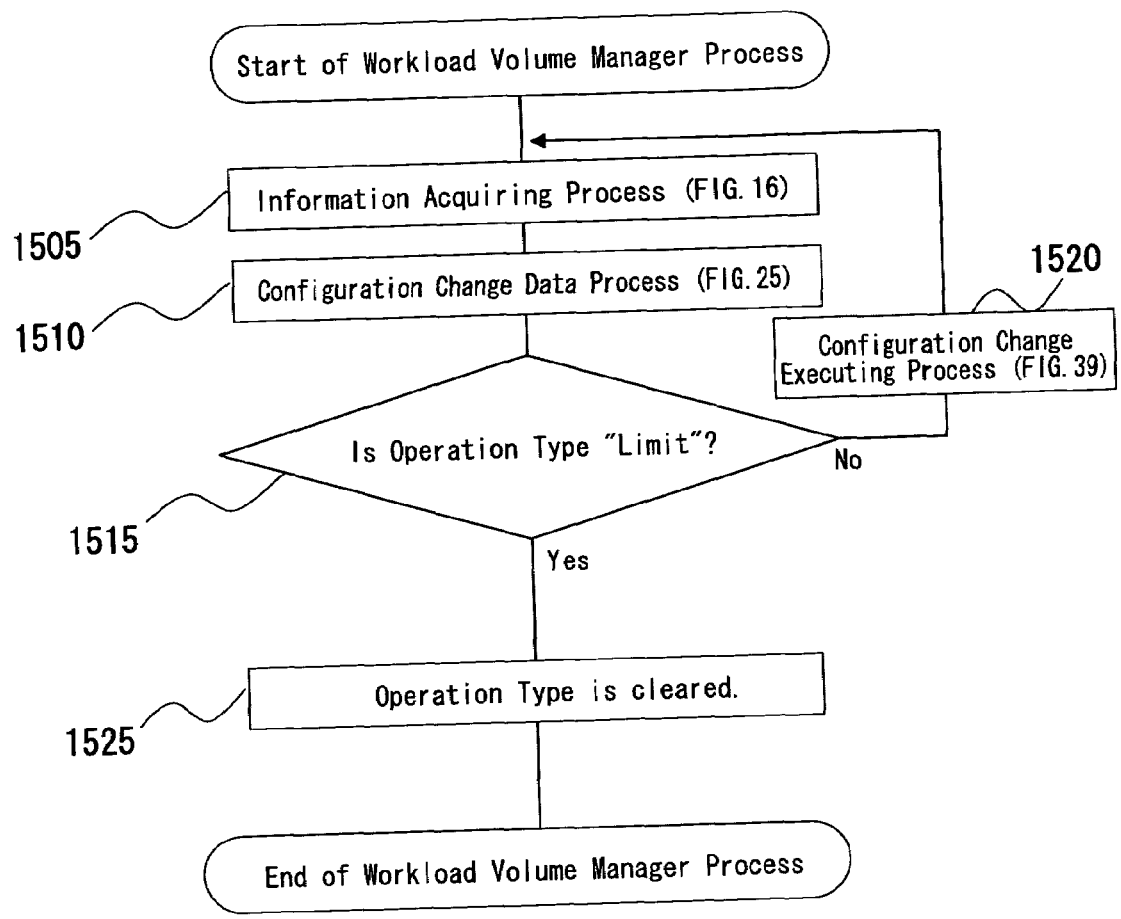
FIG. 15 is flow chart showing a process of workload volume manager.

FIG. 15 is a flow chart showing a summary of the process of the workload volume manager. First, the step 1505 performs an information acquiring process (refer to FIG. 16) for acquiring signals sent by various programs of the server 2.

The step 1510 performs a configuration change data process (refer to FIG. 25) for processing contents of the master table 101, etc.

In the step 1515, it is judged whether a value of operation type (refer to FIG. 5) in the system information of the master table 101 is the "limit." When the value is judged not to be the "limit" (No in the step 1515), the process proceeds to the step 1520, and the configuration change executing process (refer to FIG. 39) is executed, by which contents of configuration information table 305 of the storage device 3 are changed according to the operation type. Thereafter, the process returns to the step 1505.

In contrast, when the value of operation type is judged to be the "limit" (Yes in the step 1515), the operation type is cleared (Yes in the step 1525) and the manager program 1 ends.

Figure 16:
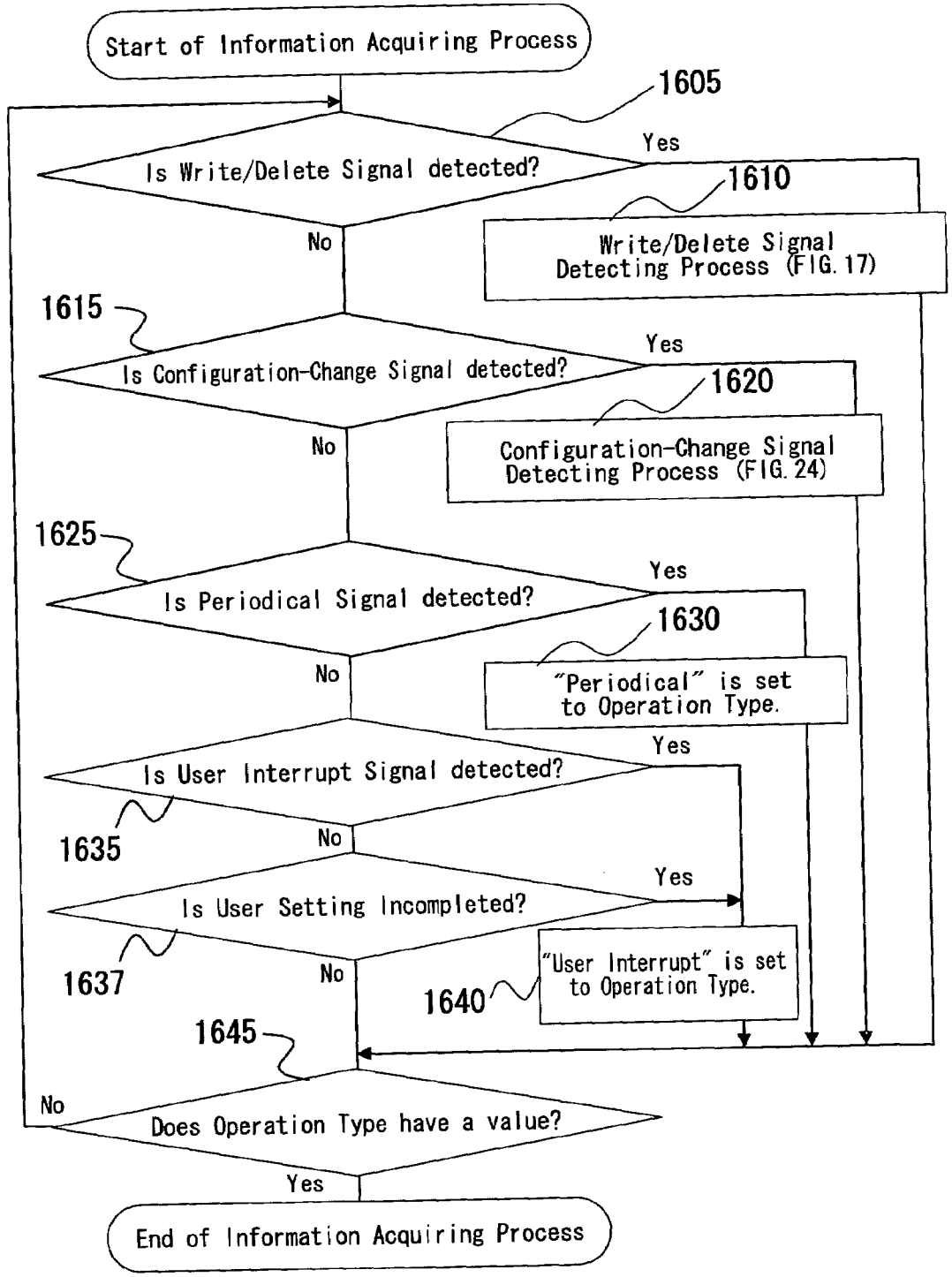
FIG. 16 is a flow chart showing an information acquiring process.

FIG. 16 is a flow chart showing an information acquiring process in the step 1505. First, in the step 1605, the CPU 53 on the management server 5 makes judgment on whether a write/delete signal sent from the "program for sending write/delete request signals" 201 on the server 2 is detected. Then, when the signal is detected (Yes in the step 1605), a "writing/delete signal detecting process" (refer to FIG. 17) is executed (step 1610). When the signal is not detected (No in the step 1605), it is determined whether a "configuration change signal" sent from the "program for creating disk information table" 317 on the storage device 3 is detected (step 1615).

When the configuration change signal is detected (Yes in the step 1615), a "configuration change signal" detecting process (refer to FIG. 24) is executed (step 1620). When the configuration change signal is not detected (No as shown in step 1615), it is judged whether a periodical signal sent from the program for sending periodical signal 203 of the server 2 is detected (step 1625).

When the periodical signal is detected (Yes as shown in step 1625), a value of "periodical" is set to the operation type (refer to FIG. 5) of the system information in the master table 101 (step 1630). When the periodical signal is not detected (No as shown in step 1625), it is determined whether a user interrupt signal sent from the program for sending user interrupt request signal 202 of the server 2 is detected (step 1635).

When the user interrupt signal is detected (Yes as shown in step 1635), a value of "user interrupt" is set to the operation type (refer to FIG. 5) in the system information in the master table 101 (step 1640). When the user interrupt signal is not detected (No as shown in step 1635), the process proceeds to the step 1637 and it is judged whether the value of the user setting (refer to FIG. 5) of the system information in the master table 101 is Incompleted.

Then, when the value of the user setting is Incompleted (Yes as shown in step 1637), a value of "user interrupt" is set to the operation type (refer to FIG. 5) of the system information in the master table 101(step 1640). When the value of the user setting is "Completed" (No as shown in step 1637), it is judged whether a valid value is already set to "operation type". (refer to FIG. 5) (step 1645). As a result, when the value of "operation type" is valid (Yes as shown in step 1645), information acquiring process ends. When no valid value is set (No as shown in step 1645), the process returns to the step 1605.

Figure 17:
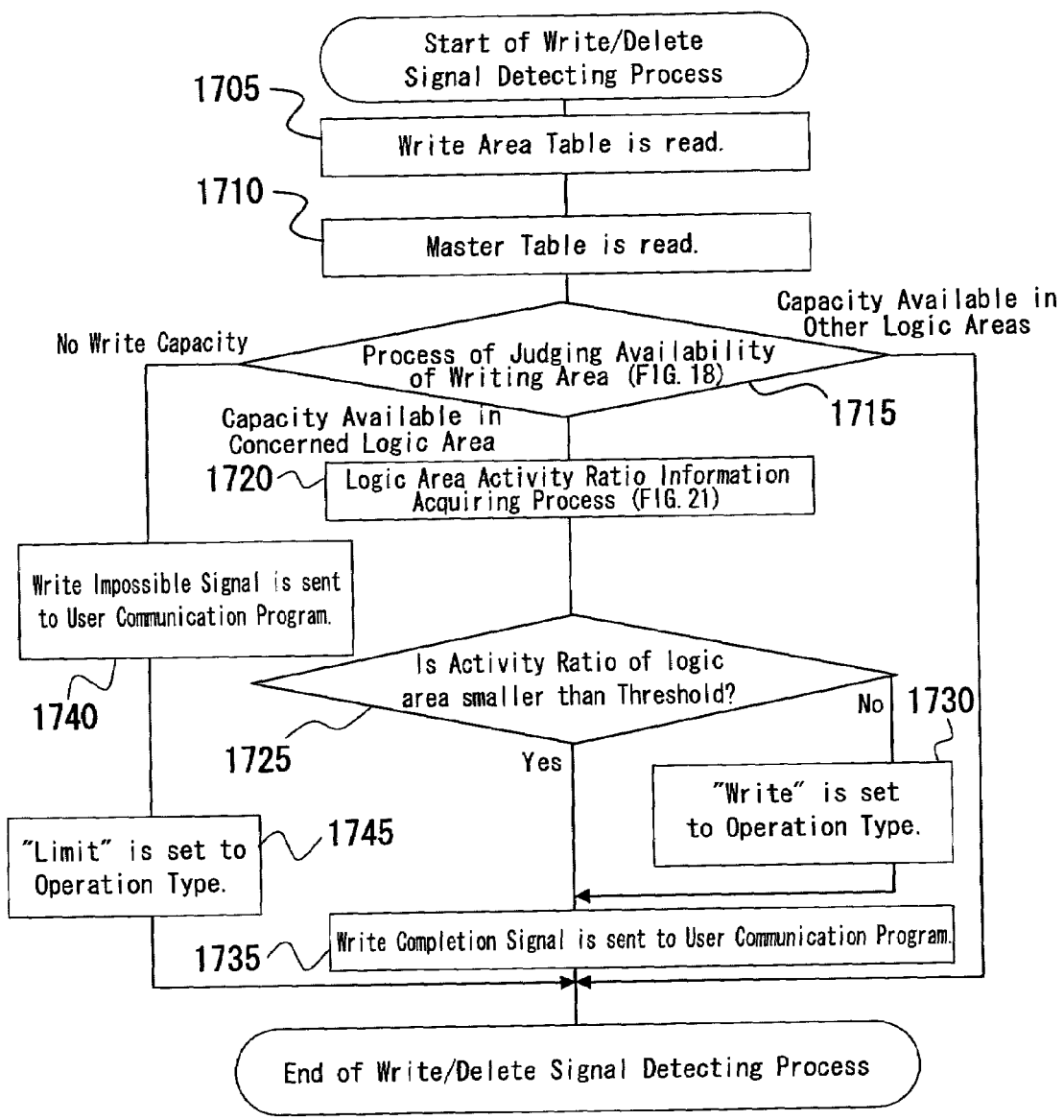
FIG. 17 is a flow chart showing a write/delete signal detecting process.

FIG. 17 is a flow chart showing "write/delete signal detecting process" (invoked at 1610 in FIG. 16) of the step 1610. The write area table 105 is read in the step 1705 and the master table 101 is read in the step 1710.

In the step 1715, master table 101 and the write area table 105 are referred to according to a write/delete signal previously described to execute the process of judging availability of writing area (refer to FIG. 18) for determining whether a write area is available. As a result of the process, when any writing capacity is available in other logic areas ("capacity available in other logic areas" as shown in step 1715), "write/delete signal detecting process" ends.

Figure 21:
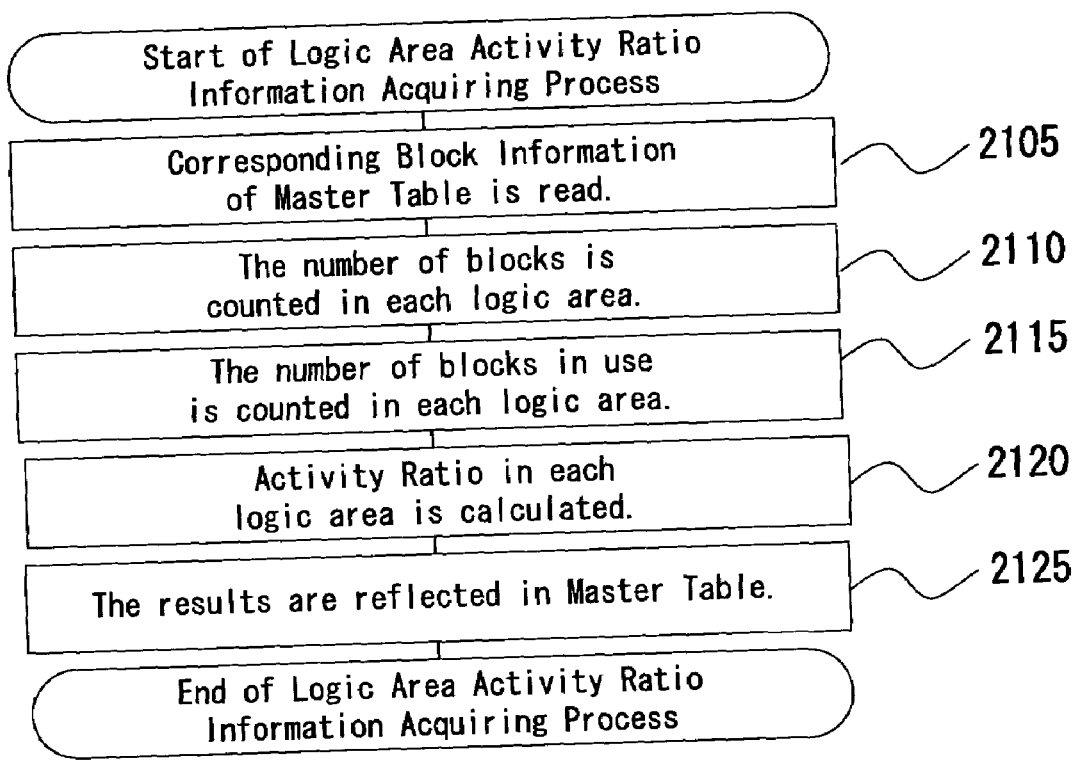
FIG. 21 is a flow chart showing a logic area activity ratio information acquiring process.

Further, as a result of the process of the step 1715, when the writing capacity is available in the corresponding logic area ("capacity available in the corresponding logic area" as shown in step 1715), the process proceeds to the step 1720 to execute "logic area activity ratio information acquiring process" (refer to FIG. 21). As a result of the process, it is determined whether the activity ratio of the logic area is smaller than a threshold stored in the logic area information (refer to FIG. 5) in the master table 101 (step 1725). Consequently, when the activity ratio of the logic area is larger (No as shown in step 1725), the value "write" is set to the operation type (refer to FIG. 5) in the system information in the master table 101, and the process proceeds to the step 1735.

In the step 1735, a "write completion signal" is sent to the user communication program 204 of the server 2 and "write/delete signal detecting process" ends.

Further, as a result of the process of the step 1715, when no write capacity is available ("no writing capacity available" as shown in step 1715), a "write impossible signal" is sent to "user communication program" 204 of the server 2 (step 1740) and the value "limit" is set to the operation type (refer to FIG. 4) in the system information in the master table 101 (step 1745) and "write/delete signal detecting process" ends.

Figure 18:
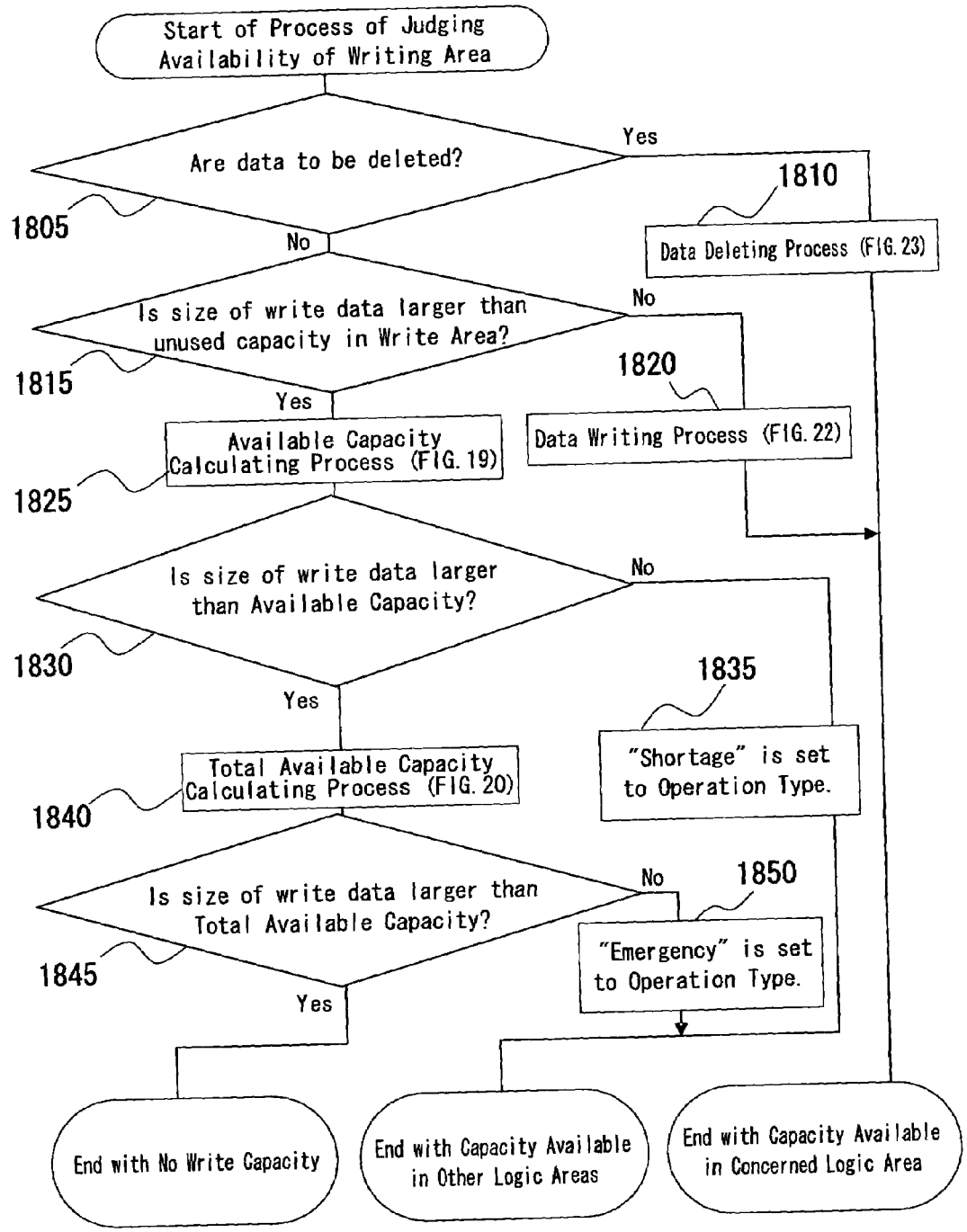
FIG. 18 is a flow chart showing a process of judging availability of writing area.

FIG. 18 is a flow chart showing the process of "judging availability of writing area" in the step 1715 (FIG. 17). In the step 1805, it is determined whether data should be deleted according to the write/delete signal. When the data is to be deleted (Yes as shown in step 1805), "data deleting process" is executed (refer to FIG. 23) (step 1810). This process makes it possible to increase the capacity of logic area in which the data is deleted, and the process of the step 1715 (refer to FIG. 17) results in "capacity available in the concerned logic area."

In contrast, when data is written (No as shown in step 1805), it is determined whether the data to be written is larger than an available area (unused logic area) in the particular write area for the logic area corresponding to the data (step 1815). As a result of the judgment, when the data is smaller (No as shown in step 1815), "data writing process" is executed (refer to FIG. 22) (step 1820). When it is larger (Yes as shown in step 1815), "available capacity calculating process" (refer to FIG. 19) is executed in which available capacity to be described later, namely, capacity of logic area available for writing the data is calculated (step 1825).

Next, in the step 1830, it is judged whether data to be written is larger than the available capacity. When the data is larger (Yes as shown in step 1830), "total available capacity calculating process" (refer to FIG. 20) is executed (step 1840). In the step 1845, as a result of the process, it is judged whether the data to be written is larger than the total available capacity to be described later. When it is larger (Yes as shown in step 1845), the process ends in a state where the logic areas are not available for writing, and the process of the step 1715 (refer to FIG. 17) results in "no writing capacity available." In contrast, when data to be written is smaller than the total available capacity (No as shown in step 1845), a value of "emergency" is set to the operation type (refer to FIG. 5) in the system information in the master table 101 (step 1850)

and the process ends. In this instance, the process ends in a state that data can be written in other logic areas, and the process of step 1715 results in "capacity available in other logic areas."

In the step 1830, even when the data is smaller (No as shown in step 1830), the operation type (refer to FIG. 5) in the system information in the master table 101 (step 1835) is set to "shortage", and the process of the step 1715 results in "capacity available in other logic areas."

Figure 19:
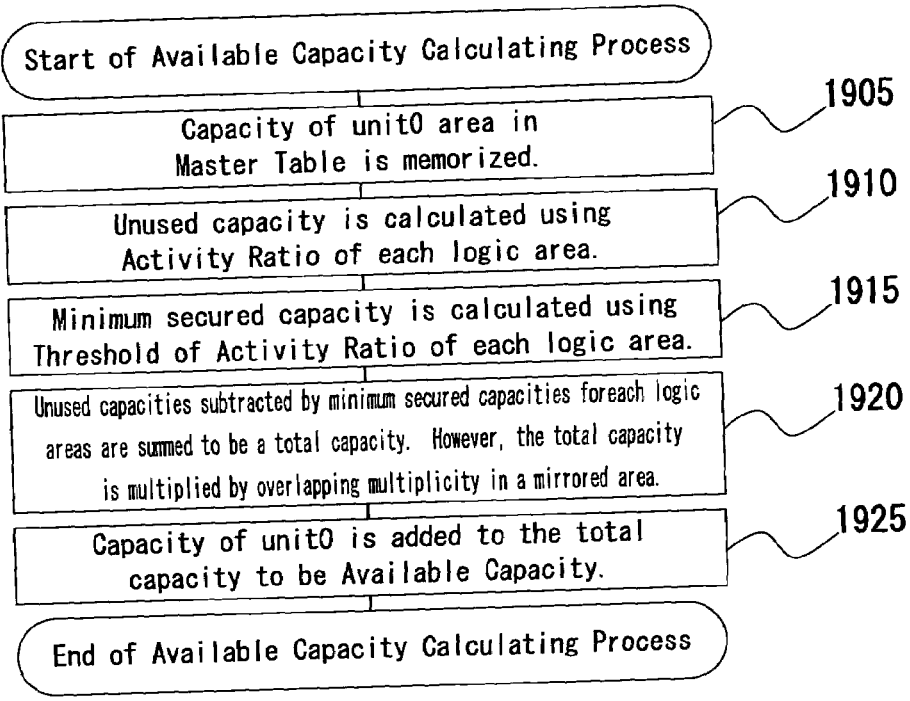
FIG. 19 is a flow chart showing an available capacity calculating process.

FIG. 19 is a flow chart showing "available capacity calculating process" in the step 1825. "Available capacity calculating process" is a process for calculating an available capacity in the unused areas of logic areas.

In the step 1905, the capacity of the logic area Unit 0 is stored in the master table 101.

In the step 1910, an unused capacity of each logic area is calculated from the activity ratio of each logic area by referring to the logic area information (refer to FIG. 5) in the master table 101. To be specific, the unused capacity is calculated by multiplying the capacity of logic area with values of (100%—activity ratio) for each logic area specified by a logic area name. For example, when the activity ratio is 40% and the capacity of logic area is 10 GB, the unused capacity is 6 GB.

In the step 1915, a minimum reserved capacity is calculated from a threshold of activity ratio in each logic area by referring to the logic area information (refer to FIG. 5) in the master table 101. To be specific, a capacity acquired by subtracting the capacity of logic area specified by the threshold of activity ratio from the whole capacity of the logic area for each logic area (identified by logic area name) is the minimum reserved capacity of logic area concerned. For example, when the threshold of activity ratio is 90% and the capacity of logic area is 10 GB, the minimum reserved capacity of logic area is 1 GB.

In the step 1920, a total available capacity is acquired by subtracting the minimum reserved capacity from unused capacities of each logic area. The total available capacity is an available capacity to be supplied to each logic area. However, when mirroring has been effected, overlapped components due to mirroring are multiplied by overlapping multiplicity to obtain the capacity to be supplied. For example, when the mirroring is duplicated (the mirroring is done with two logic areas), the capacity supplied is doubled to obtain the available capacity, and when it is tripled (the mirroring is done with three logic areas), the capacity is supplied three times to obtain the available capacity.

In the step 1925, the available capacity values previously described, namely, supplied capacities of each logic area and the capacity of Unit 0 area stored in step 1905 are summed up to be an available capacity, thereby "available capacity calculating process" ends.

Figure 20:
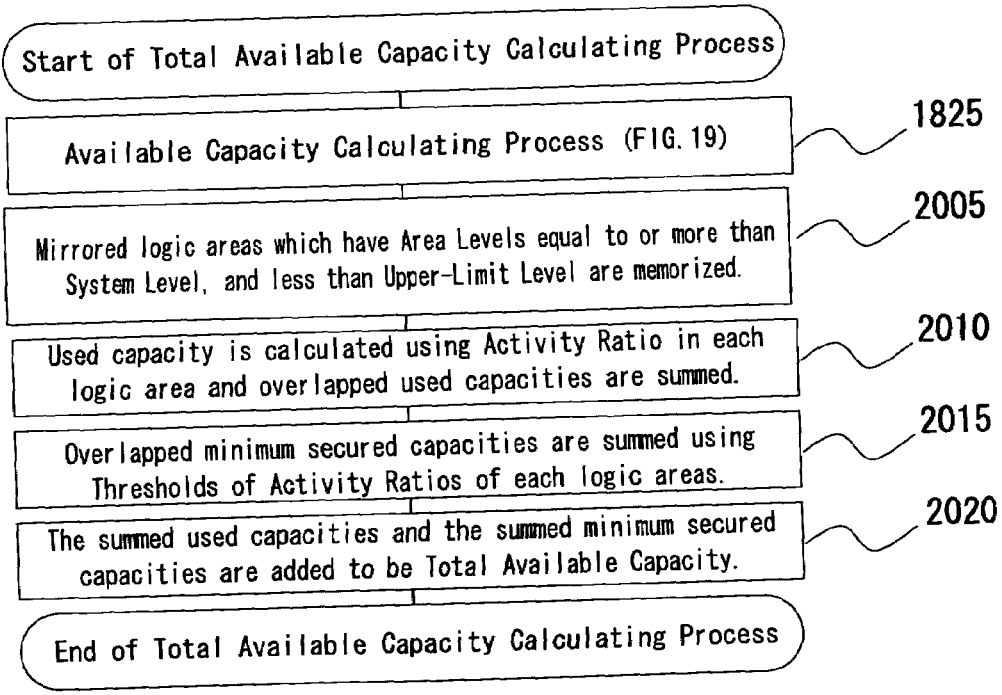
FIG. 20 is a flow chart showing a total available capacity calculating process.

FIG. 20 is a flow chart showing a total available capacity calculating process in the step 1840 (FIG. 18). "Total available capacity calculating process" is a process in which all logic areas with area levels below an upper-limit level are to be unmirrored, thereby calculating the thus acquired capacities of the logic areas. Here, the process of step 1825 is as same as that shown in FIG. 19 and overlapping description will be omitted.

In the step 2005, by referencing to the master table 101, mirrored logic areas having an area level above the system level and below the upper-limit level are stored. For example, in FIG. 5, since a logic area of Unit 3 in which the system level of the system information is 3 and the upper-limit level is 8, namely, the level is above 3 and below 8 (refer to logic area name of logic area information, area level and state of logic area) is mirrored, an area of Unit 3 is to be memorized in the memory 54.

In the step 2010, by referencing to the logic area information (refer to FIG. 5) in the master table 101, an activity ratio of each logic area is used to calculate the used capacity (in-use capacity), which is summed up with the overlapped components (used capacity component of mirror destination logic areas). For example, when two logic areas are used for the mirror, the capacity is doubled to calculate the used capacity. When three logic areas are used for the mirror, the capacity is tripled to calculate the used capacity.

In the step 2015, with reference to the logic area information (refer to FIG. 5) in the master table 101, a threshold of activity ratio in each logic area is used to sum up overlapped capacities of the minimum reserved capacities (minimum reserved capacities of mirror destination logic areas).

In the step 2020, the used capacities and the minimum reserved capacities of logic areas with area levels between the system level and the upper-limit level are summed up for the all overlapped components of mirroring, to acquire a total available capacity, and then the total available capacity calculating process ends.

FIG. 21 is a flow chart showing "logic area activity ratio information acquiring process" in the step 1720 (FIG. 17).

In the step 2105, the corresponding block information (refer to FIG. 6) in the master table 101 is read.

In the step 2110, the number of blocks in each logic area is counted by referring to a value specified by the logic block number for each logic area contained in the corresponding block information. For example, when there are the logic block numbers from block 1 through block 10 for Unit 1, the number of logic blocks in Unit 1 is 10.

In the step 2115, the number of blocks used in each logic area is counted (those in which the use status of corresponding block information shows Use).

In the step 2120, the number of in-use blocks (used blocks) described above and the capacity of logic area in the logic area information in the master table 101 (refer to FIG. 5) are used to calculate the activity ratio of each logic area. To be specific, the predetermined block size is multiplied by the number of in-use blocks to be a total used capacity of each logic area and the ratio of the total used capacity to the capacity of the logic area is calculated to be the activity ratio of each logic area.

In the step 2125, the thus calculated activity ratio of each logic area is reflected in the master table 101.

Figure 22:
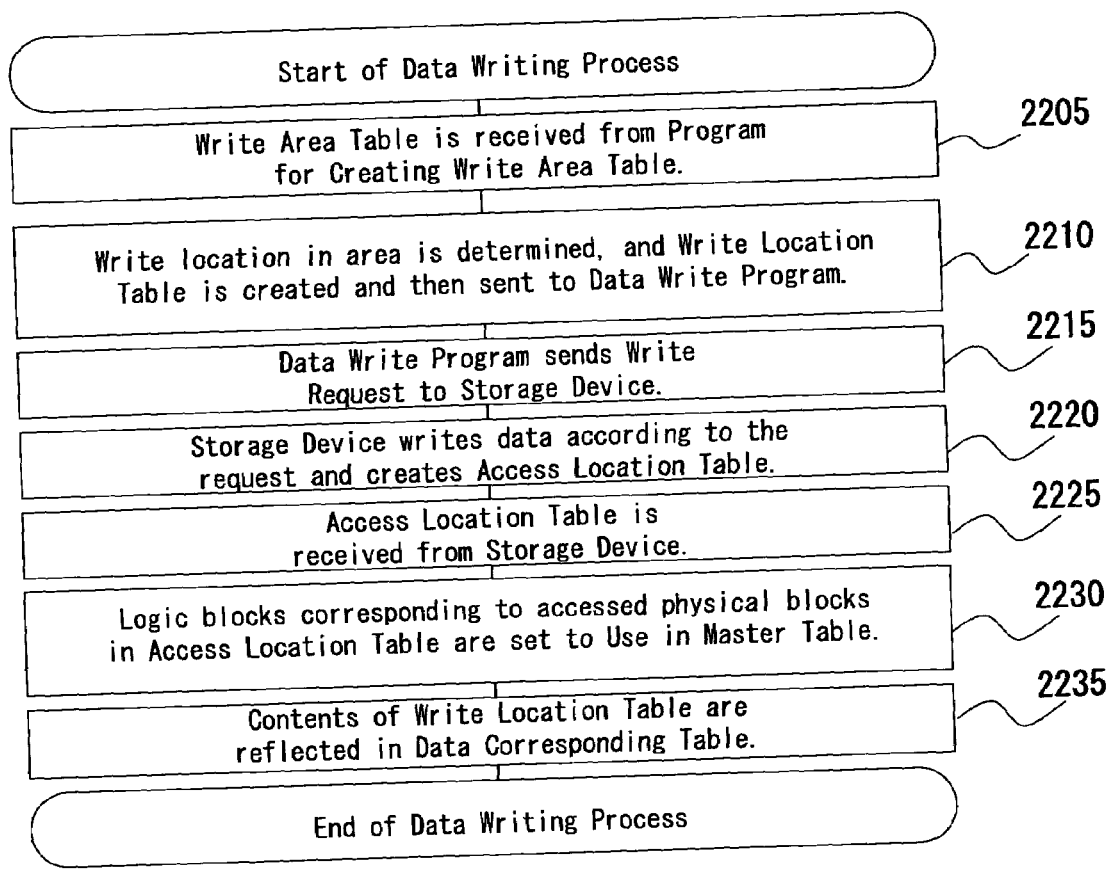
FIG. 22 is a flow chart showing a data writing process.

FIG. 22 is a flow chart showing "data writing process" (FIG. 18) shown in step 1820.

In the step 2205, the write area table 105 is received from "program for creating a write area table" 209 (refer to FIG. 8).

In the step 2210, a write location in a logic area (for example, Unit 4) specified by a logic area name of a logic area whose Write/Delete parameter in the write area table 105 is "Write" is determined. Then, after the write location table 107 (refer to FIG. 9) is created, contents of the write location table 107 are sent to "data write program" 205 in the server 2. The write location is determined by selecting unused logic block numbers (numbers of logic blocks whose use statuses are Unuse) within the corresponding logic area from the corresponding block information (refer to FIG. 6) in the master table 101.

In the step 2215, "data write program" 205 in CPU 23 of the server 2 makes a request for writing data to the storage device 3 via SAN 6. Such request for writing data is specified by the logic area name and logic block number sent in the step 2210.

In the step 2220, CPU 35 of the storage device 3 writes data according to the write request previously described and creates an access location table 303 (refer to FIG. 13). When writing the data, the storage device 3 reads disk numbers (for example, disk 4) and physical block numbers (for example, block 1) corresponding to the logic area name and the logic block number specified by the request for writing data from the configuration information table 305 (refer to FIG. 14), and writes data to the corresponding disks. In this instance, pairs of the disk numbers and physical block numbers read from configuration table information table 305 are set in the access location table 303 (refer to FIG. 13).

In the step 2225, CPU 53 of the management server 5 receives the access location table 303 created by the storage device 3 from the storage device 3 via LAN, and executes the subsequent steps.

In the step 2230, the logic block corresponding to the physical block that is accessed is marked as "Use", referring to the received access location table 303 (refer to FIG. 13). To be specific, a pair of the disk number and physical block number is read from the access location table 303, and a record containing the logic area name and the logic block number corresponding to the pair is identified from the corresponding block information (refer to FIG. 6) in the master table 101, and the use status in the record is set to "Use.".

In the step 2235, contents of the access location table 303 (refer to FIG. 13) are reflected in the data corresponding table 109 (refer to FIG. 10). To be specific, each pair of the disk number and the physical block number in the access location table 303 is registered corresponding to the data name in the data corresponding table 109, and then the data writing process ends.

Figure 23:
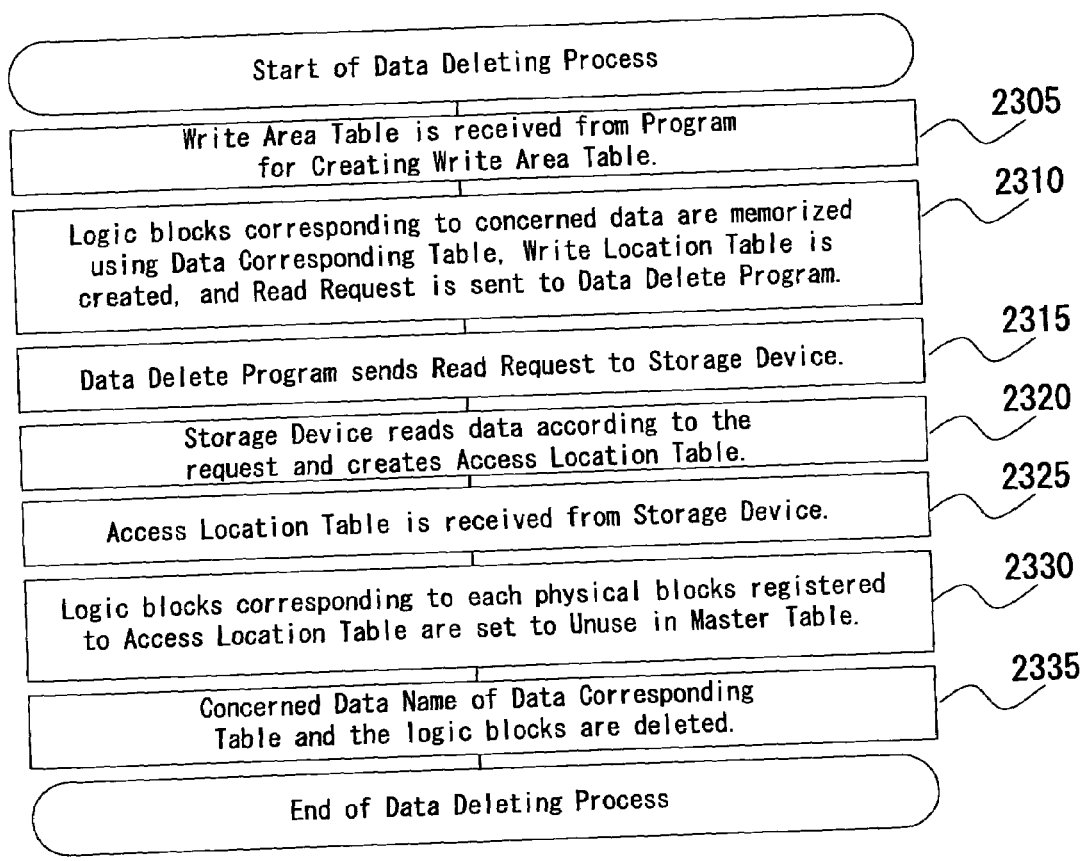
FIG. 23 is a flow chart showing a data deleting process.

FIG. 23 is a flow chart showing a data deleting process (FIG. 18) in the step 1810.

In the step 2305, the write area table 105 (refer to FIG. 8) is received from program for creating a write area table 209. To be specific, the logic area names (for example, Unit 2, etc.) and data names (for example, data B, etc.) specified by the logic area names of the logic areas whose Write/Delete parameter are "Delete" in the write area table 105 are received.

In the step 2310, logic blocks (logic area names and logic block numbers) corresponding to the concerned data (for example, data B) are read from the data corresponding table 109 (refer to FIG. 10) and stored to create the write location table 107 (refer to FIG. 9). Thereafter, a read request is sent to the data delete program 206 in the server 2. Write/Read, data name, logic area name, and logic block number in the write location table 107 created above are set. The logic block number is a value corresponding to the data name and logic area name (either of which is a value received from the write area table 105) in the data corresponding table 109 (refer to FIG. 10).

In the step 2315, the data delete program 206 in CPU 23 on the server 2 sends read request to the storage device 3 via SAN 6.

In the step 2320, the storage device 3 reads data according to the read request described above and creates the access location table 303 (refer to FIG. 13). When reading the data, the storage device 3 reads disk numbers (for example, disk3) and physical block numbers (for example, block 501) corresponding to the logic area name and the logic block number specified by the read request from the configuration information table 305 (refer to FIG. 14) to read data in the corresponding disks. Then, pairs of the thus read out disk numbers and the physical block numbers are set in the access location table 303 (refer to FIG. 13).

In the step 2325, the CPU 53 of the management server 5 receives the access location table 303 (refer to FIG. 13) created above from the storage device 3 via LAN, and processes the subsequent steps.

In the step 2330, a logic block corresponding to the physical block specified in the access location table 303 is marked as "Unuse" in the master table 101. To be specific, a pair of the disk number and the physical block number is read from the access location table 303 and a record of the corresponding block information (refer to FIG. 6) containing the logic area name and the logic block number corresponding to the pair is identified from the master table 101 to set use status in the record to "Unuse."

In the step 2335, values of logic area name and logic block number in the data corresponding table 109 (refer to FIG. 10) are deleted according to the values of logic area name and logic block number corresponding to the logic block whose use status is "Unuse" Then, the data deleting process ends.

Figure 24:
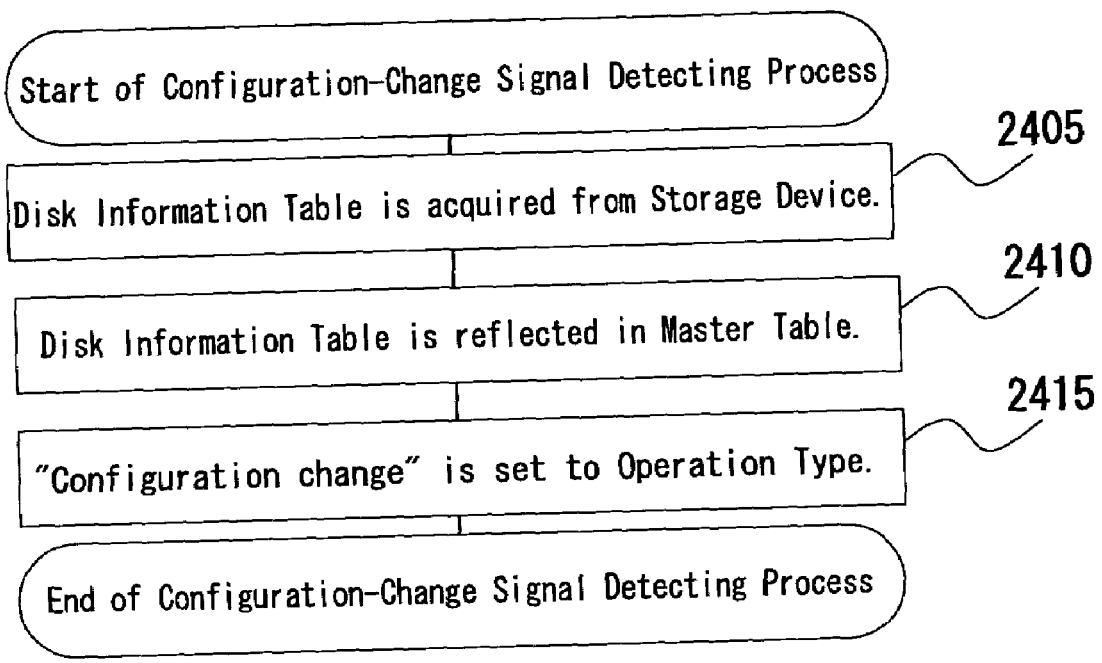
FIG. 24 is a flow chart showing a configuration change signal detecting process.

FIG. 24 is a flow chart showing a configuration change signal detecting process (FIG. 16) of the step 1620.

In the step 2405, the disk information table 301 (refer to FIG. 12) is acquired from the storage device 3. To be specific, the disk information table 301 is acquired via LAN from the program of creating disk information table 317 of the storage device 3.

In the step 2410, the disk information table 301 is reflected in the master table 101 (refer to FIG. 5). To be specific, the disk number of the disk information table 301 (refer to FIG. 12), the disk capacity, and the Start Time of Use are registered to the corresponding items in the disk information (refer to FIG. 5) in the master table 101.

In the step 2415, a value of "configuration change" is set to the operation type of the system information in the master table 101. Then, the configuration change signal detecting process ends.

Figure 25:
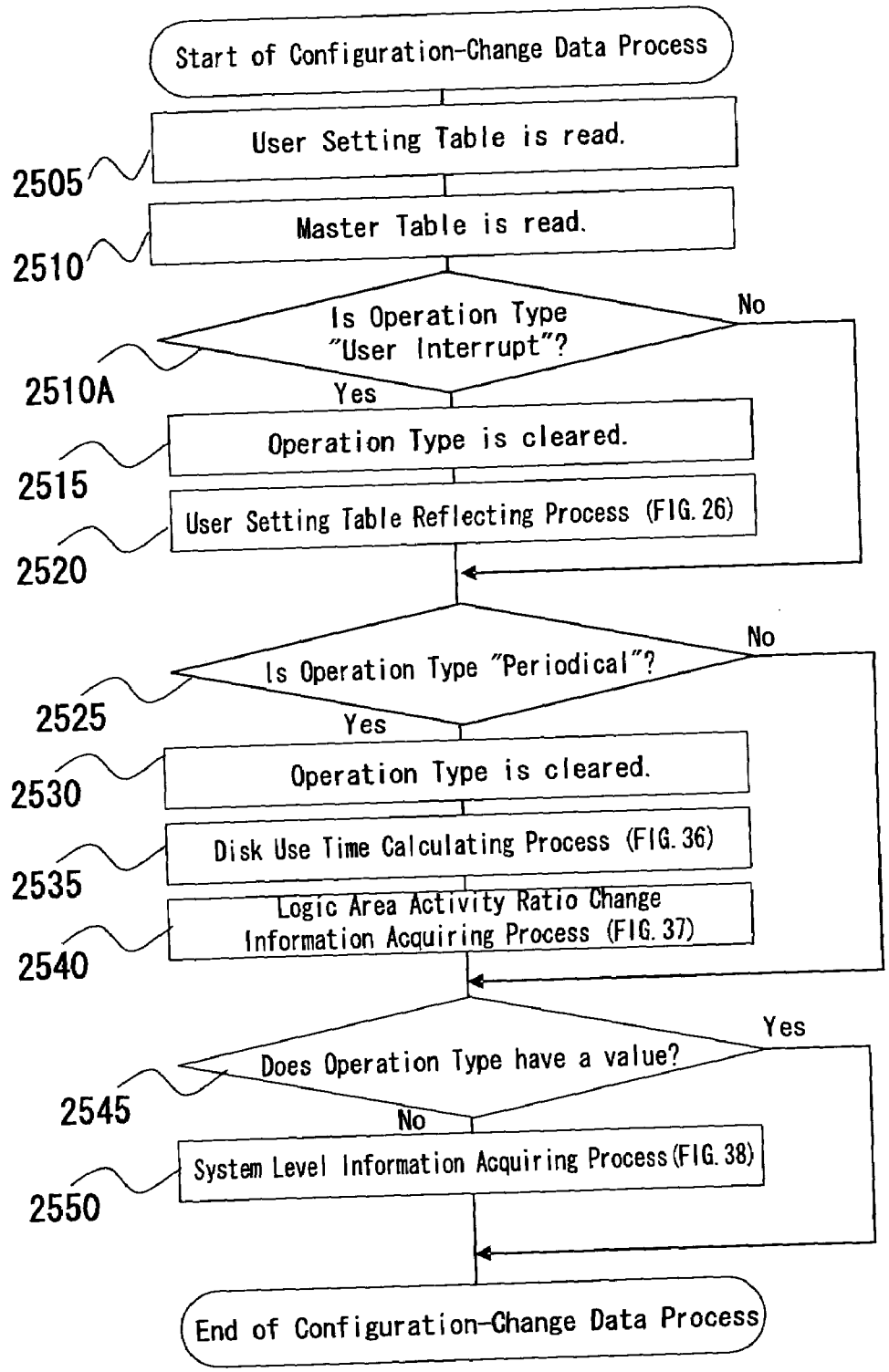
FIG. 25 is a flow chart showing a configuration change data process.

FIG. 25 is a flow chart showing a configuration change data process in the step 1510.

In the step 2505, the user setting table 103 is read.

In the step 2510, the master table 101 is read.

In the step 2510A, it is judged whether the operation type (refer to FIG. 5) of the system information in the master table 101 corresponding to the user setting table 103 is "user interrupt".

As a result of the judgment, when it is not "user interrupt" (No as shown in step 2510A), the process proceeds to the step 2525. When it is "user interrupt" (Yes as shown in step 2510A), the operation type is cleared (step 2515) and a user setting table reflecting process (step 2520) is executed, and the process proceeds to the step 2525.

In the step 2525, it is judged whether the operation type (refer to FIG. 5) of the system information in the master table 101 is "periodical." As a result of the judgment, when it is not "periodical" (No as shown in step 2525), the process proceeds to the step 2545. When it is "periodical" (Yes as shown in step 2525), the operation type is cleared (step 2530) and a disk use time calculating process (refer to FIG. 36) is executed (step 2535). Then, the process proceeds to the step 2545 after a logic area activity ratio change information acquiring process (refer to FIG. 37) is executed (step 2540).

In the step 2545, when the value of the operation type is valid (Yes as shown in step 2545), the configuration change data process ends. In contrast, when the value of the operation type is invalid (No as shown in step 2545), the system level information acquiring process (refer to FIG. 38) is executed (step 2550) and then the configuration change data process ends.

Figure 26:
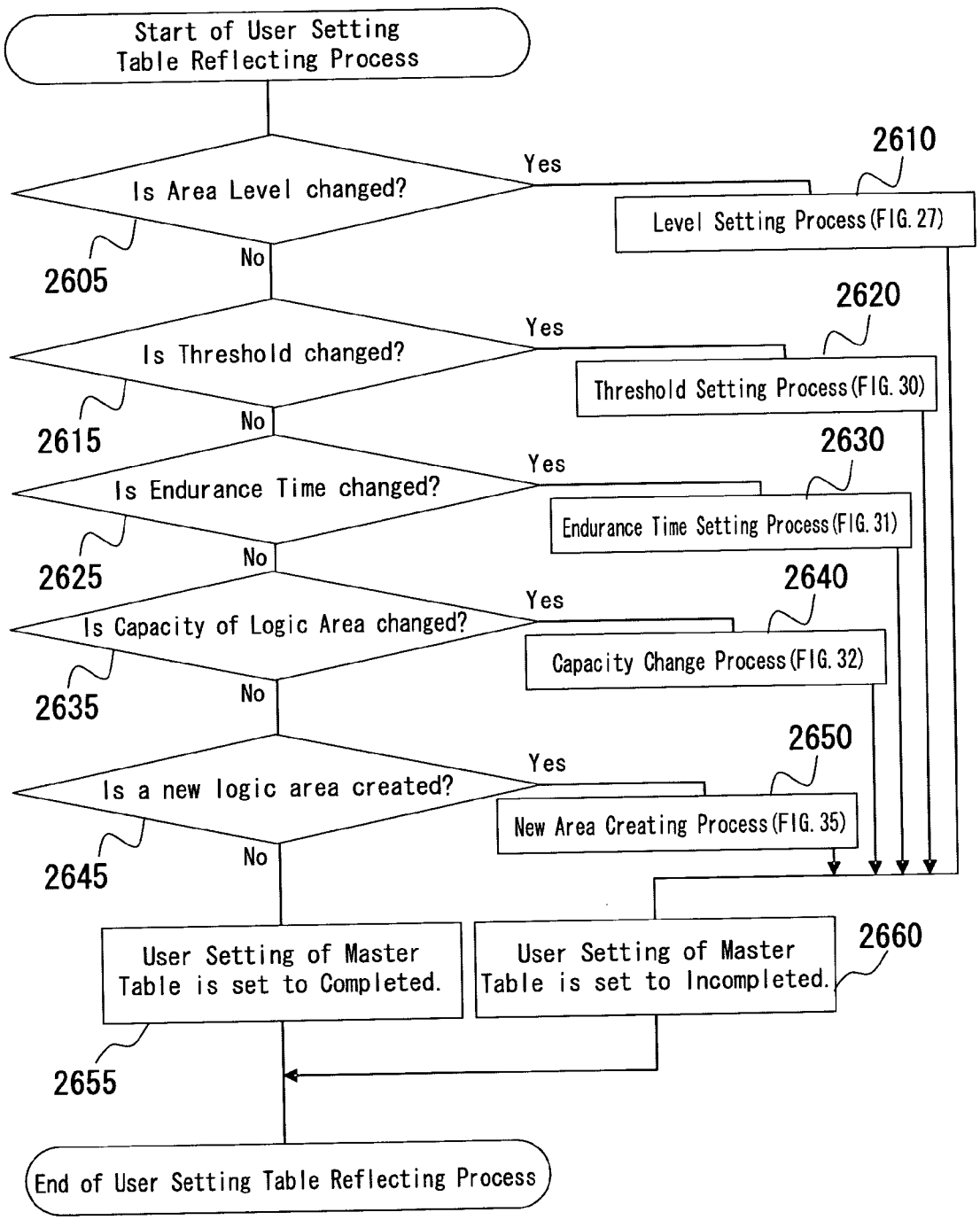
FIG. 26 is a flow chart showing a user setting table reflecting process.

FIG. 26 is a flow chart showing a user setting table reflecting process (FIG. 25) in the step 2520.

In the step 2605, it is determined whether any of the area levels (refer to FIG. 5 and FIG. 7) in the master table 101 and the user setting table 103 is changed by comparing corresponding area levels between the master table 101 and the user setting table 103. As a result, when any change in area level is made (Yes in the step 2605), a level setting process is executed (step 2610), and the process proceeds to the step 2660. In contrast, when area levels are not changed (No in the step 2605), it is judged whether any of thresholds (refer to FIG. 5 and FIG. 7) of the activity ratios in the master table 101 and the user setting table 103 is changed (step 2615).

When a threshold is changed, (Yes as shown in step 2615), a threshold setting process is executed (step 2620) and proceed to the step 2660. In contrast, when they are not changed (No in the step 2615), it is judged whether any of the endurance times (refer to FIG. 5 and FIG. 7) in the master table 101 and the user setting table 103 is changed (step 2625). As a result, when any change in endurance times is made (Yes in the step 2625), the endurance time setting process (refer to FIG. 31) is executed (step 2630) and proceed to the step 2660. In contrast, when any change is not made (No in the step 2625), it is judged whether any of the capacities of the logic areas (refer to FIG. 5 and FIG. 7) in the master table 101 and the user setting table 103 is changed (step 2635).

When any change in the capacities of the logic areas is made (Yes in the step 2635), a capacity change process (refer to FIG. 32) is executed (step 2640) to proceed to the step 2660. In contrast, when any change is not made (No in the step 2635), it is judged whether a new logic area which is not found in the master table 101 is created in the user setting table 103 (step 2645). As a result, when it is determined that the new logic area is to be created (Yes in the step 2645), a new area creating process (refer to FIG. 35) is executed (step 2650) and proceed to the step 2660. When it is determined that the logic area is not to be created (No in the step 2645), the user setting of system information in the master table 101 (refer to FIG. 5) is set to Completed (step 2655).

In the step 2660, the user setting of system information in the master table 101 (refer to FIG. 5) is set to Incompleted. Then, the user setting table reflecting process ends.

Figure 27:
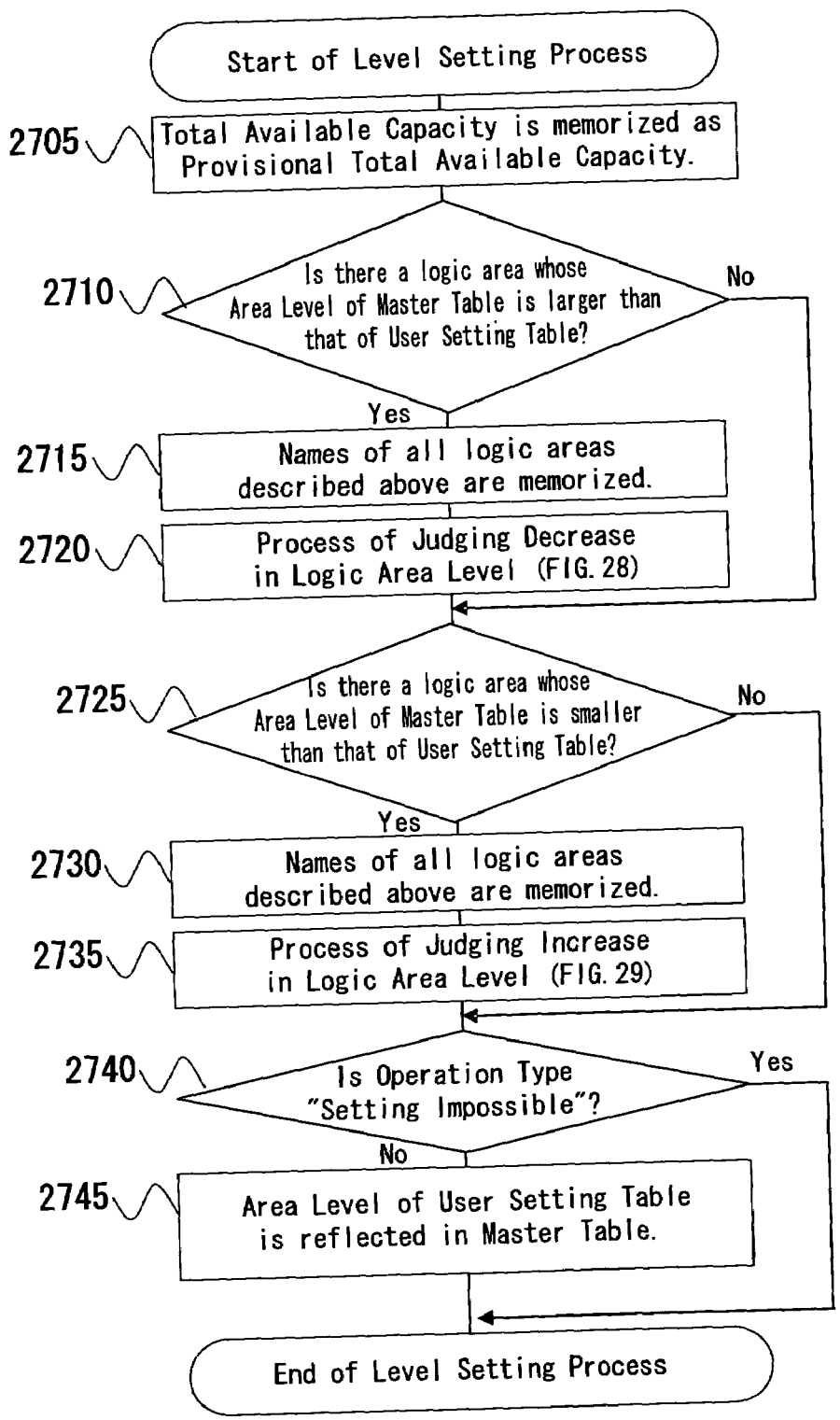
FIG. 27 is a flow chart showing a level setting process.

FIG. 27 is a flow chart showing a level setting process of the step 2610 (FIG. 26).

In the step 2705, the previously described total available capacity (refer to FIG. 20) is memorized as a provisional total available capacity.

In the step 2710, it is judged whether there is a logic area whose area level of the master table 101 is larger than that of the user setting table 103. As a result, when there is such logic area (Yes in the step 2710), names of all the concerned logic areas are memorized (step 2715), and a process of judging decrease in the logic area level is executed (step 2720) and the process proceeds to the step 2725. When there is not such logic area (No as shown in step 2710), the process proceeds to the step 2725.

In the step 2725, when there is a logic area whose area level of the master table 101 is smaller than the area level of the user setting table 103 (Yes), names of all the concerned logic areas are memorized (step 2730), and a process of judging increase in the logic area level (refer to FIG. 29) is executed (step 2735) and the process proceeds to the step 2740. When there is not such logic area (No as shown in step 2725), the process proceeds to the step 2740.

In the step 2740, it is judged whether the operation type in the master table 101 is "setting impossible." As a result of judgment, when it is not "setting impossible" (No as shown in step 2740), the area level of the user setting table 103 is reflected in the master table 101. Then, the level setting process ends.

In contrast, when the operation type is "setting impossible" (Yes in the step 2740), the level setting process ends.

Figure 28:
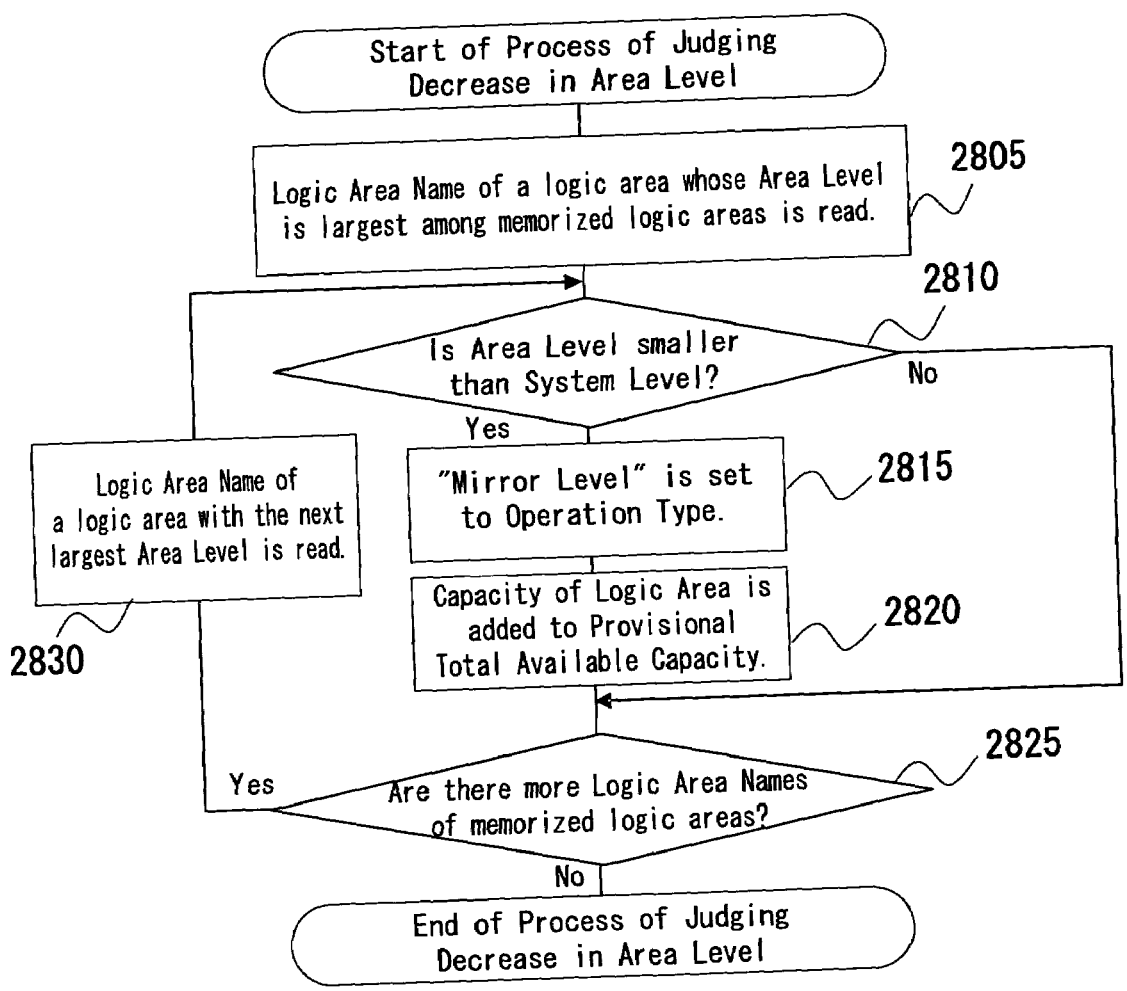
FIG. 28 is a flow chart showing a process of judging a decrease in the logic area level.

FIG. 28 is a flow chart showing a process of judging decrease in the logic area level (FIG. 27) of the step 2720.

In the step 2805, a logic area name of a logic area with a maximum area level is read from the logic area names memorized in the step 2715 (refer to FIG. 27).

In the step 2810, it is judged whether an area level in the master table 101 of the logic area corresponding to the thus read logic area name is below the system level (refer to FIG. 5). As a result of the judgment, when the area level is above the system level (No in the step 2810), the process proceeds to the step 2825. In contrast, when the area level is below the system level (Yes in the step 2810), the operation type (refer to FIG. 5) in the master table 101 is set to "mirror level" (step 2815), the size of the corresponding logic area is added to the provisional total available capacity, and the process proceeds to the step 2825.

In the step 2825, it is judged whether any more memorized logic area names are available (namely, whether all the logic areas for all the memorized logic area names have been processed). As a result of the judgment, when more memorized logic area names are available (Yes in the step 2825), a logic area name of a logic area with the next largest area level is read (step 2830). In contrast, when no more memorized logic area name is available (No in the step 2825), the process of judging decrease in the logic area level ends.

Figure 29:
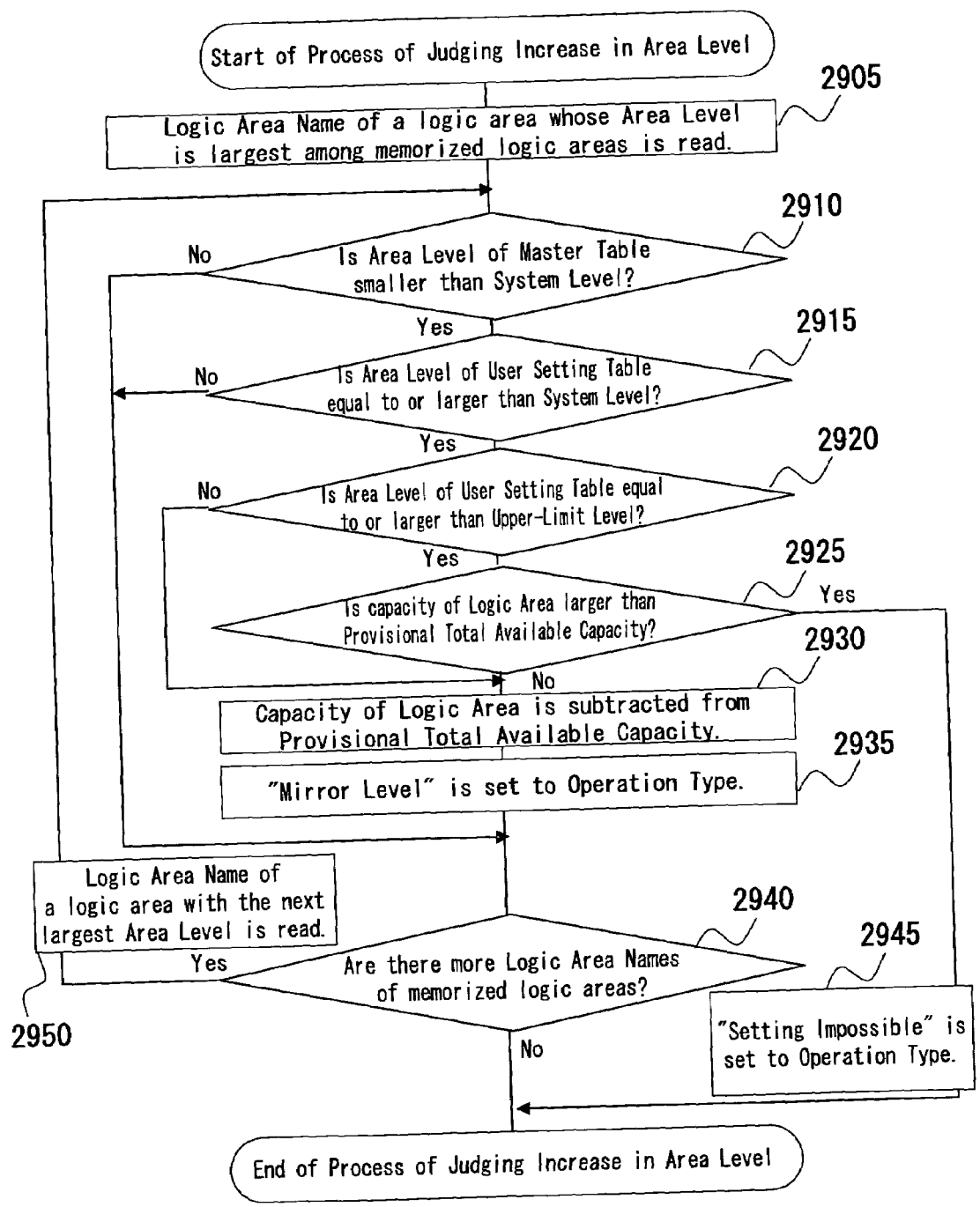
FIG. 29 is a flow chart showing a process of judging an increase in the logic area level.

FIG. 29 is a flow chart showing a process of judging increase in the logic area level (FIG. 27) in the step 2735.

In the step 2905, a logic area name of a logic area with a maximum area level is read from the logic area names memorized in the step 2730.

In the step 2910, it is judged whether an area level in the master table 101 (refer to FIG. 5) of the logic area corresponding to the thus read logic area name is below the system level. As a result of the judgment, when the area level is below the system level (Yes as shown in step 2910) and the area level (refer to FIG. 7) in the user setting table 103 is above the system level in the master table 101 (Yes as shown in step 2915), the process proceeds to the step 2920.

In the step 2920, regarding the thus read logic area name, when an area level of the user setting table 103 is above the upper-limit level of the master table 101 (Yes as shown in step 2920) and the capacity of the logic area is larger than a provisional total available capacity (Yes in the step 2925), the operation type (refer to FIG. 5) in the master table 101 is set to "setting impossible" (step 2945), and then the process of judging increase in the logic area level ends.

In the step 2930, a size of the logic area is subtracted from the provisional total available capacity, the operation type (refer to FIG. 5) in the master table 101 is set to "mirror lever" (step 2935), and the process proceeds to the step 2940.

In the step 2940, it is judged whether any more memorized logic area names are available. As a result of the judgment, when more memorized logic area names are available (Yes as shown in step 2940), a logic area name of a logic area with the next largest area level is read (step 2950), the process returns to the step 2910, and the logic area with the next largest area level is similarly processed. In contrast, when no more memorized logic area name is available (No as shown in step 2940), the process of judging increase in the logic area level ends.

Figure 30:
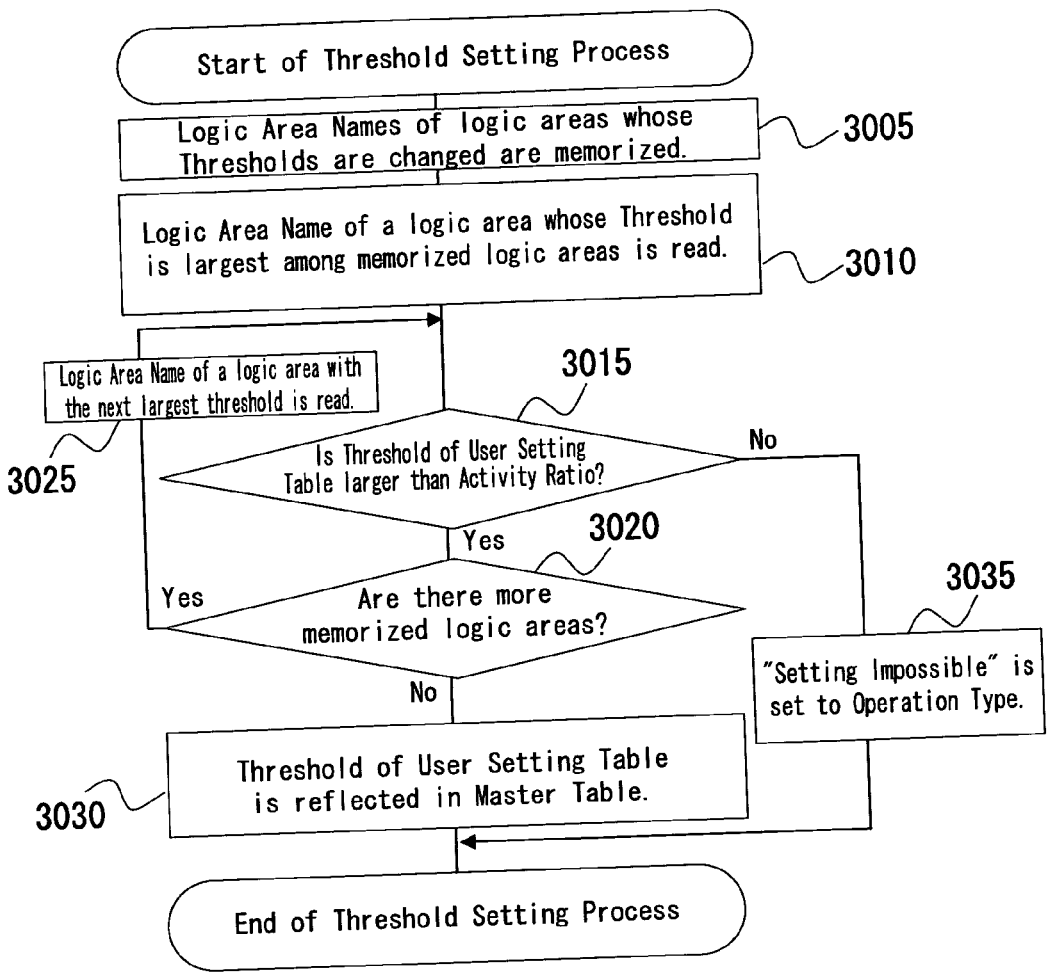
FIG. 30 is a flow chart showing a threshold setting process.

FIG. 30 is a flow chart showing a threshold setting process (FIG. 26) in the step 2620. In this process, logic area names are processed in decreasing order of thresholds of activity ratios.

In the step 3005, logic area names of logic areas whose thresholds are changed in the user setting table 103 (refer to FIG. 7) are memorized.

In the step 3010, a logic area name of a logic area with the largest threshold among memorized logic area names is read.

In the step 3015, when a threshold of the user setting (user setting table 103) is smaller than the activity ratio (refer to FIG. 4: currently available one) in the master table 101 (No as shown in step 3015), "setting impossible" is set to the operation type in the master table 101 (step 3035), and then the threshold setting process ends. In contrast, when the threshold is larger (Yes as shown in step 3015) and a next memorized logic area name (logic area name of a logic area with the next largest threshold) is available (Yes in the step 3020), the next memorized logic area name is read (step 3025), the process returns to the step 3015, and the concerned logic area is processed similarly. Thus, all the memorized logic area names are processed as described above. When no more memorized logic area names are available (No in the step 3020), the thresholds of the user setting table 103 are reflected to the thresholds of the activity ratios in the master table 101 (step 3030), and then the threshold setting process ends.

Figure 31:
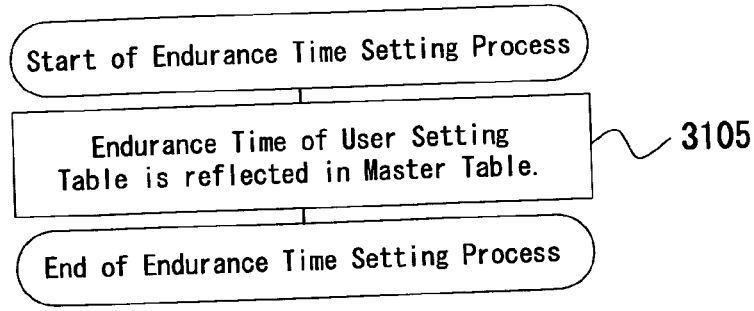
FIG. 31 is a flow chart showing an endurance time setting process.

FIG. 31 is a flow chart showing an endurance time setting process (FIG. 26) in the step 2630.

In the step 3105, an endurance time of the user setting table 103 is reflected to the endurance time (refer to FIG. 5) of the disk information in the master table 101, and then the endurance time setting process ends.

Figure 32:
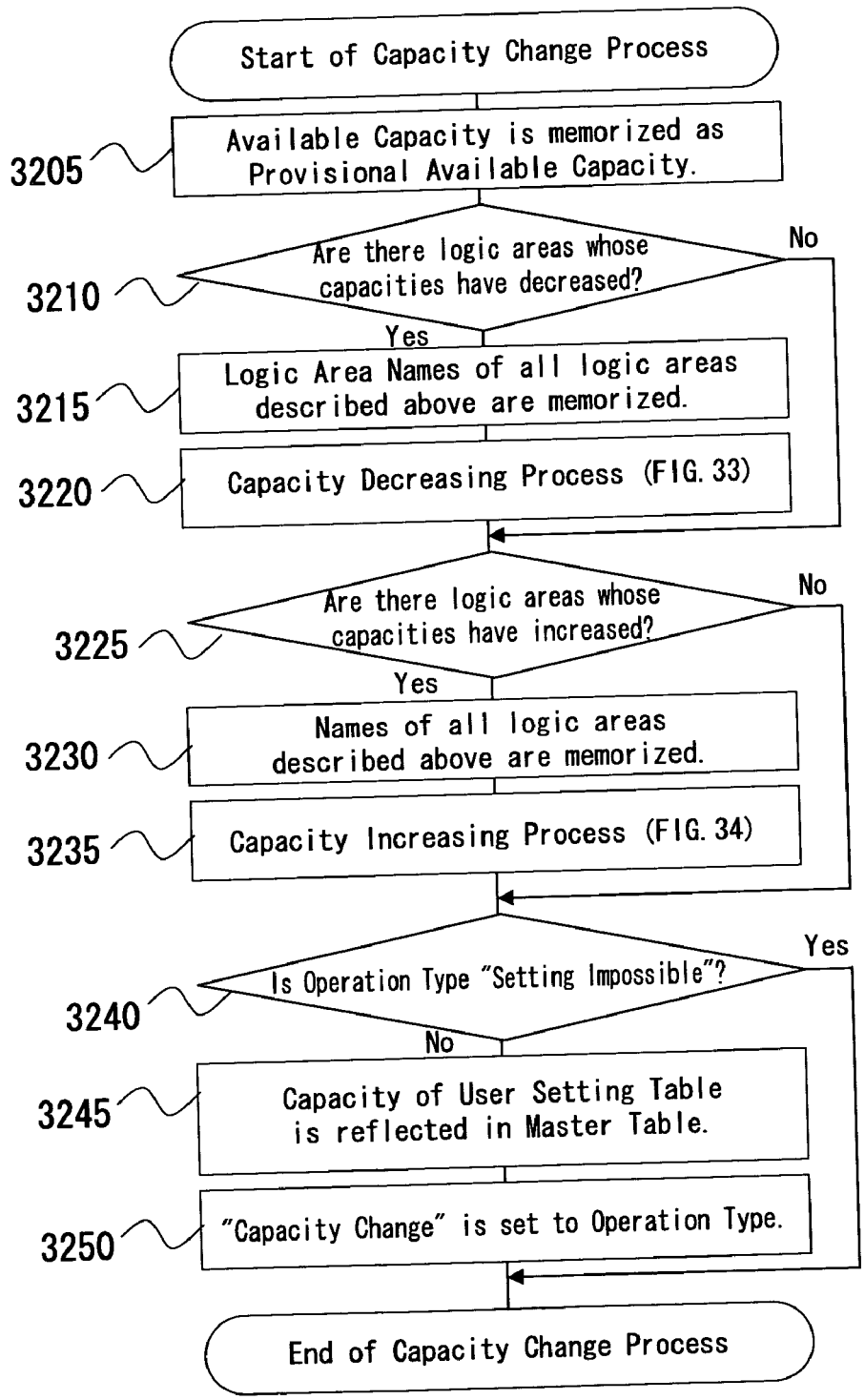
FIG. 32 is a flow chart showing a capacity change process.

FIG. 32 is a flow chart showing a capacity change process (FIG. 26) in the step 2640.

In the step 3205, the previously described available capacity (refer to FIG. 19) is memorized as a provisional available capacity.

In the step 3210, it is judged whether there is any logic area whose capacity has decreased. When there is no such logic area (No in the step 3210), the process proceeds to the step 3225. When there is such logic area (Yes in the step 3210), names of all the concerned logic areas are memorized (step 3215) and a capacity decreasing process (refer to FIG. 33) is executed (step 3220).

In the step 3225, it is judged whether there is a logic area whose capacity has increased. When there is no such logic area (No in the step 3225), the process proceeds to the step 3240. In contrast, when there is such logic area (Yes in the step 3225), names of all the concerned logic areas are memorized (step 3230) and a capacity increasing process (refer to FIG. 34) is executed (step 3235).

In the step 3240, it is judged whether the operation type (refer to FIG. 5) in the master table 101 is "setting impossible." When it is "setting impossible" (Yes as shown in step 3240), a capacity change process ends. When it is not "setting impossible" (No in the step 3240), the capacity of logic area in the user setting table 103 (refer to FIG. 7) set by a user is reflected in the master table 101 (step 3245), "capacity change" is set (step 3250) to the operation type in the master table 101 (refer to FIG. 5), and then the capacity change process ends.

Figure 33:
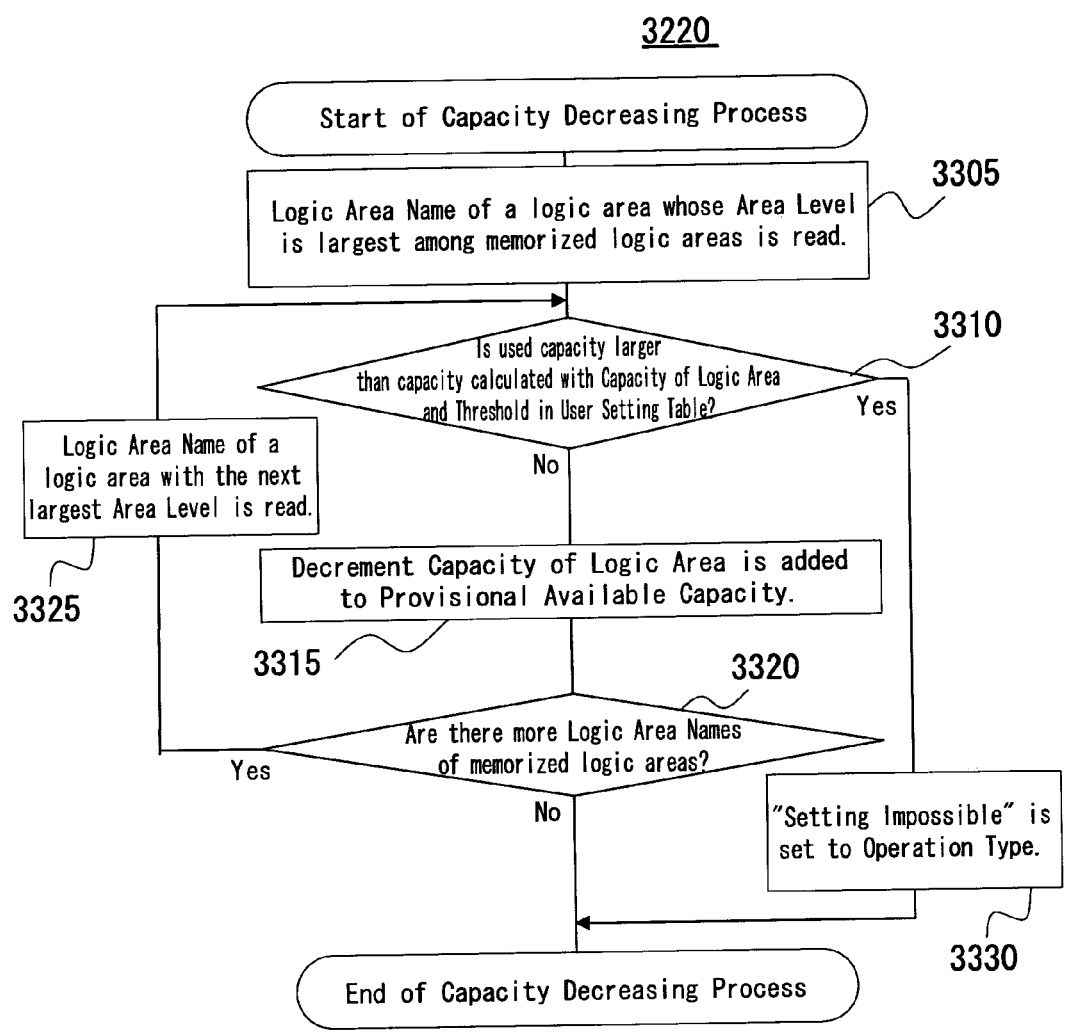
FIG. 33 is a flow chart showing a capacity decreasing process.

FIG. 33 is a flow chart showing a capacity decreasing process (FIG. 32) in the step 3220.

In the step 3305, a logic area name of a logic area whose area level is maximum among the logic area names memorized in the step 3215 (refer to FIG. 32) is read from the user setting table 103 (refer to FIG. 7).

In the step 3310, regarding the thus read logic area name, the currently in-use capacity of the logic area (the capacity calculated from the activity ratio of the master table 101) is compared with the capacity of logic area acquired from the capacity of logic area and the threshold set in the user setting table 103 (the capacity acquired from the set capacity and threshold: the capacity after setting). As a result of the comparison, when the currently in-use capacity is larger than the thus acquired capacity (Yes in the step 3310), "setting impossible" is set to the operation type in the master table 101 (step 3330), and the capacity decreasing process ends.

In contrast, when the currently in-use capacity is smaller (No in the step 3310), a decrement capacity of logic area (difference between the currently in-use capacity and the capacity after setting) is added to the previously described provisional available capacity (step 3315).

In the step 3320, it is judged whether any more memorized logic area names are available. If more memorized logic area names are available (Yes as shown in step 3320), a logic area name of a logic area with the next largest area level is read (step 3325), the process returns to the step 3310, and the logic area is processed. In contrast, when no more memorized logic area name is available (No as shown in step 3320), the capacity decreasing process ends.

Figure 34:
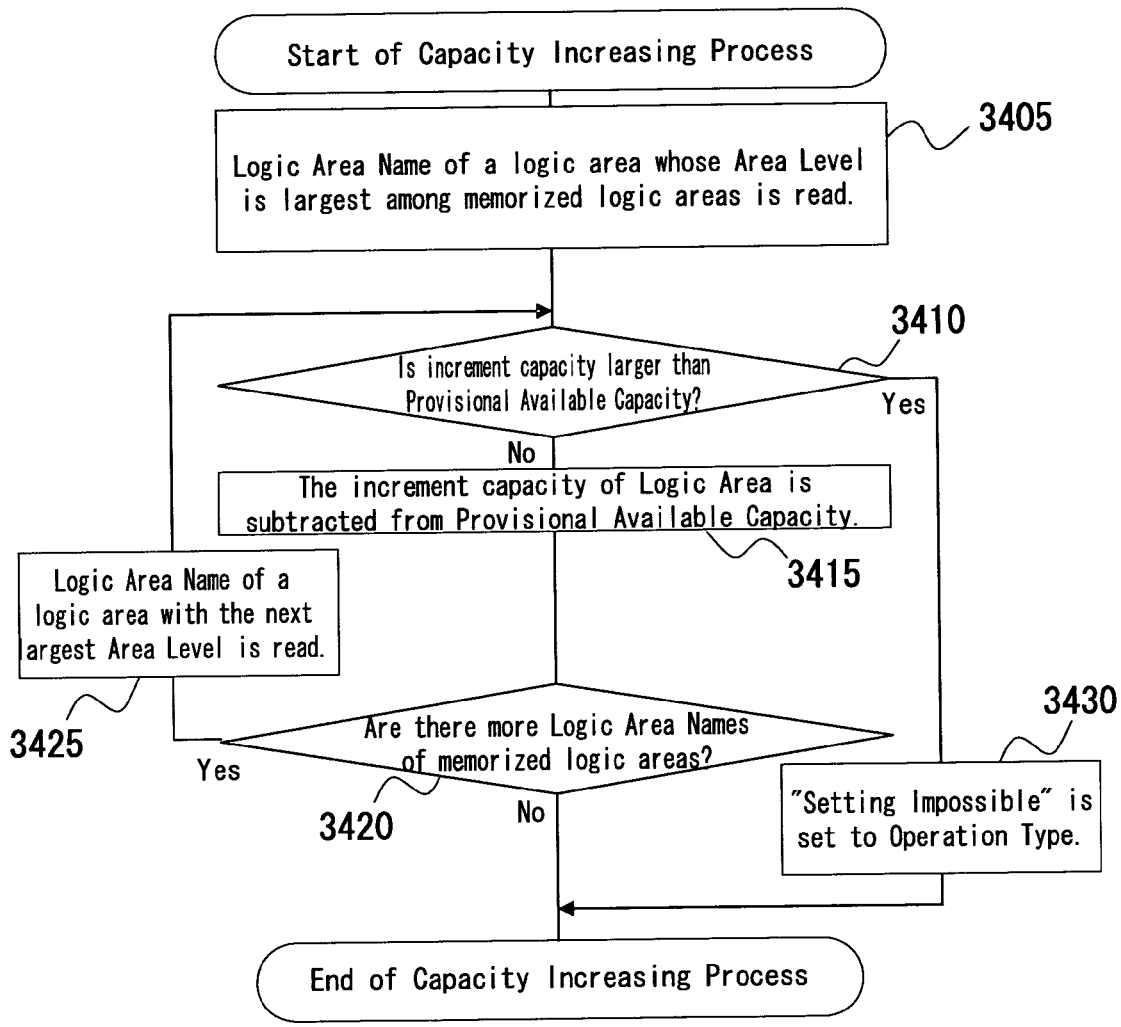
FIG. 34 is a flow chart showing a capacity increasing process.

FIG. 34 is a flow chart showing a capacity increasing process (FIG. 32) in the step 3235.

In the step 3405, a logic area name of a logic area whose area level is maximum among the logic area names memorized in the step 3215 (refer to FIG. 32) is read from the user setting table 103.

In the step 3410, regarding the thus read logic area name, the capacity of logic area in the master table 101 is compared with that of logic area in the user setting table 103 to judge whether an increment capacity of logic area is larger than a provisional available capacity. As a result, when the increment capacity of logic area is larger (Yes in the step 3410), "setting impossible" is set to the operation type in the master table 101(step 3430), and then the capacity increasing process ends. In contrast, when the increment capacity of logic area is smaller (No in the step 3410), an increment capacity of logic area is subtracted from the provisional available capacity (step 3415) and the process proceeds to the step 3420.

In the step 3420, it is judged whether any more memorized logic area names are available. If more memorized logic area names are available (Yes as shown in step 3420), a logic area name of a logic area with the next largest area level is read (step 3425), the process returns to the step 3410, and the logic area is processed. In contrast, when no more memorized logic area name is available (No as shown in step 3420), the capacity increasing process ends.

Figure 35:
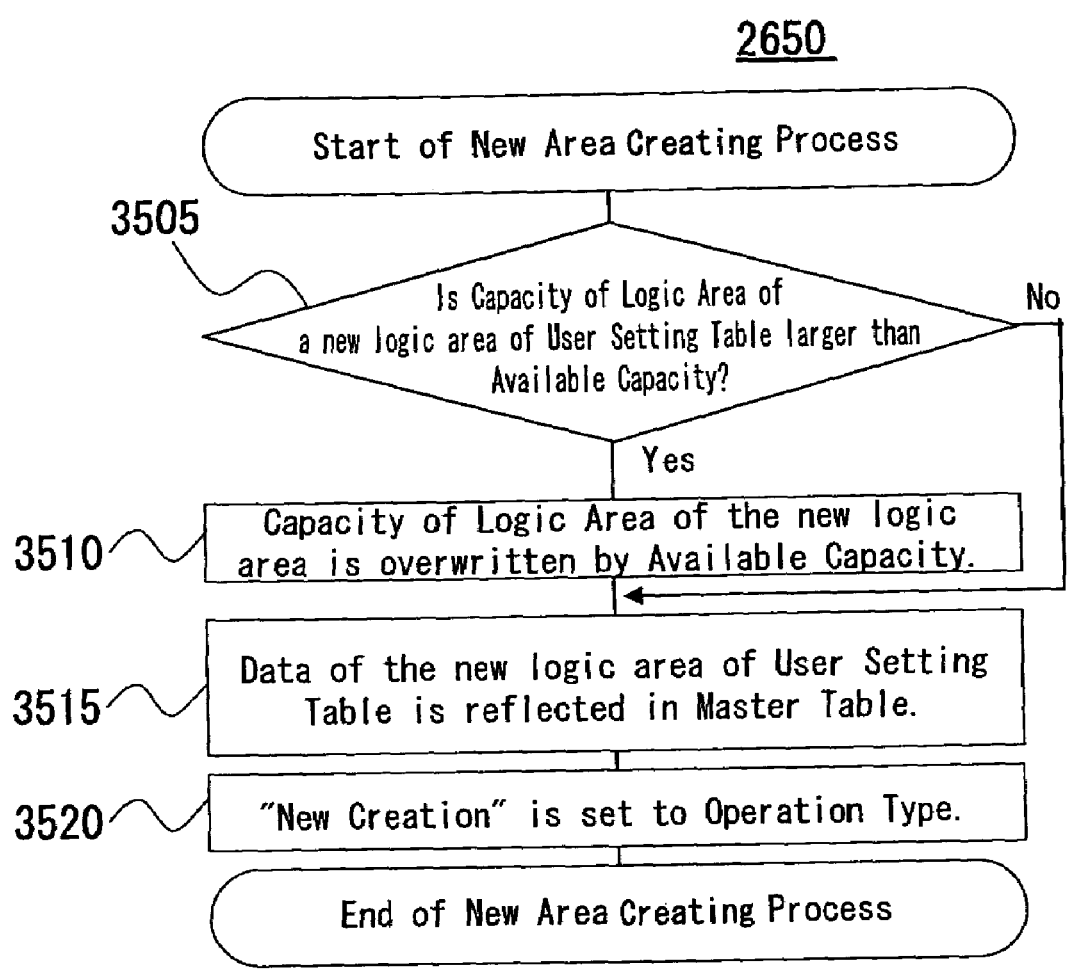
FIG. 35 is a flow chart showing a new area creating process.

FIG. 35 is a flow chart showing a process of new area creating (FIG. 26) in the step 2650.

In the step 3505, on receipt of Yes (refer to FIG. 26) from the step 2645, when a new area (a capacity of logic area) in the user setting table 103 (refer to FIG. 7) is larger than an available capacity (Yes as shown in step 3505), the capacity of the new area is overwritten by the available capacity (step 3510), data of the new area in the user setting table 103 (values of the user logic area information and the user disk information) are reflected (step 3515) in the master table 101 (refer to FIG. 5 and FIG. 6), and "new creation" is set to the operation type (refer to FIG. 5) in the master table 101 (step 3520), and then the process of creating a new area ends.

Figure 36:
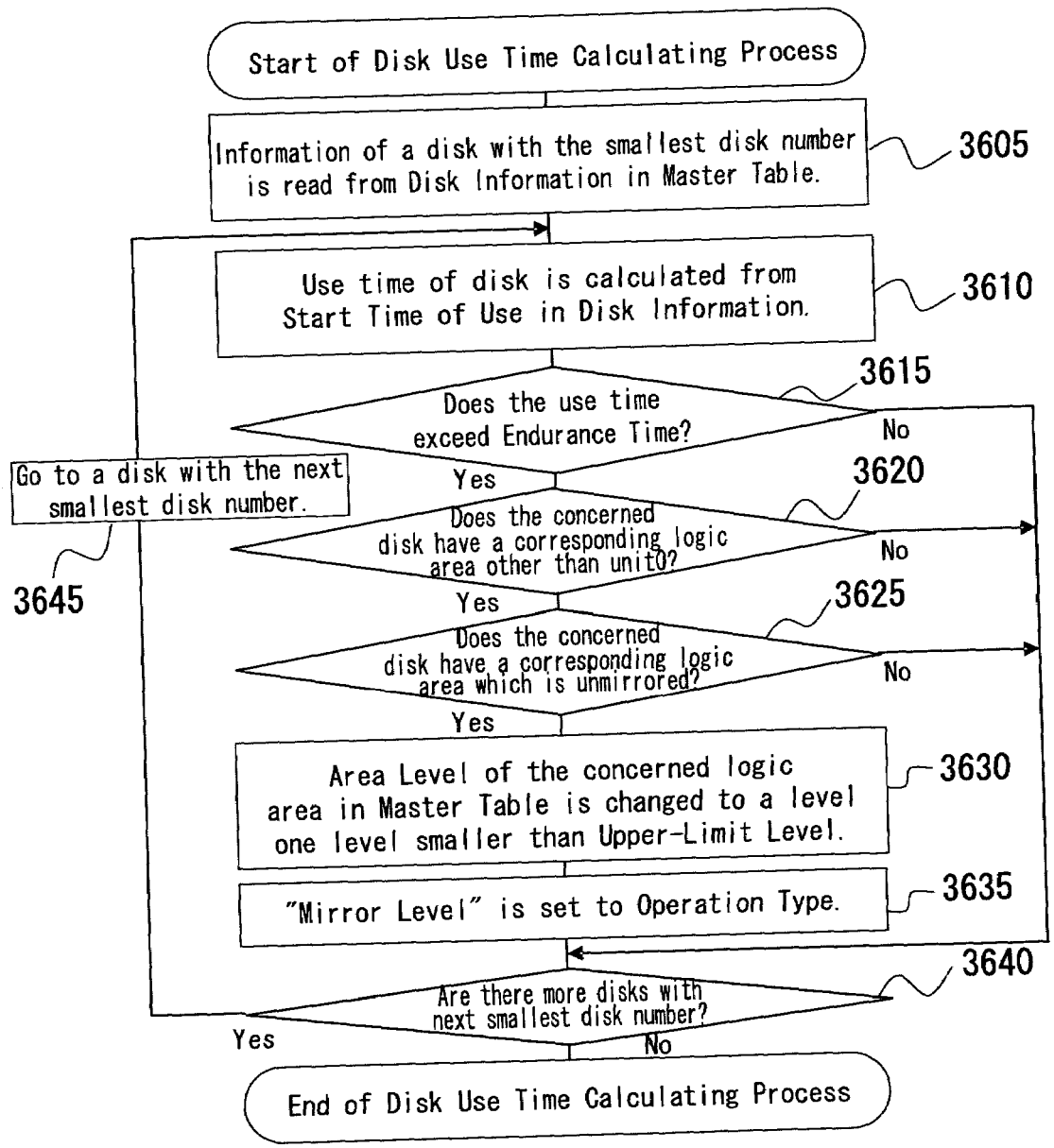
FIG. 36 is a flow chart showing a disk use time calculating process.

FIG. 36 is a flow chart showing a disk use time calculating process (FIG. 25) in the step 2535. In the disk use time calculating process, the disk use time is calculated from the start time of use in the master table 101 for the all disks in increasing order of the disk number.

In the step 3605, disk information of a disk with the smallest disk number (values of start time of use, endurance time, and use time) is read from the disk information (refer to FIG. 5) in the master table 101.

In the step 3610, use time of the disk (time accumulated up to the present time) is calculated from the time when the disk starts to be used shown in the start time of use in the read disk information.

When the concerned disk is used beyond the endurance time (Yes as shown in step 3615), the concerned disk corresponds to a logic area other than Unit 0 (Yes as shown in step 3620), and the corresponding logic area is not mirrored (Yes as shown in step 3625), the area level of the corresponding logic area in the master table 101 is changed to one level below the upper-limit level (for example 5→4) (step 3630).

In the step 3635, "mirror level" is set to the operation type in the master table 101 and the process proceeds to the step 3640. Further, when No is shown in the step 3615, step 3620 or step 3625, the process proceeds to the step 3640.

In the step 3640, it is judged whether a next disk is available in the disk information of the master table 101 (step 3640). If it is available (Yes in the step 3640), the process proceeds to the step 3610 and the next disk is processed. When it is not available (No as shown in step 3640), a disk use time calculating process ends.

Figure 37:
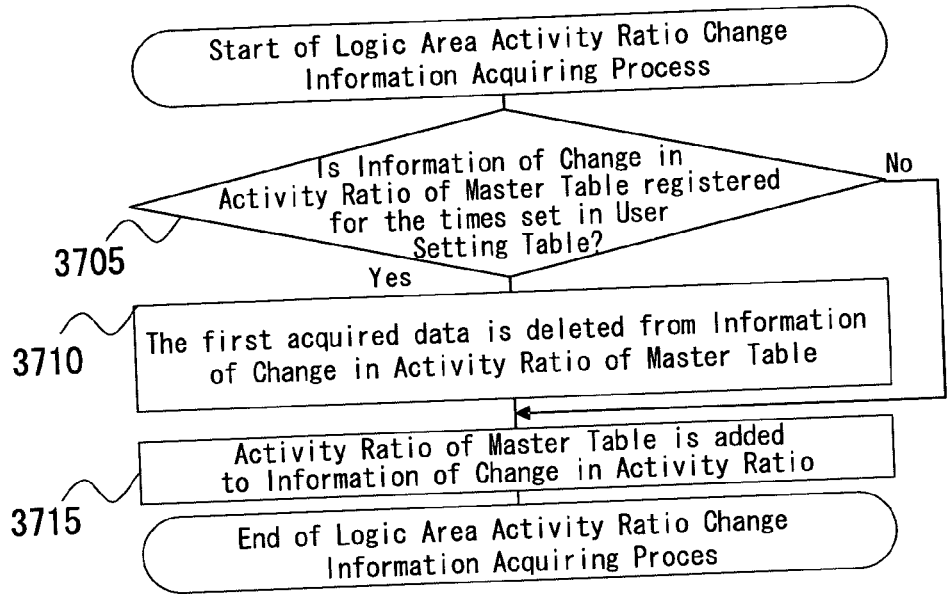
FIG. 37 is a flow chart showing logic area information of change (statistics) in activity ratios acquiring process.

FIG. 37 is a flow chart showing logic area activity ratio change information acquiring process (FIG. 25) in the step 2540.

In the step 3705, it is judged whether the information of change in activity ratios in the master table 101(refer to FIG. 6) has been registered for the number of times to log the information of change in the activity ratio (namely, how many times to store information of change in activity ratios, set by a user) specified in the user setting table 103. If it has been registered for the number of times (Yes as shown in step 3705), the first acquired data from the information of change in activity ratios of the master table 101, that is, a value of the activity ratio of the previously registered in the master table 101 is deleted and the process proceeds to the step 3715. When it is not been registered for the number of times (No in the step 3705), the process proceeds to the step 3715.

In the step 3715, the activity ratio of the master table 101 is reflected in the value of the information of change in activity ratios (in other words, the activity ratio of the master table 101 is added to the information of change in activity ratios). And then, the process ends.

Figure 38:
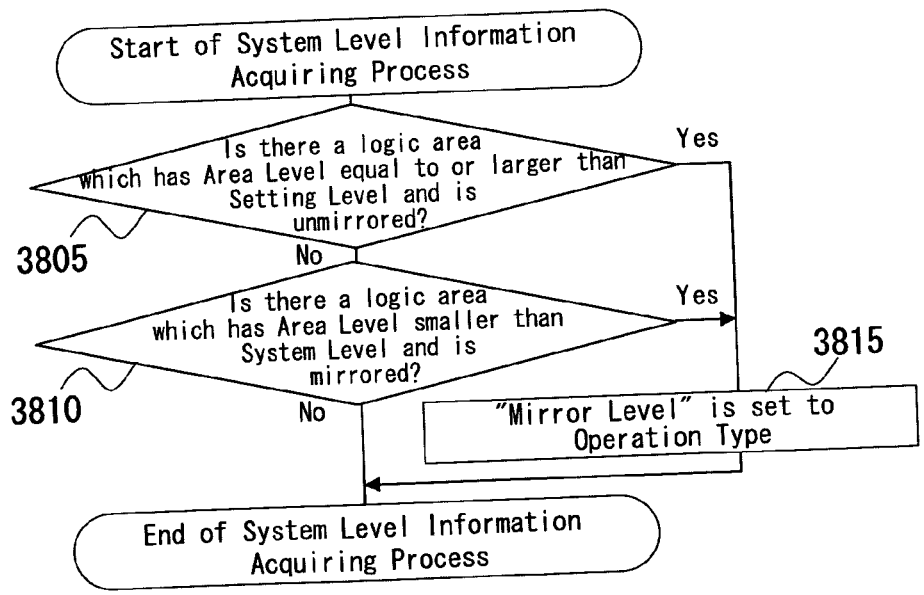
FIG. 38 is a flow chart showing a system level information acquiring process.

FIG. 38 is a flow chart showing a system level information acquiring process (FIG. 25) in the step 2550.

In the step 3805, it is judged whether there is any unmirrored logic area with an area level above the setting level. To be specific, it is judged whether there is a name of a logic area in which the area level of the master table 101 is above the setting level and the state of logic area of the master table 101 is set to Unmirrored. As a result, when such logic area is available (Yes in the step 3805), "mirror level" is set to the operation type in the master table 101 (step 3815).

In contrast, when such logic area is not available (No in the step 3805), it is judged whether there is a mirrored logic area with an area level below the system level (step 3810). To be specific, it is judged whether there is a name of a logic area in which the area level of the master table 101 is below the system level and the state of logic area of the master table 101 is set to Mirrored. As a result, when such logic area is available (Yes as shown in step 3810), the process proceeds to the step 3815, and when it is not available (No as shown in step 3810), the process ends.

Figure 39:
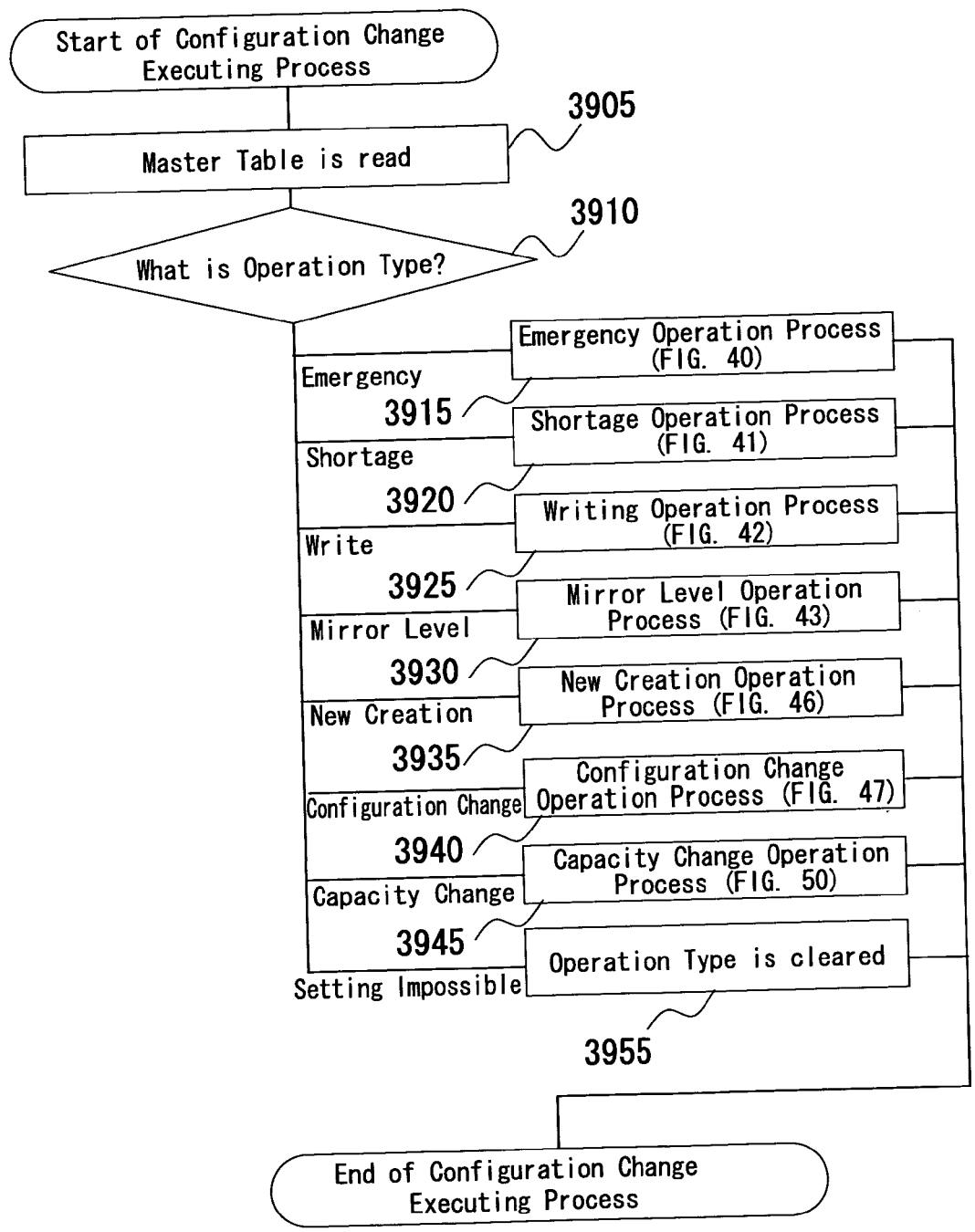
FIG. 39 is a flow chart showing a configuration change executing process.

FIG. 39 is a flow chart showing a configuration change executing process (FIG. 15) in the step 1520.

In the step 3905, the master table 101 is read.

In the step 3910, it is judged what the operation type in the master table 101 is. In the case of "emergency," an emergency operation process (refer to FIG. 40) is executed (step 3915), and in the case of "shortage," a shortage operation process (refer to FIG. 41) is executed (step 3920).

In the case of "Write," a writing operation process (refer to FIG. 42) is executed (step 3925), and in the case of "mirror level," a mirror level process (refer to FIG. 43) is executed (3930).

In the case of "new creation," a new creation operation process (refer to FIG. 46) is executed (step 3935), and in the case of "configuration change," a configuration change operation process (refer to FIG. 47) is executed (step 3940).

In the case of "capacity change," a capacity change operation process (refer to FIG. 50) is executed (step 3945), and in the case of "setting impossible," the operation type in the master table 101 is cleared (step 3955). As described above, the configuration change operation process ends after a process is executed according to the value of the operation type.

Figure 40:
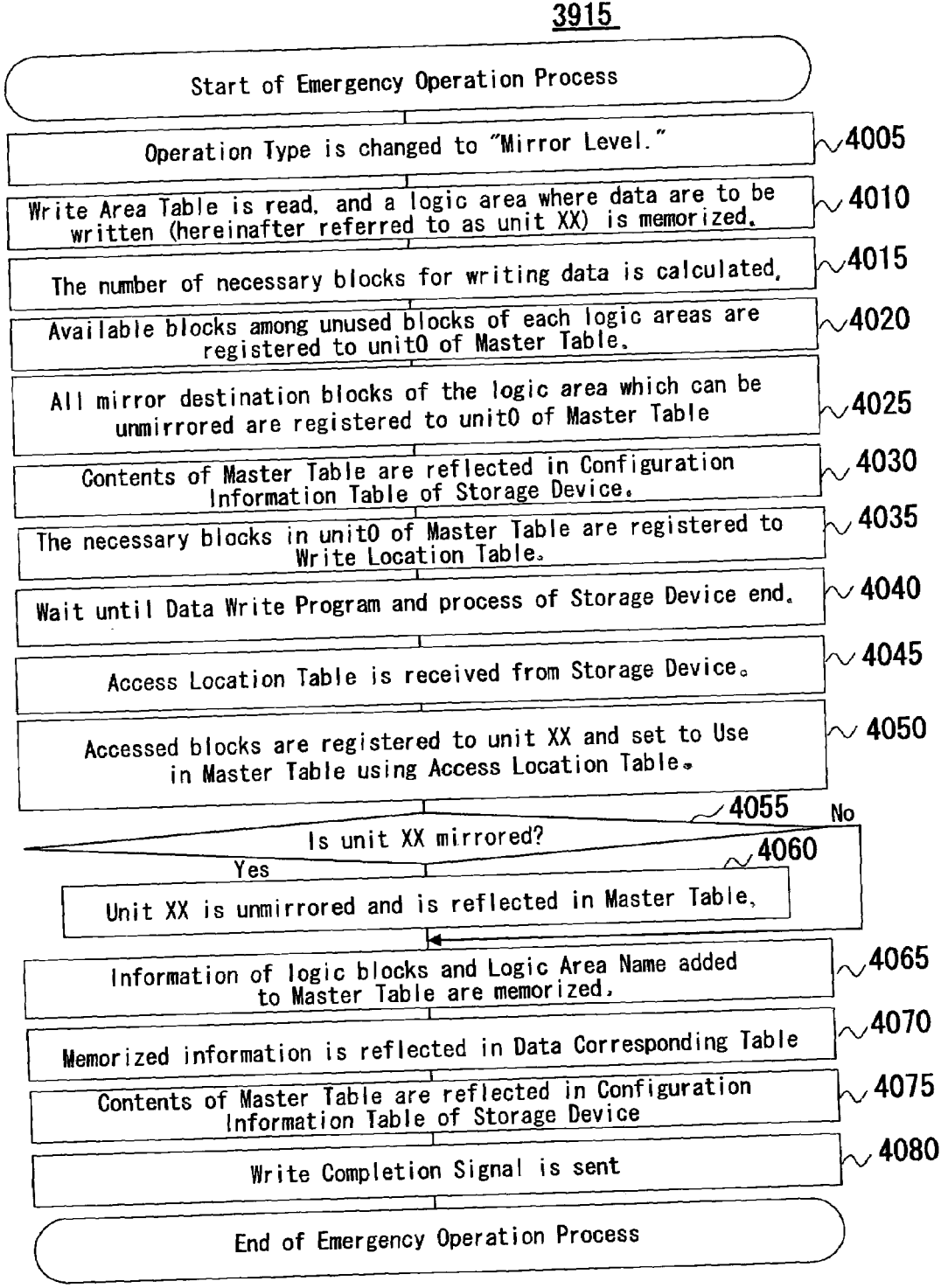
FIG. 40 is a flow chart showing an emergency operation process.

FIG. 40 is a flow chart showing an emergency operation process (FIG. 39) in the step 3915.

In the step 4005, the operation type in the master table 101 is changed to "mirror level."

In the step 4010, the write area table 105 (refer to FIG. 8) is then read, and a logic area name of a logic area (for example, XX) where data are to be written stored in the logic area name of the table 105 is memorized.

In the step 4015, the number of necessary blocks of the logic area for writing the data is calculated from the data size.

In the step 4020, with reference to the corresponding block information (refer to FIG. 6) in the master table 101, the available number of unused blocks (logic blocks whose use statuses are Unuse) in each logic area are registered in Unit 0 of the corresponding block information in the master table 101.

In the step 4025, all mirror destination blocks of logic areas possible to be unmirrored are registered in Unit 0 of the corresponding block information in the master table 101.

In the step 4030, contents of the master table 101 are reflected in the configuration information table 305 (refer to FIG. 14) of the storage device 3. To be specific, the management server 5 sends the contents of the master table 101 via LAN to the storage device 3, and the storage device 3 updates the contents of the configuration information table 305 with the contents of the master table 101.

In the step 4035, the necessary number of logic blocks with logic block numbers of Unit 0 in the master table 101 are registered in the write location table 107.

In the step 4040, the process waits until the data write program 205 of the server 2 and the processes of the storage device 3 (the write program 311 and the program for creating access location table 315) end.

In the step 4045, the access location table 303 is received from the program for creating access location table 315 of the storage device 3, and the accessed blocks in the access location table 303 are registered in the master table 101 corresponding to the logic area name, Unit XX for example, and the use statuses are set to Use (step 4050).

In the step 4055, it is judged whether, a logic area with the logic area name, Unit XX for example, is mirrored. If it is mirrored (Yes in the step 4055), the logic area is unmirrored, and reflected in the master table 101 (step 4060). When the status of the logic area (Unit XX) is "Mirrored" in the master table 101, it is then judged to be mirrored.

In the step 4065, pairs of information of added logic blocks (logic block numbers) and the logic area name are stored in the master table 101, and the values of the pairs and the data name in the write area table 105 are added and reflected in the data corresponding table 109 (step 4070).

In the step 4075, the contents of the master table 101 are reflected in the configuration information table 305 of the storage device 3, and a write completion signal is sent to the user communication program 204 of the server 2, and then the emergency operation process ends.

Figure 41:
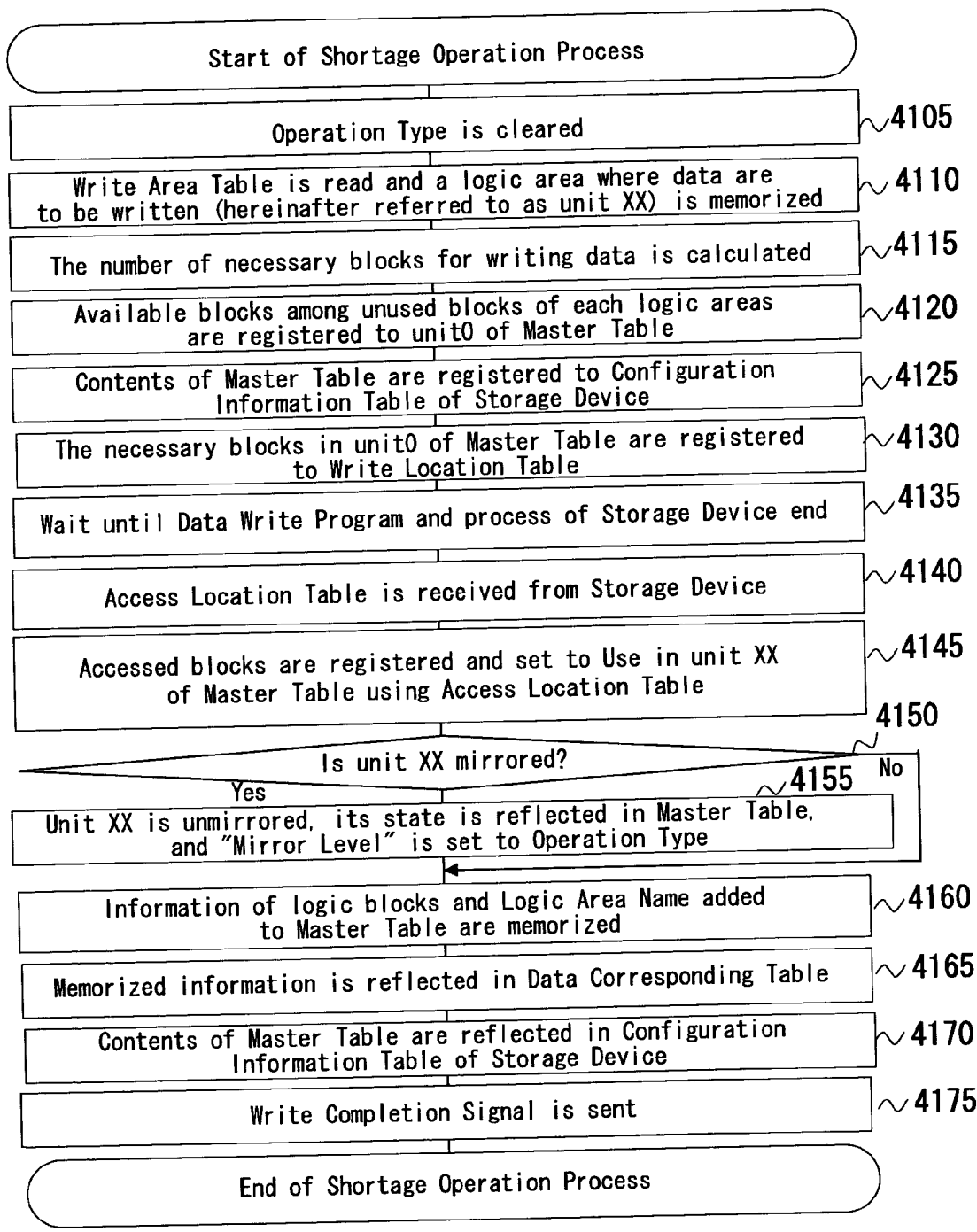
FIG. 41 is a flow chart showing a shortage operation process.

FIG. 41 is a flow chart showing a shortage operation process (FIG. 39) in the step 3920.

In the step 4105, the operation type in the master table 101 is cleared. In the step 4110, the write area table 105 is read and a logic area name of a logic area where data are to be written stored in the logic area name (for example, unit XX) of the table 105 is memorized.

In the step 4115, the number of blocks of logic areas necessary for writing the data is calculated from the data size.

In the step 4120, with reference to the corresponding block information (refer to FIG. 6) in the master table 101, the available number of unused blocks of other logic areas (logic block numbers of logic blocks whose use statuses are Unuse) are registered in Unit 0 of the corresponding block information in the master table 101.

In the step 4125, the contents of the master table 101 are registered in the configuration information table 305 (refer to FIG. 14) of the storage device 3. To be specific, the management server 5 sends the contents of the master table 101 via LAN to the storage device 3, and the storage device 3 updates the contents of the configuration information table 305 with the contents of the master table 101.

In the step 4130, the necessary number of logic blocks with logic block numbers of Unit 0 in the master table 101 are registered in the write location table 107, and a request for writing data is sent to the data write program 205 of the server 2.

In the step 4135, the process waits until the data write program 205 of the server 2 and the processes of the storage device 3 (the writing program 311 and the program for creating access location table 315) end. After they end, the access location table 303 is received via LAN from the storage device 3 (step 4140).

In the step 4145, the accessed blocks in the access location table 303 are registered in the master table 101 corresponding to the logic area name, Unit XX for example, and the use statuses are set to in-use (Use).

In the step 4150, it is judged whether the logic area with the logic area name, the unit XX for example, is mirrored. When it is mirrored (Yes as shown in step 4150), the logic area is unmirrored and reflected in the master table 101. Then, "mirror level" is set to the operation type in the master table 101 (step 4155). When the status of the logic area (unit XX) is "Mirrored" in the master table 101, the logic area is judged to be mirrored.

In the step 4160, pairs of information of added logic blocks (logic block numbers) and the logic area name are stored in the master table 101, and the values of the pairs and the data name in the write area table 105 are added and reflected in the data corresponding table 109 (step 4165).

In the step 4170, the contents of the master table 101 are reflected in the configuration information table 305 of the storage device 3. In the step 4175, a write completion signal is sent to the user communication program 204 of the server 2, and then the shortage operation process ends.

Figure 42:
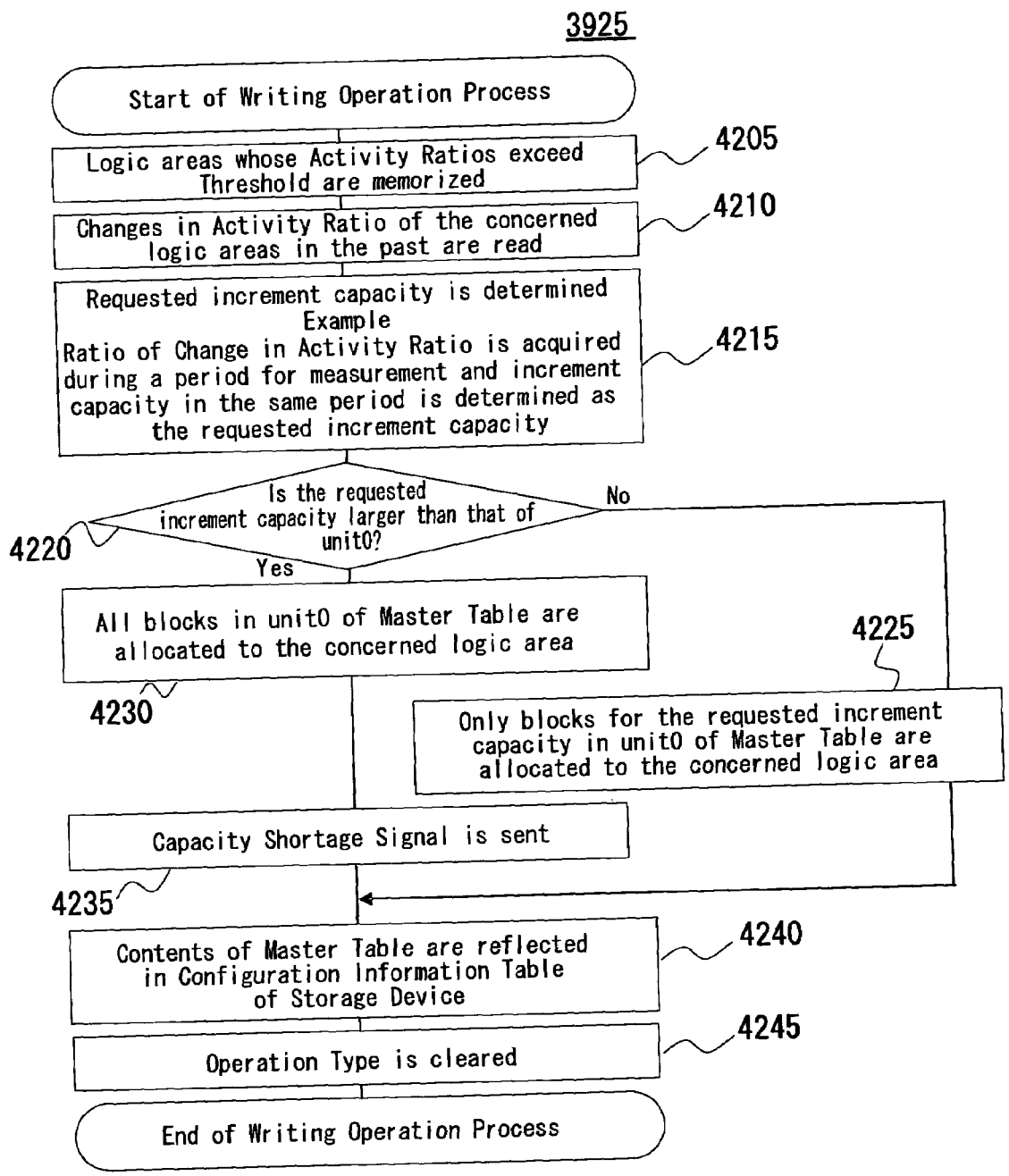
FIG. 42 is a flow chart showing a writing operation process.

FIG. 42 is a flow chart showing a writing operation process (FIG. 39) in the step 3925.

In the step 4205, the logic area names of a logic areas whose activity ratios in the master table 101 (refer to FIG. 5) exceed the thresholds are memorized. In the step 4210, changes of activity ratios of the corresponding logic areas in the past are read from the information of change in activity ratio (refer to FIG. 6) in the master table 101.

In the step 4215, a size of the capacity to be added to the corresponding logic area after configuration change is determined from changes of activity ratios as a requested capacity (also referred to as a requested increment capacity). In other words, the capacity of logic area to be added is estimated. For example, with reference to the information of change in activity ratios (refer to FIG. 6), ratios of changes of activity ratios are calculated during a period for measurement to acquire an increment capacity in the equivalent period as the requested increment capacity. In FIG. 6, since Unit 4 shows a 25% (95%-70%) increase from the last time to the present time, the requested increment capacity can be estimated by expecting 25% increase.

When the requested increment capacity is smaller than the capacity of logic area in Unit 0 (No as shown in step 4220), only logic blocks for the requested increment capacity in Unit 0 in the master table 101 are allocated to the concerned logic area (step 4225), and the process proceeds to the step 4240. In contrast, when the requested increment capacity is larger than the capacity of logic area in Unit 0, all blocks of Unit 0 are allocated to the concerned logic area (step 4230) and a capacity shortage signal is sent to the user communication program 204 of the server 2 (step 4345), and the process proceeds to the step 4240.

In the step 4240, the contents of the master table 101 are sent to the storage device 3 and reflected in the configuration information table 305 of the storage device 3.

In the step 4245, the operation type in the master table 101 is cleared, and then the writing operation process ends.

Figure 43:
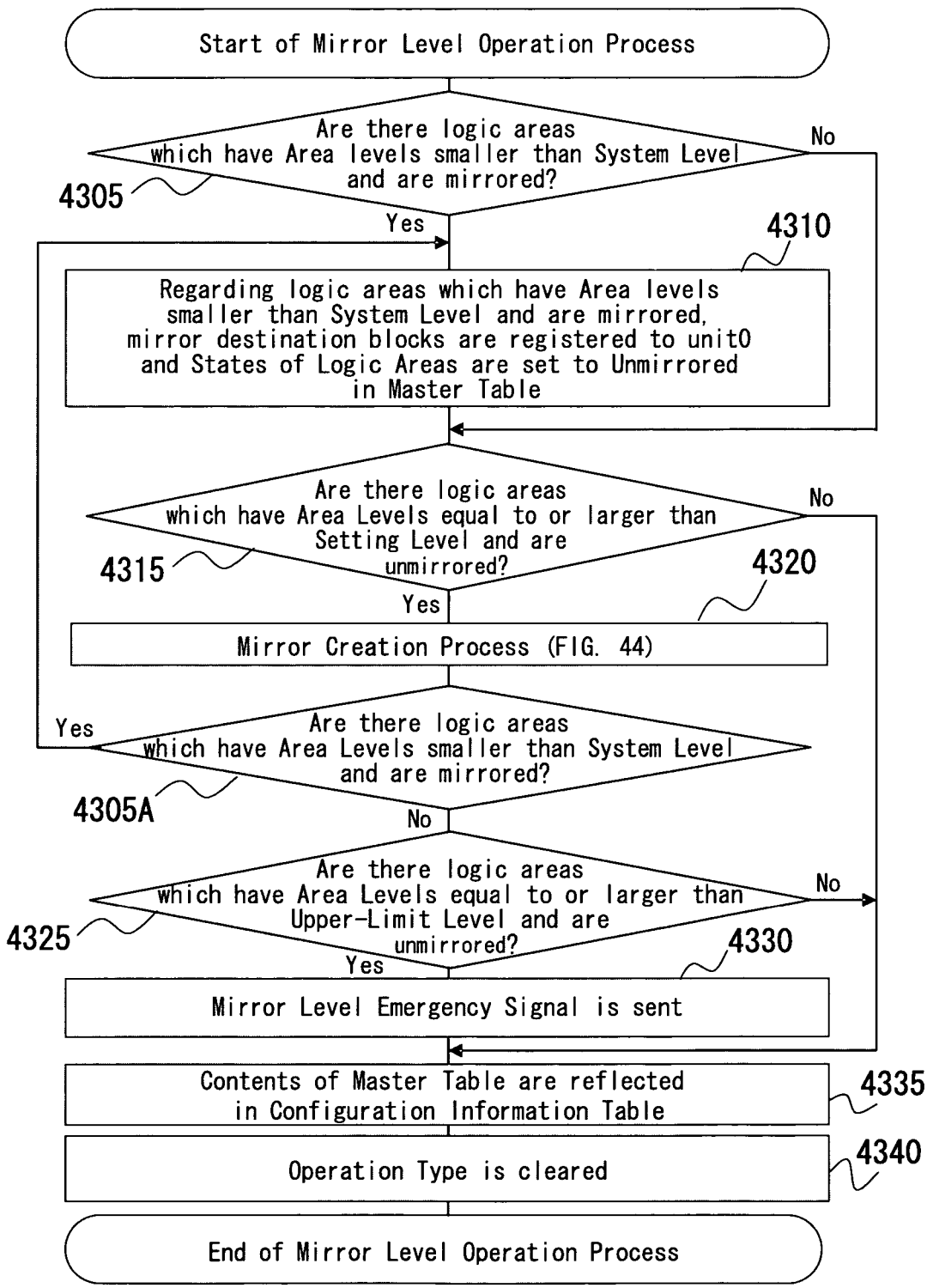
FIG. 43 is a flow chart showing a mirror level operation process.

FIG. 43 is a flow chart showing a mirror level operation process (FIG. 39) in the step 3930.

In the step 4305, when a mirrored logic area with an area level below the system level is available (Yes in the step 4305) by referring to the logic area information in the master table 101, the process proceeds to the step 4310.

In the step 4310, regarding the mirrored logic areas with area levels below the system level, the logic areas corresponding to the mirror destination physical block numbers in the master table 101 are registered in Unit 0, and states of the mirrored logic areas are changed to Unmirrored in the master table 101. To be specific, pairs of the mirror destination physical block numbers and the mirror destination disk numbers corresponding to the logic area are read from the master table 101 (refer to FIG. 5) and the mirror table 110 (refer to FIG. 11), and the logic areas corresponding to the pairs are registered as Unit 0 in the master table 101.

In the step 4315, it is judged whether an unmirrored logic area with an area level above the setting level is available. When such logic area is not available (No as shown in step 4315), the process proceeds to the step 4335. In contrast, when such logic area is available (Yes as shown in step 4315), a mirror creation process (refer to FIG. 44) is executed (step 4320).

In the step 4305A, it is judged whether a mirrored logic area with an area level below the system level is available. When such logic area is available (Yes as shown in step 4305A), the process returns to the step 4310. When such logic area is not available (No as shown in step 4305A), it is judged whether an un-mirrored logic area with an area level above the upper-limit level is available (step 4325).

When all the logic areas with area levels above the upper-limit level are mirrored (No as shown in step 4325), the process proceeds to the step 4335. When such logic area is available (Yes in the step 4325), a mirror level emergency signals is sent to the user communication program 204 of the server 2 (step 4330) and the process proceeds to the step 4335.

In the step 4335, the contents of the master table 101 are sent to the storage device 3 and reflected in the configuration information table 305 of the storage device 3. In the step 4340, the operation type in the master table 101 is cleared, and then the mirror level operation process ends.

Figure 44:
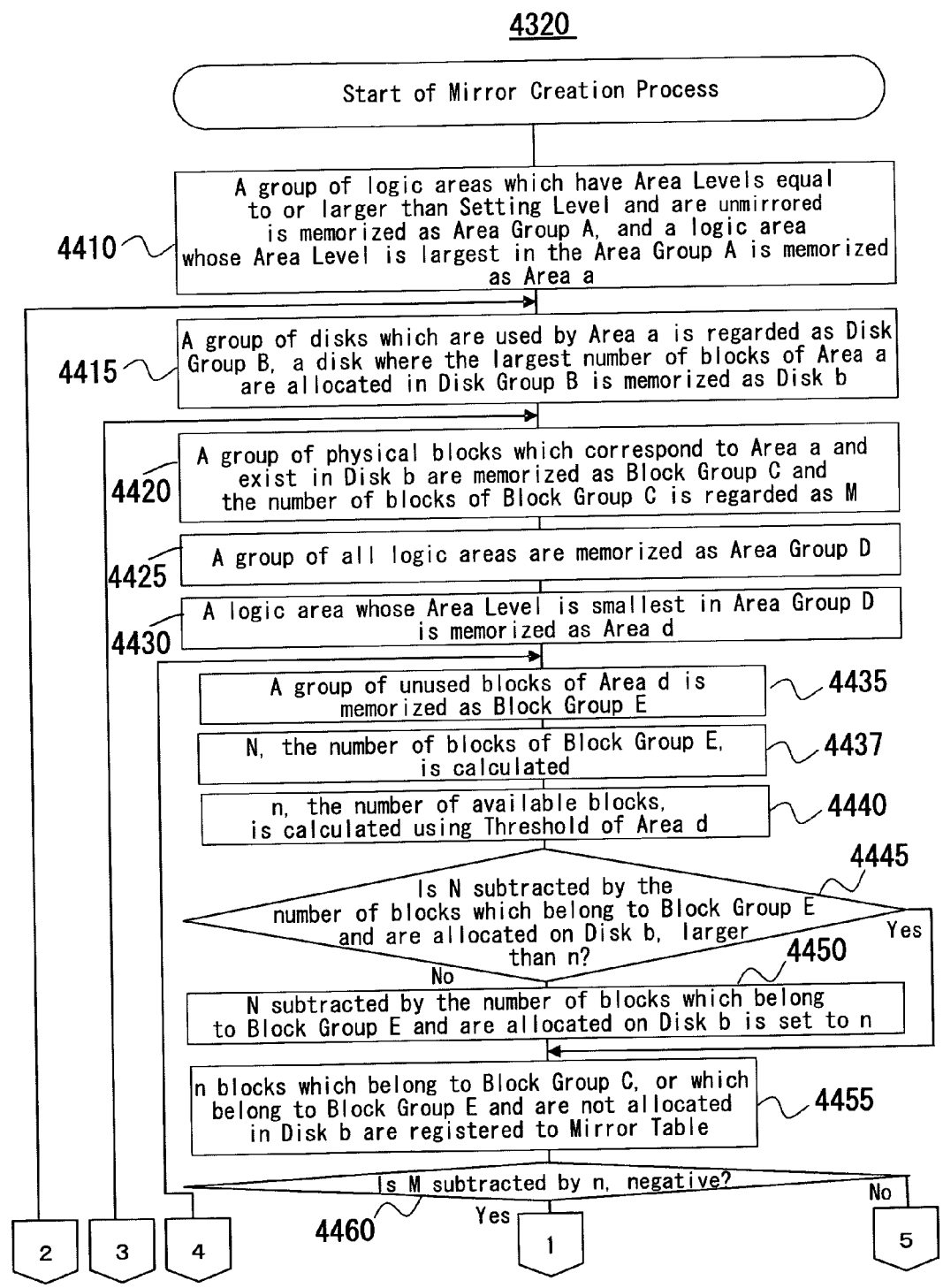
FIG. 44 is a flow chart showing a mirror creation process.

FIG. 44 is a flow chart showing a mirror creation process (FIG. 43) in the step 4320.

In the step 4410, it is assumed that a group of logic areas which are not mirrored and have area levels above the setting level is defined as area group A, for example, a logic area with the maximum area level of the master table 101 in the area group A is memorized as area a, for example.

In the step 4415, a group of disks which are used by the area a are defined as disk group B, for example, a disk to which the greatest number of physical blocks of area a are allocated in the disk group B is memorized as disk b, for example. The disks of the disk group B are selected by specifying the disk numbers corresponding to the area a on the basis of the corresponding block information of the master table 101.

In the step 4420, a group of physical blocks which correspond to the area a and exist on the disk b are memorized as a block group C for example, and the number of blocks of the block group C is memorized as M, for example.

In the step 4425, a group of all logic areas of the master table 101 is memorized as an area group D, and in the step 4430, a logic area with a lowest area level in the area group D, is memorized as area d, for example.

In the step 4435, a group of unused blocks (unused physical blocks) of the area d is memorized as a block group E, and in the step 4437, the number of physical blocks belonging to the block group E is calculated as N.

In the step 4440, the number of available physical blocks n is calculated from the threshold (refer to FIG. 5) of the activity ratio in the area d.

In the step 4445, in order to judge whether physical blocks of the block group E can be used to create the mirror, it is judged whether a number acquired by subtracting the number of physical blocks of the disk b in the block group E from the number of physical blocks, N, is larger than the number of physical blocks, n. As a result, when it is larger (Yes in the step 4445), the process proceeds to the step 4455. In contrast, when it is smaller (No in the step 4445), the number acquired by subtracting the number of physical blocks of the disk b in the block group E from the number of physical blocks, N, is set to the number of physical blocks n (step 4450), and the process proceeds to the step 4455.

In the step 4455, physical blocks of the block group C, are registered as mirror source physical blocks, and physical blocks of the block group E on disks other than the disk b are registered as mirror destination blocks in the mirror table 110 (refer to FIG. 11).

In the step 4460, in order to judge whether there is any physical block which requires mirroring, it is judged whether a number acquired by subtracting the number of physical blocks n from the number of physical blocks M is negative. If it is positive, the process proceeds to the step 4505 in FIG. 45, and if it is negative, the process proceeds to the step 4540 in FIG. 45.

Figure 45:
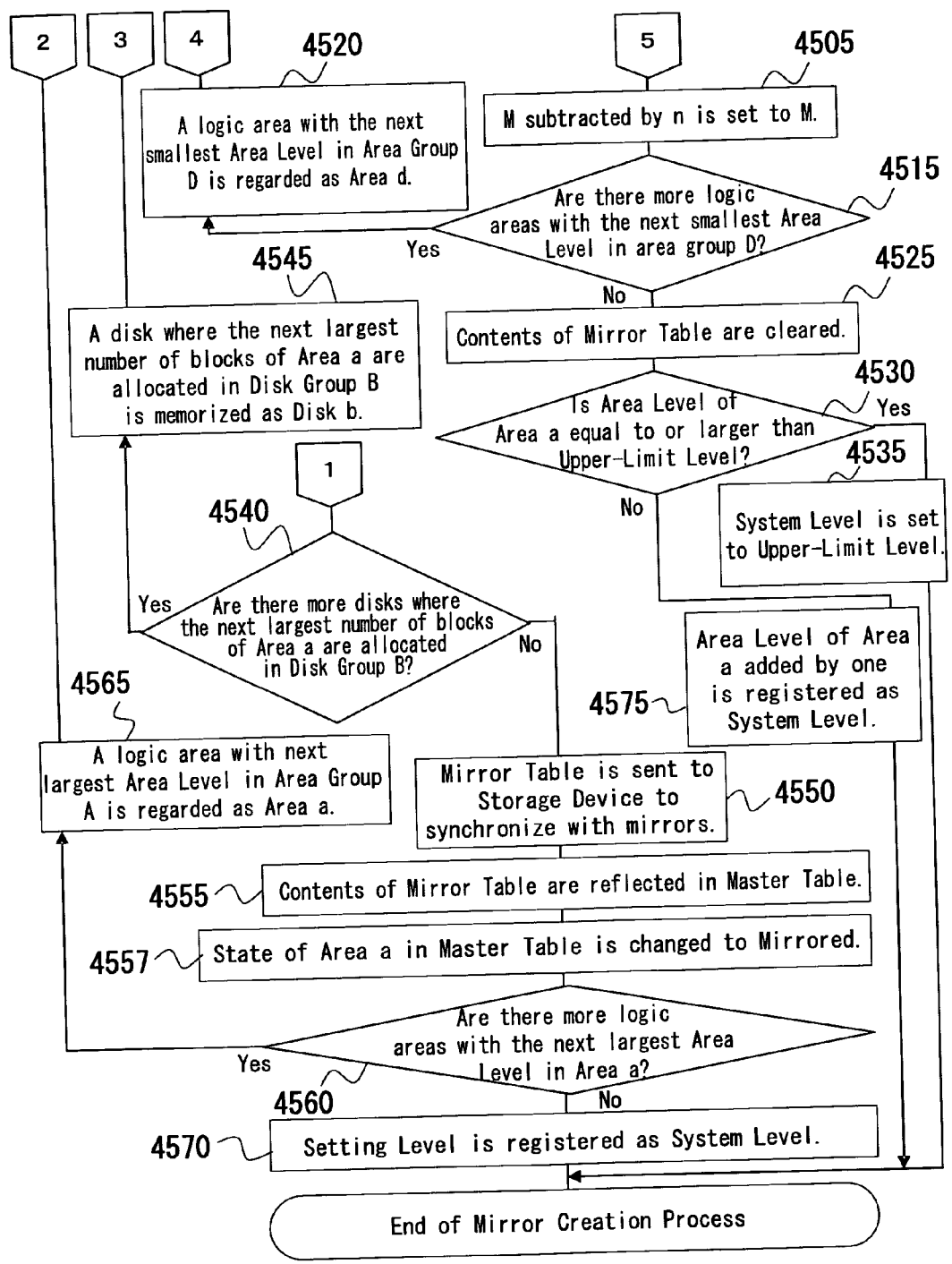
FIG. 45 is a flow chart showing a mirror creation process.

In the step 4505 of FIG. 45, a number acquired by subtracting the number of physical blocks n from the number of physical blocks M is set to M.

In the step 4515 of FIG. 45, when a logic area with a next lowest area level after that of the area d is available in the area group D (Yes in the step 4515), the process proceeds to the step 4520. A logic area with a next lowest area level after that of the area d in the area group D is defined as area d and returns to the step 4420 of FIG. 44.

In contrast, in the step 4515 of FIG. 45, when no logic area with a lower area level is available (No in the step 4515), the contents of the mirror table (refer to FIG. 11) are cleared in the step 4525, and the process proceeds to the step 4530.

In the step 4530, it is judged whether an area level of the area a is above the upper-limit level of the master table 101. If it is above the upper-limit level (Yes in the step 4530), the value of the upper-limit level is set to the system level in the step 4535, and then the mirror creation process ends.

In contrast, when the area level is below the upper-limit level (No in the step 4530), a value one larger than the area level of the area a is set to the system level in the master table 101 in the step 4575, and then the mirror creation process ends.

In the step 4540, it is judged whether a disk to which next greatest number of blocks of the area a are allocated after the disk b within the disk group B is available. If available (Yes in the step 4540), the process proceeds to the step 4545. The disk is then specified as disk b and returns to the step 4420 of FIG. 44.

In contrast, when not available (No in the step 4540), the mirror table 110 (refer to FIG. 11) is sent to the storage device 3, thus allowing the storage device 3 to synchronize with the mirrors.

In the step 4555, the contents of the mirror table 110 are reflected in the master table 101. To be specific, values such as logic area information including a state of the logic area in the master table 101 are made consistent.

In the step 4557, the state of the logic area of the area a in the master table 101 (refer to FIG. 5) is changed to a state of Mirrored, and proceeds to the step 4560.

In the step 4560, with reference to the master table 101, it is judged whether a logic area with a next highest area level after the area a in the area group A is available. When available (Yes in the step 4560), the logic area is defined as area a (step 4565) and returns to the step 4415 of FIG. 44. In contrast, when not available (No in the step 4560), the value of the setting level is set to the system level in the master table 101(step 4570), and then the mirror creation process ends.

Figure 46:
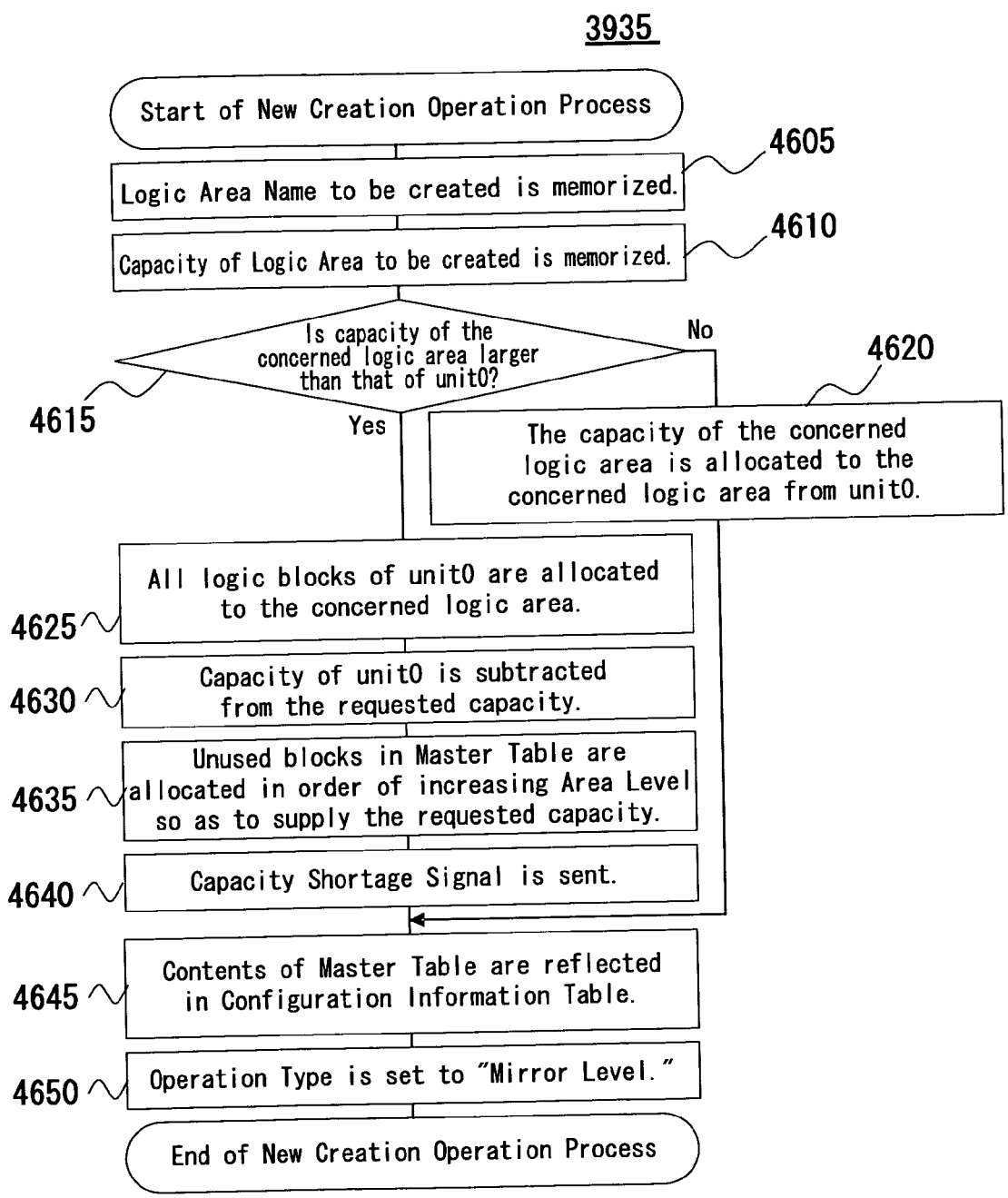
FIG. 46 is a flow chart showing a new creation operation process.

FIG. 46 is a flow chart showing a new creation operation process (FIG. 39) in the step 3935.

In the step 4605, a name of a logic area to be created (also referred to as the concerned logic area) is memorized, and in the step 4610, a capacity of logic area to be created is memorized.

In the step 4615, with reference to the master table 101, it is judged whether the capacity of the concerned logic area is larger than that of Unit 0. If it is larger (Yes in the step 4615), all logic blocks of Unit 0 are allocated to the concerned logic area (step 4625). In the step 4630, only the capacity of Unit 0 is subtracted from the requested capacity of logic area for creation, and in the step 4635, unused blocks of logic areas in the master table 101 are allocated in increasing order of area levels of the logic areas, so as to meet the request. In the step 4640, a capacity shortage signal is sent to the user communication program 204 of the server 2, and the process proceeds to the step 4645.

In contrast, when the capacity of the corresponding logic area is smaller than that of Unit 0 (No in the step 4615), only the capacity of the concerned logic area is allocated to the concerned logic area from blocks of Unit 0 (step 4620) and he process proceeds to the step 4645.

In the step 4645, the contents of the master table 101 are sent to the storage device 3, and reflected in the configuration information table 305 of the storage device 3, the operation type in the master table 101 is changed to "mirror level", and then the new creation operation process ends.

Figure 47:
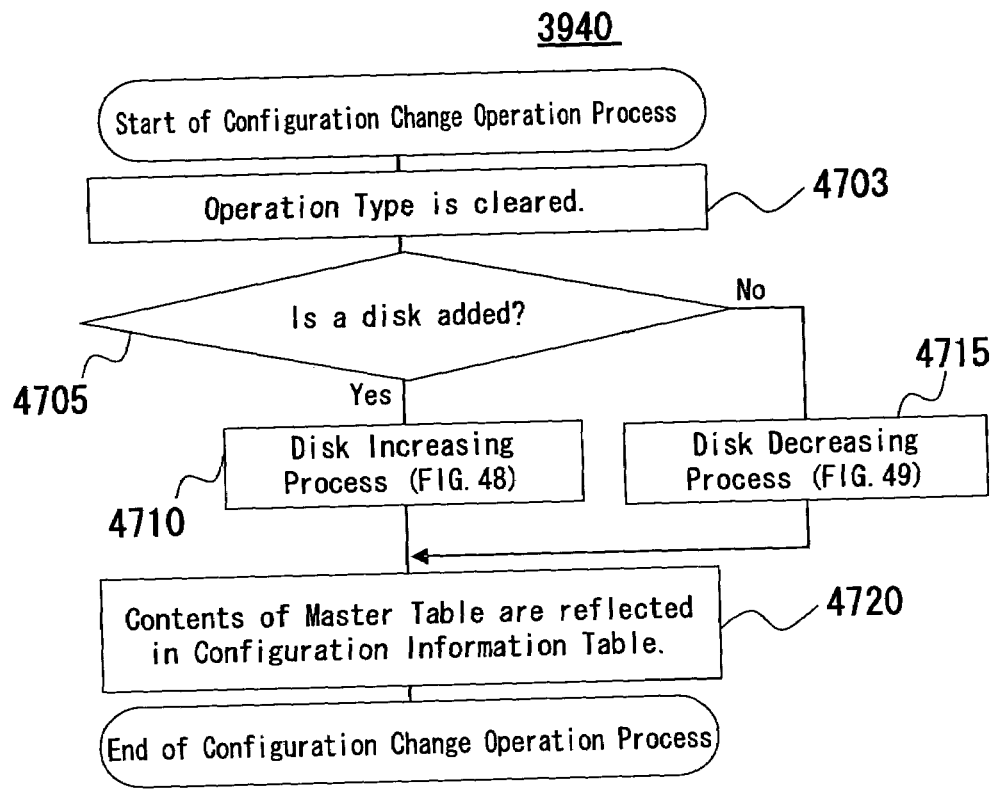
FIG. 47 is a flow chart showing a configuration change operation process.

FIG. 47 is a flow chart showing a configuration change operation process (FIG. 39) in the step 3940.

In the step 4703, the operation type in the master table 101 is cleared, and in the step 4705, it is judged whether a disk (a disk for replacing a disk which has been used for time exceeding endurance time) is added by a user. As a result, when a disk is added (Yes in the step 4705), a disk increasing process (refer to FIG. 48) is executed (step 4710). When a disk (a disk which has been used for time exceeding endurance time) is removed by a user (No in the step 4705), a disk decreasing process (refer to FIG. 49) is executed (step 4715). Thereafter, in the step 4720, the contents of the master table 101 are sent to the storage device 3, and reflected in the configuration information table 305 (refer to FIG. 14) of the storage device 3, and the configuration change operation process ends.

Figure 48:
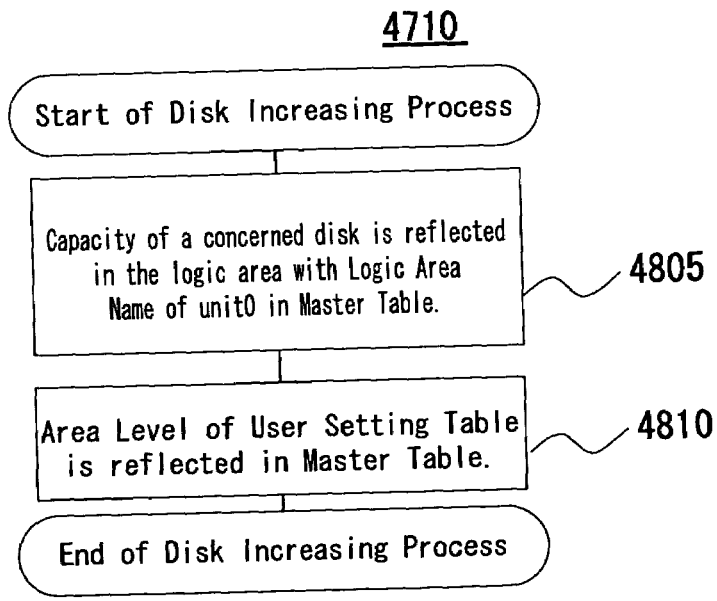
FIG. 48 is a flow chart showing a disk increasing process.

FIG. 48 is a flow chart showing a disk increasing process (FIG. 47) in the step 4710.

In the step 4805, all added capacity of the concerned disk are reflected to Unit 0 in the master table 101, and in the step 4810, the area level of the user setting table 103 is reflected in the master table 101 to terminate the disk increasing process.

Figure 49:
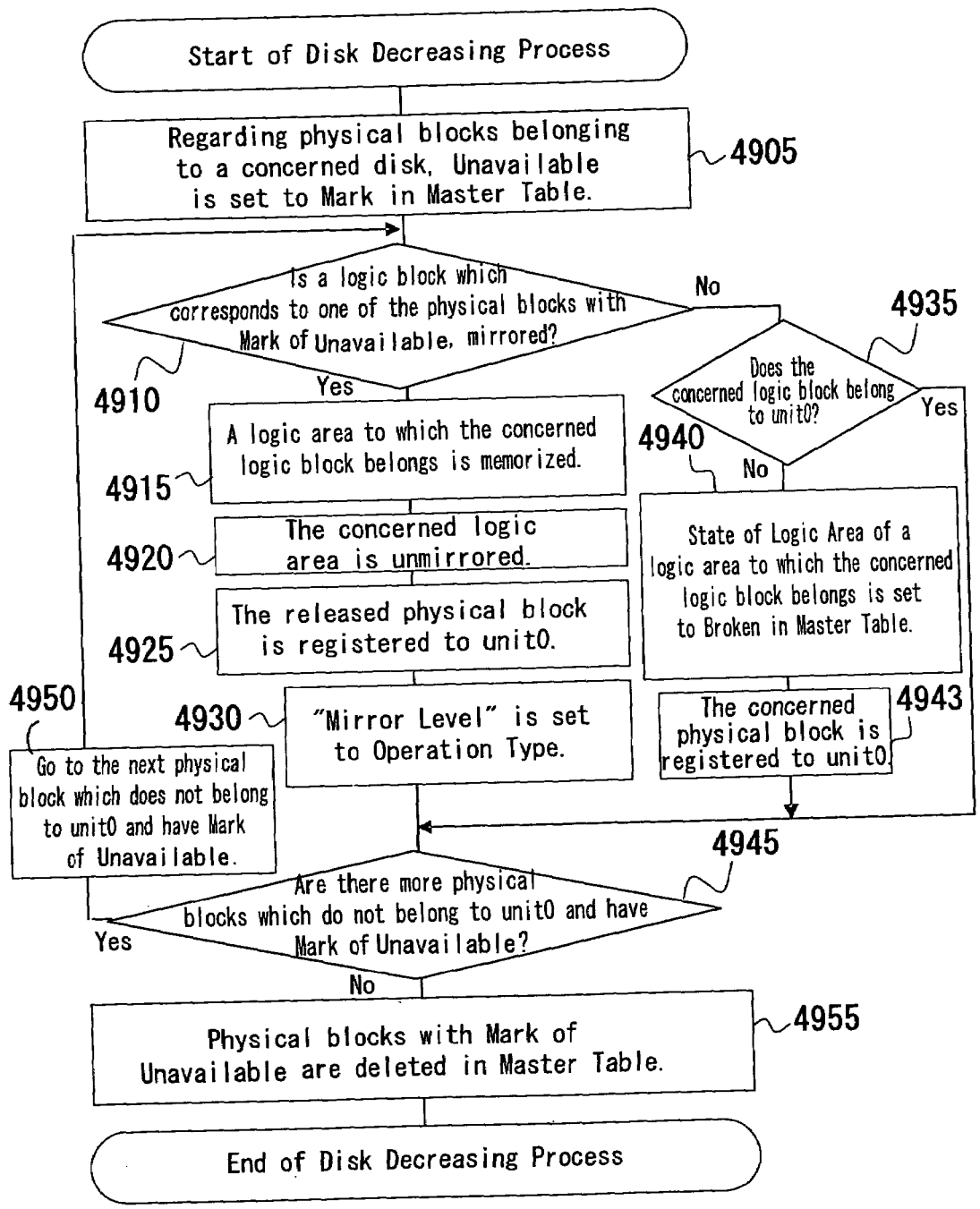
FIG. 49 is a flow chart showing a disk decreasing process.

FIG. 49 is a flow chart showing a disk decreasing process (FIG. 47) in the step 4715.

In the step 4905, regarding the physical blocks belonging to the concerned disk, Unavailable is set to the mark in the master table 101 (refer to FIG. 6) and the following process is given to physical blocks with Unavailable marks in the following steps.

With reference to the master table 101, it is judged whether a logic block corresponding to a physical block with Unavailable mark is mirrored (step 4910). When it is mirrored (Yes in the step 4910), the process proceeds to the step 4915. In contrast, when it is not mirrored (No in the step 4910), the process proceeds to the step 4935.

In the step 4915, a logic area to which the concerned physical block belongs is memorized, in the step 4920, the concerned logic area is unmirrored (a state of the logic area in the master table 101 is set to Unmirrored), and in the step 4925, the thus released physical block is allocated to Unit 0. In the step 4930, the operation type in the master table 101 is changed to "mirror level."

In contrast, in the step 4910, when it is not mirrored (No as shown the step 4910), the process proceeds to the step 4935. With reference to the master table 101, it is judged whether the concerned logic block belongs to Unit 0. If it belongs to Unit 0 (Yes in the step 4935), the process proceeds to the step 4945. When it does not belong to Unit 0 (No in the step 4935), a state of the logic area of the master table 101 to which the concerned logic block belongs is set to Broken (step 4940) and the concerned physical block is registered in Unit 0 of the master table 101 (step 4943) and proceeds to the step 4945.

In the step 4945, with reference to the master table 101, it is judged whether there is a logic block not belonging to Unit 0 and an Unavailable marked physical block is available. In other words, it is judged whether there are more physical blocks for which corresponding logic blocks do not belong to Unit 0 and marks are Unavailable. If it is available (Yes in the step 4945), the next physical block which does not belong to Unit 0 is specified from the master table 101 (step 4950), and proceeds to the step 4910. Then, the concerned physical block is processed. In contrast, if it is not available (No in the step 4945), physical blocks (physical block numbers) with marks of Unavailable in the master table 101 are deleted (step 4955), and then the disk decreasing process ends.

Figure 50:
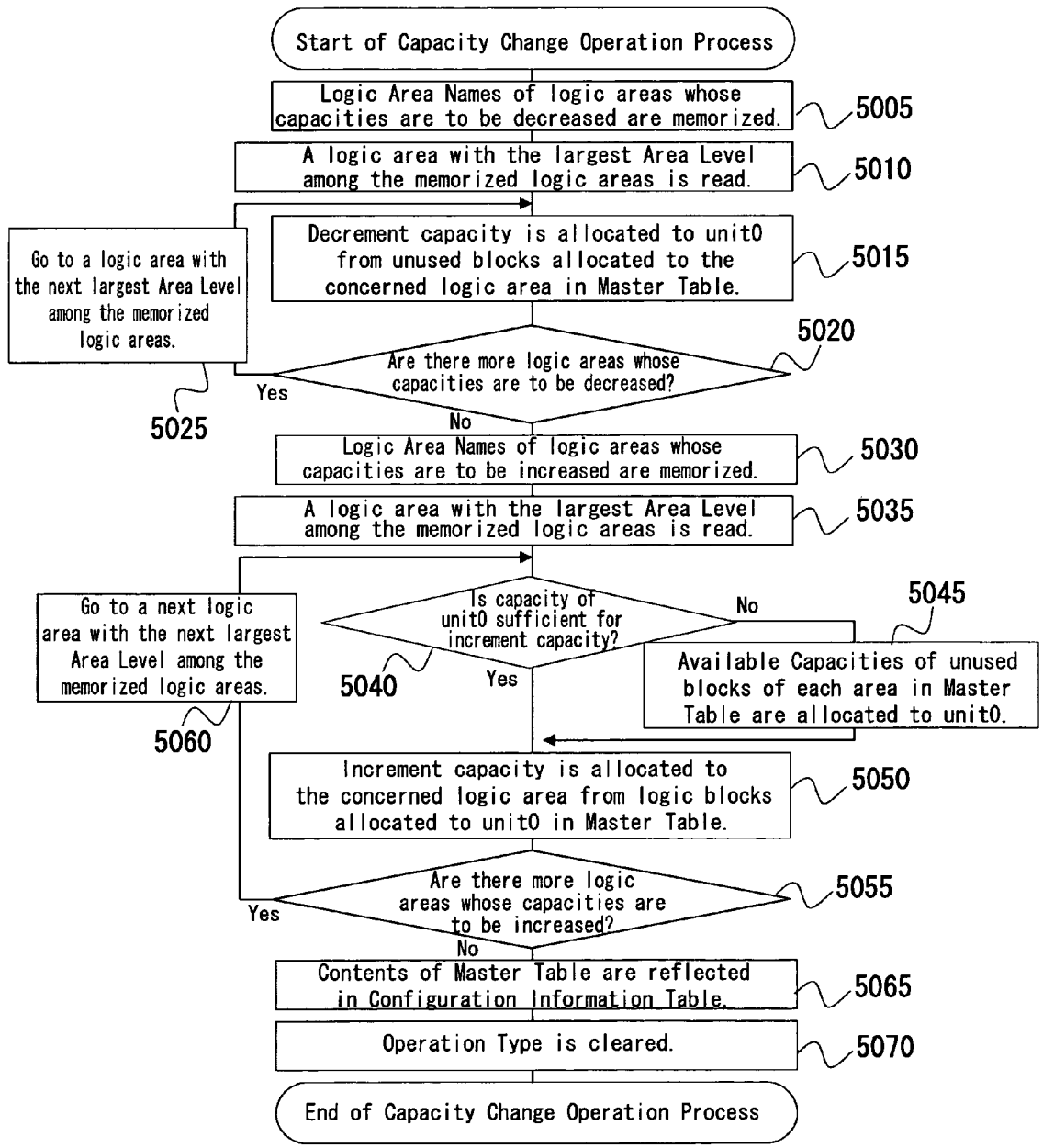
FIG. 50 is a flow chart showing a capacity change operation process.

FIG. 50 is a flow chart showing a capacity change operation process (FIG. 39) in the step 3945.

In the step 5005, logic area names of logic areas whose capacities are to be decreased (also referred to as the concerned logic areas) are memorized, and in the step 5010, a logic area with a maximum area level among the memorized logic area names is read from the master table 101.

In the step 5015, the decrement capacity from unused blocks (physical blocks corresponding to the logic blocks) allocated to the concerned logic area in the master table 101 are allocated to Unit 0.

In the step 5020, it is judged whether other logic areas whose capacities are to be decreased are available among the previously memorized logic area names. When available (Yes in the step 5020), a logic area with the next largest area level is selected, the process proceeds to the next step (step 5025), and the logic area is processed in the step 5020. In contrast, when such logic areas are not available (No in the step 5020), logic area names of logic areas whose capacities are to be increased are memorized (step 5030).

In the step 5040, a logic area name of a logic area with a maximum area level among the memorized logic area names is read, and it is judged whether the capacity of Unit 0 is sufficient for the increment capacity of the logic area. When it is not sufficient (No in the step 5040), unused blocks (unused logic blocks) of each logic area in the master table 101 are allocated to Unit 0 (step 5045) as much as the available capacity, and the process proceeds to the step 5050. In contrast, when it is sufficient (Yes in the step 5040), the process proceeds to the step 5050.

In the step 5050, logic blocks allocated to Unit 0 are allocated to the concerned logic area as much as the increment capacity and the process proceeds to the step 5055.

In the step 5055, it is judged whether other logic areas to be increased are available in the previously memorized logic area names. When available (Yes in the step 5055), a logic area with the next largest area level is selected (step 5060) and the process proceeds to the step 5040. Next, in the step 5040, the logic area is processed. In contrast, when other logic areas are not available (No in the step 5055), the contents of the master table 101 are sent to the storage device 3 and reflected in the configuration information table 305 of the storage device 3. In the step 5070, the operation type in the master table 101 is then cleared, and then the capacity change operation process ends.

According to the present embodiment, even when previously allocated storage areas are not available, unused areas of storage areas allocated for another purpose and areas acquired by releasing redundancy are dynamically re-allocated, to prevent failures caused by capacity shortage. Further, a ratio of storage area (activity ratio) used in each storage area is employed as criteria for changing a configuration, thereby making it possible to execute the configuration change before capacity shortage may take place.

The volume management system described above is used to add or extend the capacity in logic areas of the storage device 3 whose capacities are insufficient to create redundancy of the logic areas. In this instance, it is necessary to consider the file system of server 2 in which the storage device 3 is used.

Hereinafter, a volume management system will be described taking the file system in the server 2 into consideration. Only additions to and changes from the description above will be described below, and the same symbols and the same processes work and function similarly to those described so far.

Figure 57:
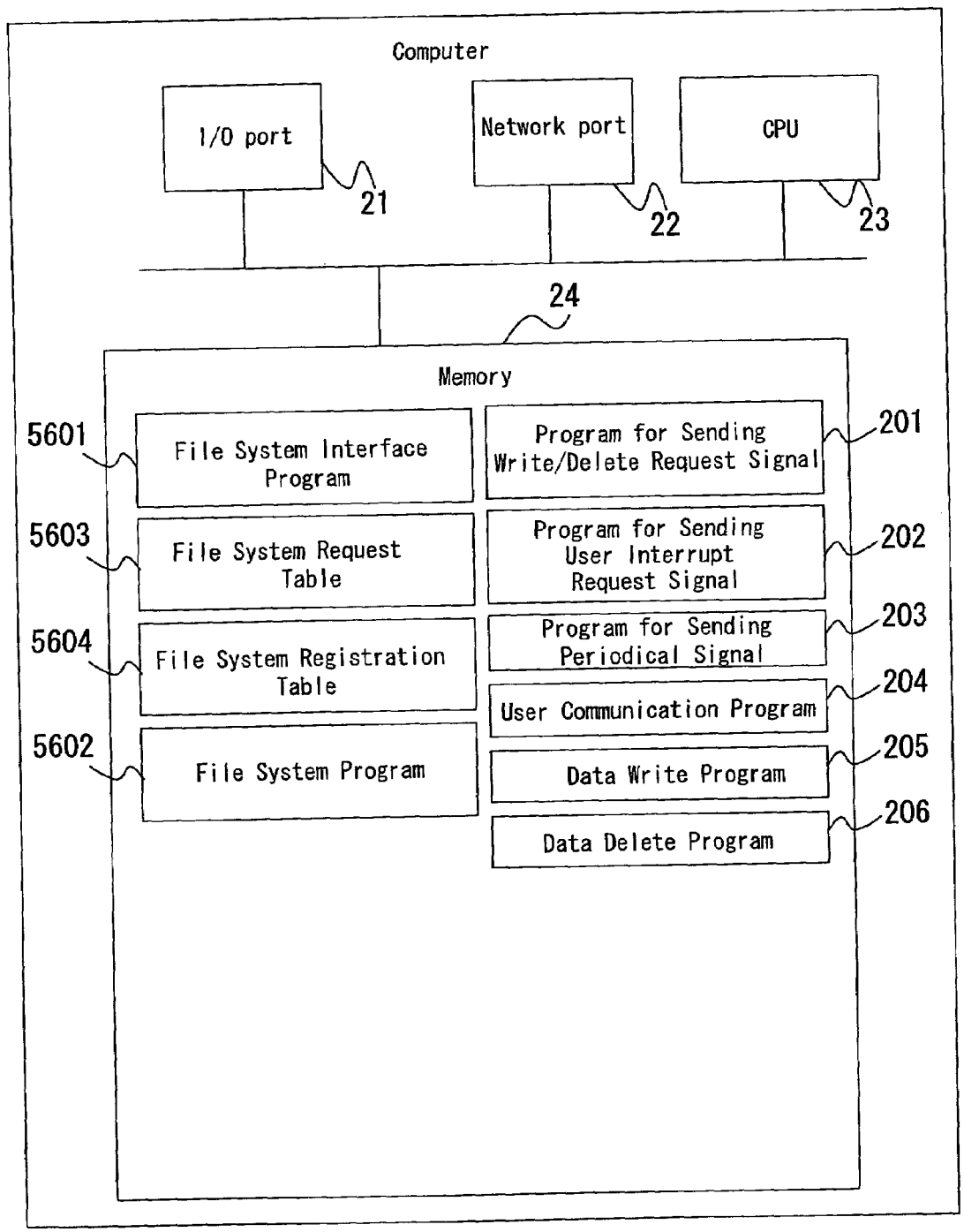
FIG. 57 is a view showing a configuration of server.

FIG. 57 shows a configuration of the server. The memory 24 stores the file system interface program 5601 and the file system program 5602, in addition to the programs described in FIG. 3. These programs are executed by the CPU 23. Further, the memory 24 stores the file system request table 5603 (FIG. 58) and the file system registration table 5604 (FIG. 59). The file system interface program 5601 and the file system program 5602 execute the processes by referring to the tables.

As shown in FIG. 58, the file system request table 5603 has the information of a request (a request type), a used logic area name (a name of a logic area to be used), size of file system, start logic block, end logic block and requested capacity for change. This file request table 5603 is created by the file system interface program 5602.

The request is information showing a request type on the file system, including "creation" for requesting creation of a file system, "deletion" for requesting deletion of a file system, "extension" for requesting extension of a file system and "reduction" for requesting reduction of the file system. The used logic area name is a name of a logic area where a file system is desired to be created. The size of file system indicates a size of the file system acquired as a result of creation or extension. The start logic block is position information of the start logic block in logic areas currently used by the file system, while the end logic block is position information of the end logic block in logic areas currently used by the file system. The requested capacity for change is the amount of change in size of the file system.

For example, FIG. 58 shows a case whereby "extension" of a file system, a file system of LOGB is generated from the logic block 1 to the logic block 100 in the logic area "unit 1", with 5GB newly added. In the case of "creation" of the file system, "creation" is specified as a request, and a used logic area name is specified. Similarly, in the case of deletion, "deletion" is specified as a request, and a logic area name is specified. In the case of "reduction" of the file system, "reduction" is specified as a request, and used logic name area, size of the file system, start logic block, end logic block, and requested capacity for change are set. Here, "reduction" may be specified by the size of the file system and either of the start logic block or the end logic block.

As shown in FIG. 59, the file system registration table 5604 has the information of used logic area name, size of the file system, start logic block and end logic block. The used logic area name indicates a name of the logic area where a file system is desired to be created. The start logic block is position information of the start logic block in a logic area currently used by the file system, while the end logic block is position information of the end logic block in logic areas currently used by the file system. When a plurality of file systems are available, a used logic area name, a size of the file system, a start logic block, and an end logic block are registered for each of the file systems.

In the case of creation, deletion and extension of the file system, the file system program 5602 will make a request for creating a file system request table to the file interface program 5601 on the basis of the request, and send the thus created the file system request table to the workload volume manager 1 of the management server 5. Also, in the case of reduction, the workload volume manager 1 will make a request via the file system interface program 5601 to the file system program 5602.

The file system program 5602 will be described. The file system creating process is a process of creating a new file system. In creation of a file system, there is a case when a logic area name is specified by a user who uses the file system, and also there is a case where only a request for creation is specified by a user and a name of the logic area is specified by the file system program 5602. When a name of the logic area is specified by a user, the file system program 5602 confirms whether the same name of the logic area has already been registered in the master table. When it has already been registered, the program will request the user to specify another name. Further, when the name is specified by the file system program 5602, a logic area name which is not yet used is set by referring to the master table. For example, when registration is made up to Unit 3, Unit 4 with a next larger numeric value is set as the name of the logic area. Further, regarding a request for deletion, a user will specify a logic area name. The file system program sends a request for creating a file system and a logic area name for creating the file system to the file system interface program 5601.

The file system deleting process is a process of deleting a file system which already exists. When a request for deleting a file system is received from a user, a name of the corresponding used logic area name is read out from the file system registration table, and a request for deleting the file system and the name of the used logic area are sent to the file system interface program 5601.

Furthermore, the file system program 5602 supervises capacities of file systems on the basis of a request for writing data and determines the capacity shortage when no released area is available or the activity ratio exceeds a predetermined value. In this instance, the file system program 5602 sends a request for extending a file system, a requested capacity for extension, and a name of the logic area allocated to the file system to be extended, to the file system interface program 5601. The request of extension may be a predetermined value, a value to be set according to a user's request, or a value decided by the file system program.

In addition, the file system program 5602 receives a request for reducing a file system and a name of the logic area in which the file system to be reduced from the interface program 5601. After receiving them, the file system can notify the name of the logic area allocated to the file system to be reduced and a size of the file system after reduction to other programs.

Figure 60:
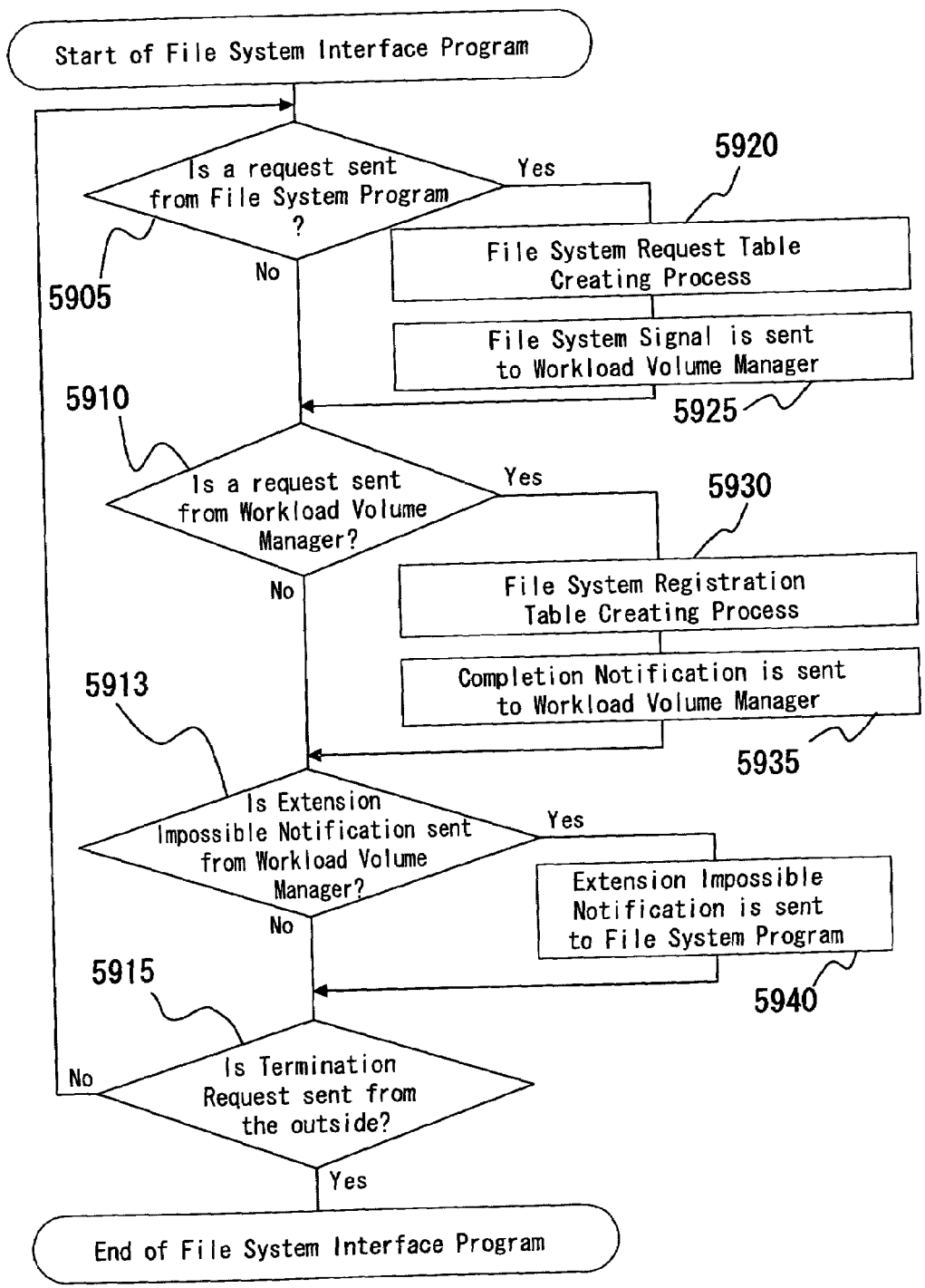
FIG. 60 is a flow chart showing a process of the file system interface program.

Next, the file system interface program 5601 will be described. FIG. 60 is a flow chart showing a process of the file system interface program 5601. First, it is judged whether a request is sent from the file system program 5602 (step 5905). When no request is sent from the file system program 5602 (No in the step 5905), it is judged whether a request is sent from the workload volume manager 1 (step 5910). When no request is sent from the workload volume manager 1 (No in the step 5910), it is judged whether an extension impossible notification is sent from the workload volume manager 1 (step 5913). When no extension impossible notification is sent from the workload volume manager 1 (No in the step 5913), it is judged whether a request for termination is sent from the outside (step 5915). When a request for termination is made (Yes in the step 5915), the process ends. When no request for termination is made (No in the step 5915), the process returns to the step 5905 to continue the process.

In contrast, when a request is sent from the file system program (Yes in the step 5905), a file system request table creating process (FIG. 61) is executed (step 5920) and a file system signal is sent to the workload volume manager 1 (step 5925).

In addition, when a request is sent from the workload volume manager 1 (Yes in the step 5910), a file system registration table creating process (FIG. 62) is executed (step 5930), and a completion notification is sent to the workload volume manager (step 5935).

Furthermore, when an extension impossible notification is sent from the workload volume manager 1 (Yes in the step 5913), the extension impossible notification is sent to the file system program (step 5940).

Figure 61:
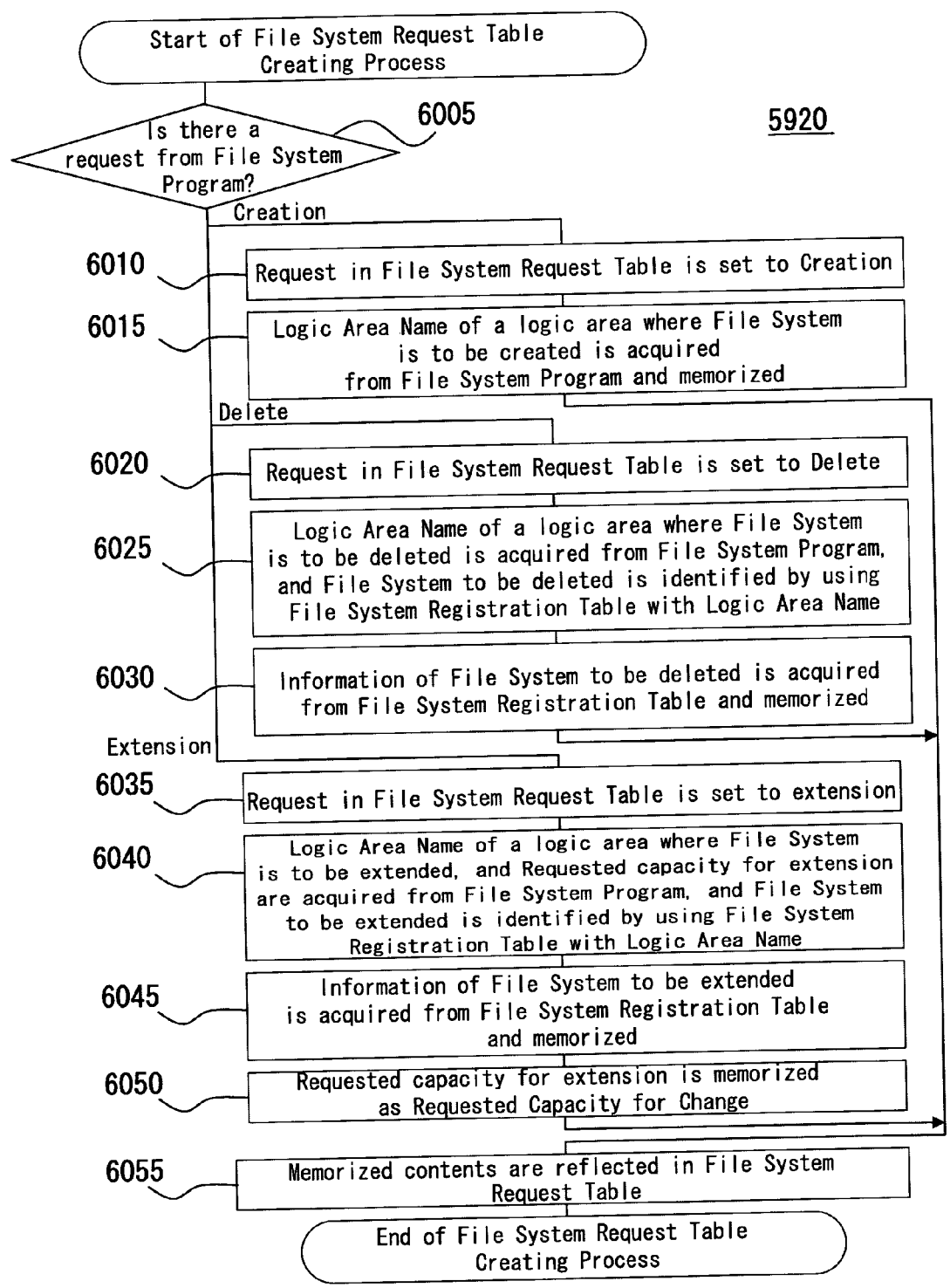
FIG. 61 is a flow chart showing a file system request table creating process.

FIG. 61 is a flow chart showing a file system request table creating process. First, when a request sent from the file system program is "creation," a value of "creation" is set to a request of the file system request table (step 6010), a logic area name for creating a file system is acquired from the file system program and memorized in a free space of the memory (step 6015). Thereafter, the memorized content is reflected in the file system request table (step 6055) and the process ends. When a request sent from the file system program is "deletion," a value of "deletion" is set to a request of the file system request table (step 6020), a logic area name for deleting the file system is acquired from the file system program, and a file system to be deleted is specified by searching the file system registration table with the logic area name (step 6025). Thereafter, information of a file system to be deleted is acquired from the file system registration table, the contents are memorized in a free space of the memory (step 6030), the memorized contents are reflected in the file system request table (step 6055), and then the process ends. Further, when a request sent from the file system program is "extension," a value of "extension" is set to a request of the file system request table (step 6035), a logic area name for extending the file system and an requested capacity for extension are acquired from the file system program, and a file system to be extended is specified by searching the file system registration table with the logic area name (step 6040). Thereafter, information of the file system to be extended is acquired from the file system registration table and memorized in a free space of the memory (step 6045). Similarly, a requested capacity for extension is memorized as a requested capacity for change in a free space of the memory (step 6050), and the memorized contents are reflected in the file system request table (step 6055). Thereafter, the process ends.

Figure 62:
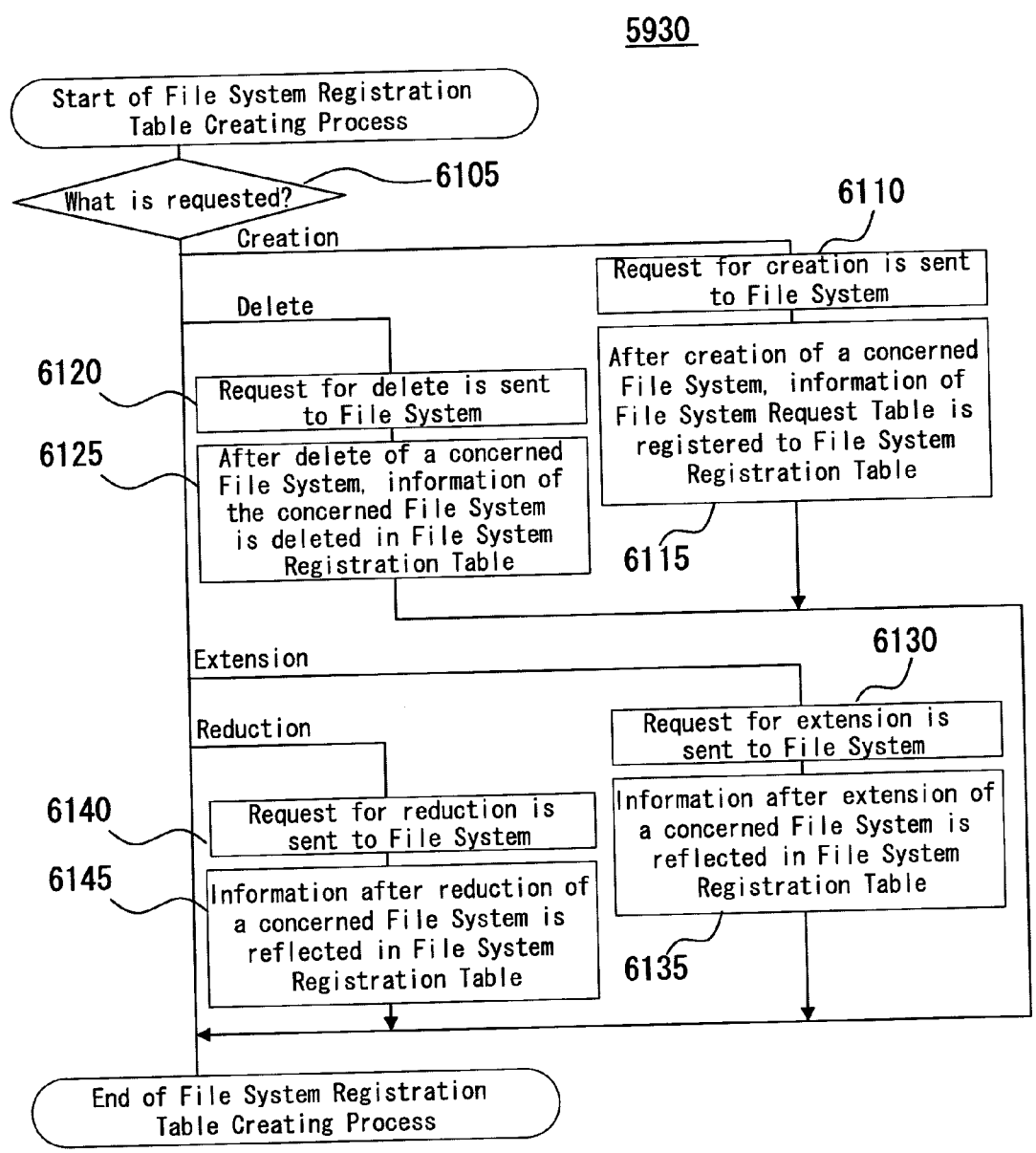
FIG. 62 is a flow chart showing a file system registration table creating process.

FIG. 62 is a flow chart showing a file system registration table creating process. First, it is judged what the request is (step 6105). When the request is "creation," a request for creation is sent to the file system program (step 6110). After creation of the concerned file system, information of the file system request table is registered in the file system registration table (step 6115) and the process ends. Further, when the request is "deletion," a request for deletion is sent to the file system program (step 6120). Next, after the concerned file system is deleted, information of the concerned file system of the file system registration table is deleted (step 6125) and the process ends. In addition, when the request is "extension," a request for extension is sent to the file system program (step 6130). Next, information after extension on the concerned file system is registered in the file system registration table (step 6135) and the process ends. Further, when the request is "reduction," a request for reduction is sent to the file system program (step 6140). Then, information after reduction on the concerned file system is reflected in the file system registration table (step 6145) and the process ends.

Next, a process of workload volume manager 1 will be described, with particular emphasis on a process for changing. Other processes will be performed similarly as described already.

Figure 63:
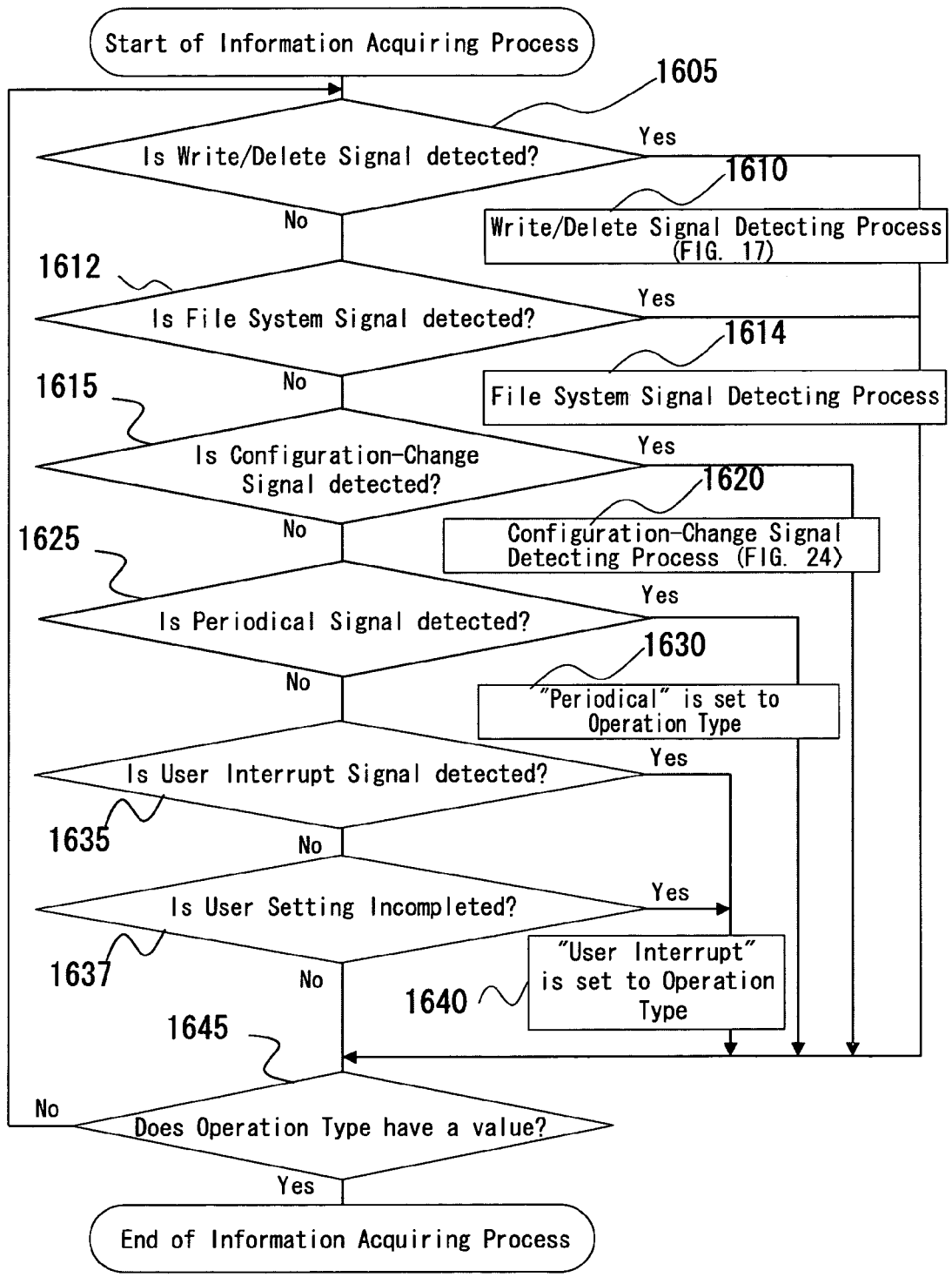
FIG. 63 is a partially changed view of the flow chart of information acquiring process shown in FIG. 16.
Figure 64:
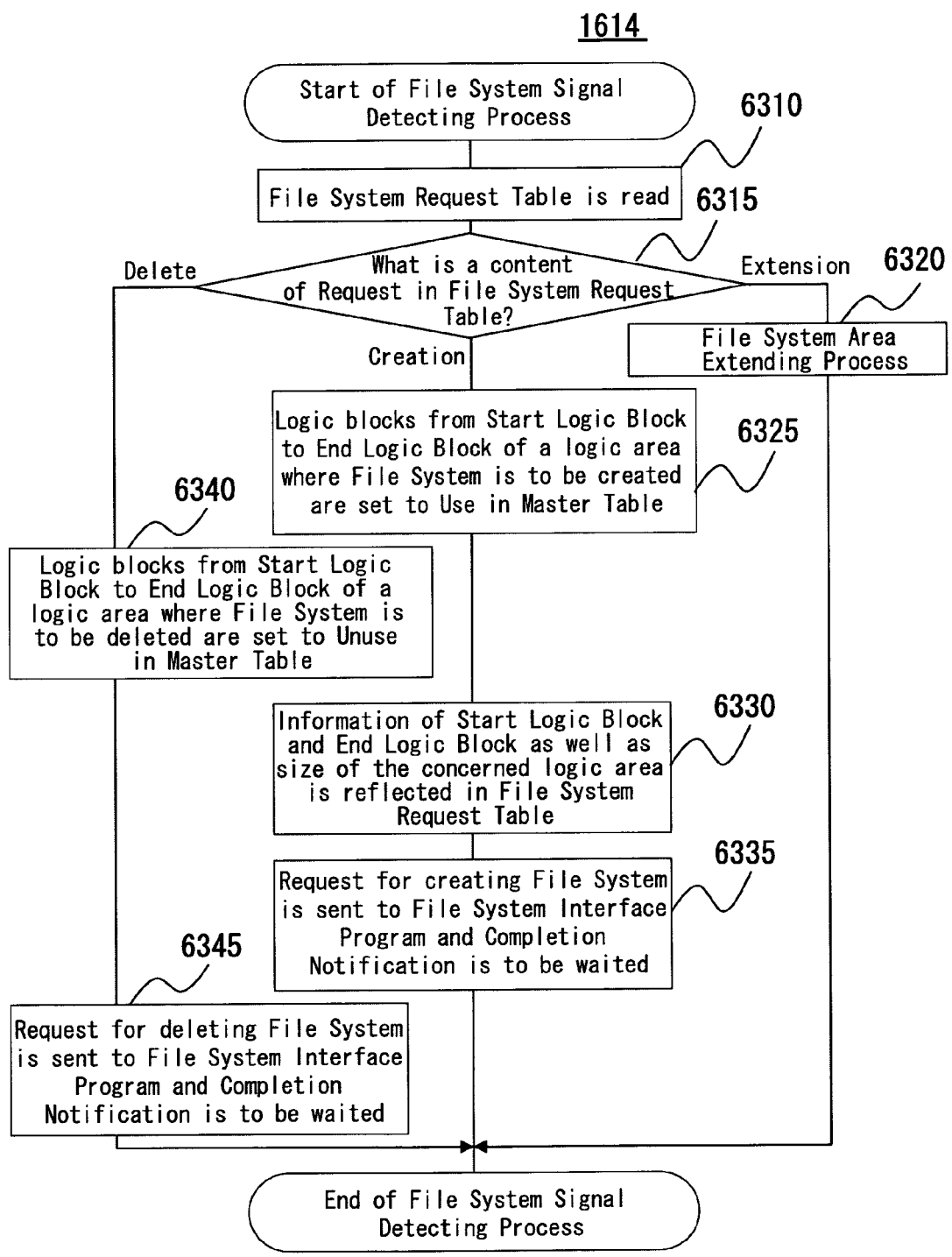
FIG. 64 is a flow chart showing a file system signal detecting process.

FIG. 63 is a flow chart showing the information acquiring process described in FIG. 16, which is, however, partially changed. The flow chart is different from that shown in FIG. 16 for a file system signal detecting process is executed in the step 1614. When file a system signal is detected (Yes in the step 1612), a file system signal detecting process is executed (FIG. 64). When not detected (No in the step 1612), it is judged whether a configuration change signal which is sent from the program for creating disk information table 317 of the storage device 3 (step 1615) is detected. Other processes are the same as those described in FIG. 16.

FIG. 64 is a flow chart showing a file system signal detecting process.

First in the step 6310, information of the file system request table shown in FIG. 58 is read. Next, in the step 6315, it is judged which request is sent from a file system, namely, "extension," "creation" or "deletion." When a request for "extension" is sent from the file system program ("extension" as shown in the step 6315), a file system area extending process (refer to FIG. 65) is executed (step 6320) and the process ends.

When a request for "creation" is sent from the file system ("creation" as shown in the step 6315), "Use" is set to use statuses of logic blocks from start logic block to the end logic block in a logic area for creating file systems in the master table (step 6325). Next, information of start logic block and end logic block as well as size of logic area determined by the start logic block and the end logic block are registered as a size of the file system in the file system request table (step 6330), and a request for creating a file system is sent to the file system interface program 5601 (step 6335) and the process ends.

Further, when the request for "deletion" is sent from the file system ("deletion" as shown in the step 6315), "Unuse" is set to the use statuses of logic blocks from start logic block to the end logic block in a logic area for deleting a file system in the master table (step 6340), and a request for deleting the file system is sent to the file system interface program (step 6345), and the process ends.

Figure 65:
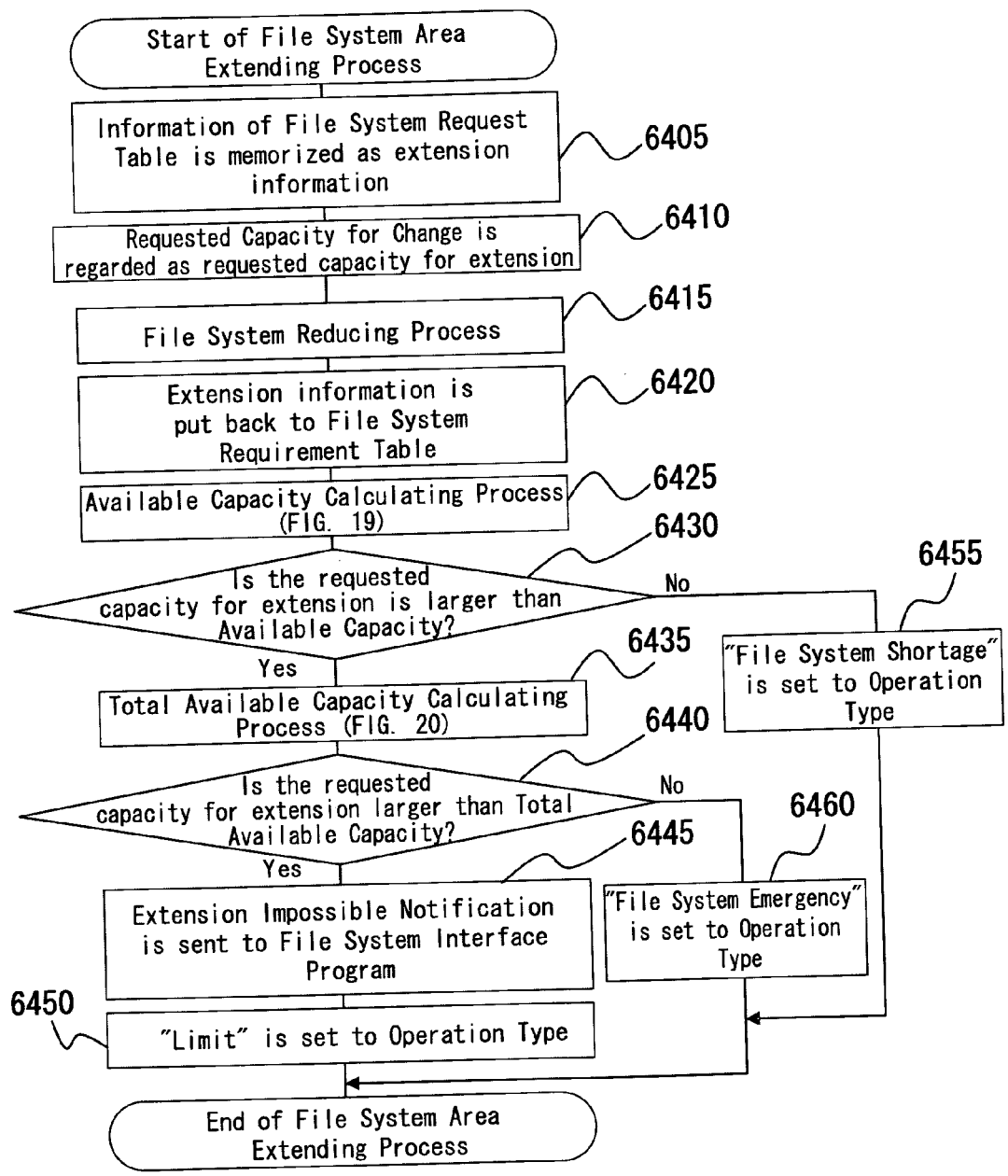
FIG. 65 is a flow chart showing a file system area extending process.

FIG. 65 is a flow chart showing a file system area extending process in the step 6320. First, information of the file system request table is memorized as extension information in a free space of the memory to be saved temporarily save (step 6405). Next, a requested capacity for change of the file system request table is given as a requested capacity for extension (step 6410) and a file system reducing process is executed (FIG. 66) (step 6415). The file system reducing process is a process for creating released areas in logic areas other than those to be extended. When the file system reducing process ends, the extension information which has been saved in the memory is set back to the file system request table (step 6420) and an available capacity calculating process is executed (FIG. 19) (step 6425). As already described in FIG. 19, the available capacity calculating process is a process for calculating available capacity of unused areas in logic areas. The thus calculated available capacity is compared with the requested capacity for extension. When the requested capacity for extension is larger than the available capacity (Yes in the step 6430), a total available capacity calculating process (FIG. 20) is executed (step 6435). The total available capacity calculating process is a process to unmirror all logic areas below the upper-limit level and calculate the capacity of logic area acquired from the unmirrored logic areas. The thus acquired total available capacity is compared with the requested capacity for extension. When the requested capacity for extension is larger than the total available capacity (Yes in the step 6440), "extension impossible" is notified to the file system interface program (step 6445) and a value of "limit" is set to the operation type of the master table (step 6450) and the process ends. When the requested capacity for extension is equal to or smaller than the available capacity (No in the step 6430), a value of "file system shortage" is set to the operation type of the master table (step 6455) and the process ends. When the requested capacity for extension is equal to or smaller than the total available capacity (No in the step 6440), a value of "file system emergency" is set to the operation type of the master table (step 6460) and the process ends.

Figure 66:
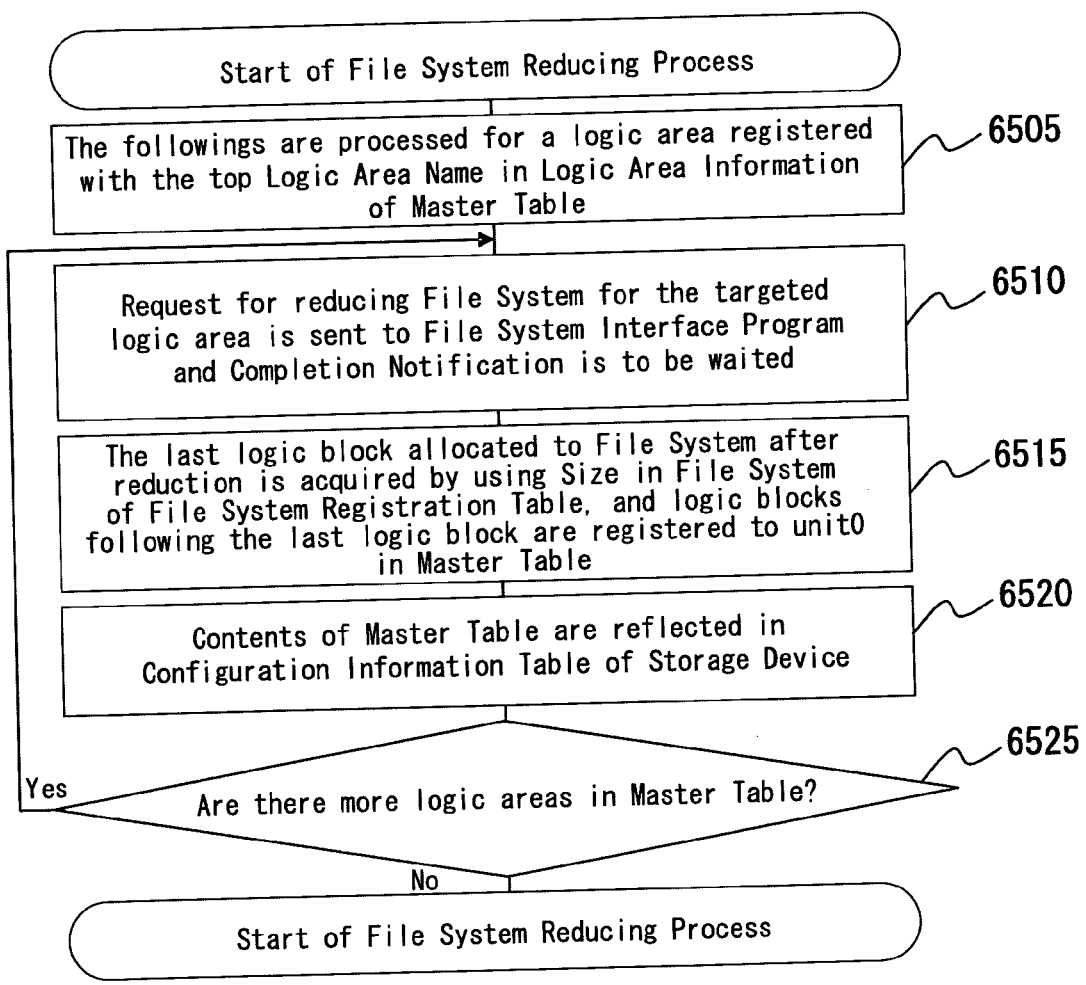
FIG. 66 is a flow chart showing a file system reducing process.

FIG. 66 is a flow chart showing a file system reducing process in the step 6415. The file system reducing process is a process for reducing a file system and then registering logic blocks which are not allocated to the file system from logic blocks constituting each logic area registered in the master table, to Unit 0. The thus acquired logic blocks are regarded as available logic blocks for extension. First, a logic area with a name registered on the top of the logic area names of the logic area information in the master table is specified (step 6505). A request for reducing a file system on the specified logic area is sent to the file system interface program (step 6510). On receipt of completion notification of the file system interface program, the last logic block allocated to the file system after reduction is determined from a size of the file system of the file system registration table, and subsequent logic blocks are registered in Unit 0 in the master table (step 6515). Next, the contents of the master table are reflected in the configuration information table of the storage device (step 6520). It is judged whether any more logic area other than Unit 0 is registered in the master table (step 6525). If it is registered (step 6525), the logic area is processed from the step 6510 to the step 6520 as the specified logic area. When no more logic area other than the unit 0 is registered in the master table (No in the step 6525), the process ends.

Figure 67:
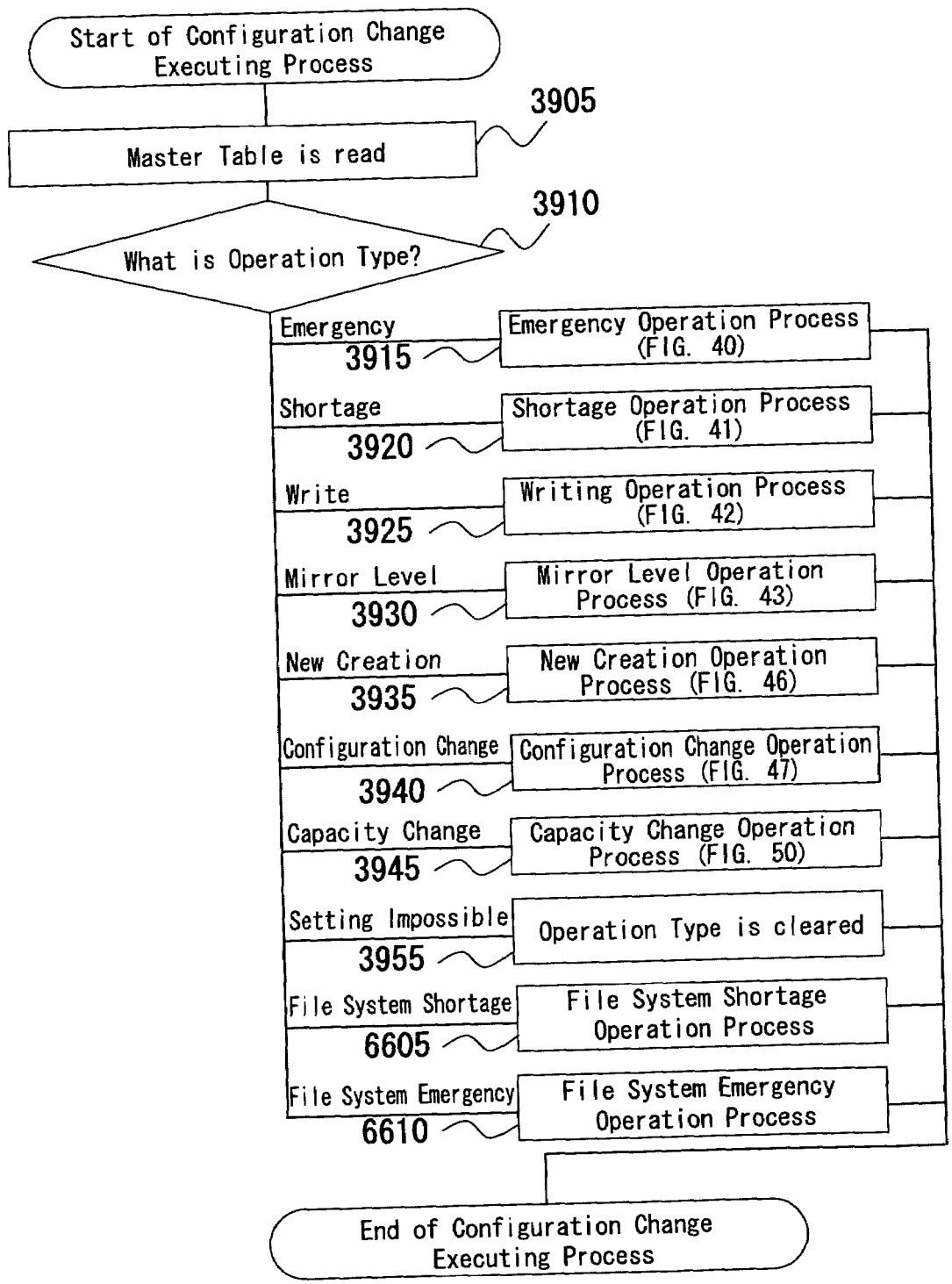
FIG. 67 is a flow chart showing a configuration change executing process.

FIG. 67 is a flow chart showing a configuration change executing process in the step 1520. The flow chart is different from that shown in FIG. 39 for a file system shortage operation process (step 6605) executed when the operation type of the master table is "file system shortage" and a file system emergency operation process (step 6610) executed when the operation type is "file system emergency" are added.

Figure 68:
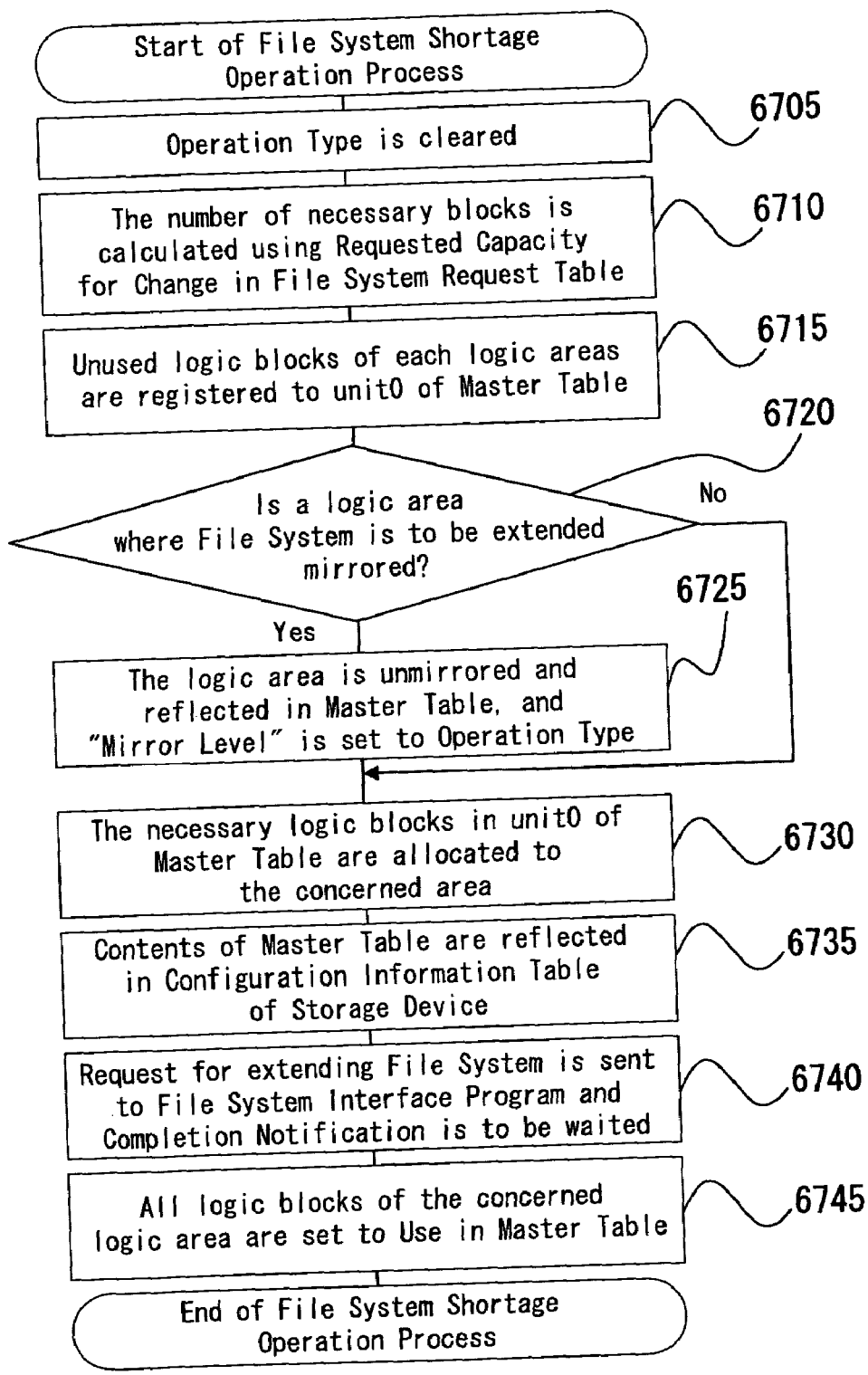
FIG. 68 is a flow chart showing a file system shortage operation process.

FIG. 68 is a flow chart showing a file system shortage operation process in the step 6605. First, the operation type in the master table is cleared (step 5 6705), and the number of necessary blocks is calculated from the requested capacity for change of the file system request table (step 6710). Since a capacity of each logic block is predetermined, for example, the requested capacity for extension can be divided by the capacity of the logic block to obtain the number of necessary blocks. Unused logic blocks in each logic area are registered in Unit 0 of the master table (step 6715), and it is judged whether a logic area having a file system to be extended is mirrored (step 6720). When the logic area having the file system to be extended is mirrored (Yes in the step 6720), the logic area is unmirrored and the unmirrored logic area is reflected in the master table, and the value of "mirror level" is set to the operation type (step 6725). When a logic area having a file system to be extended is not mirrored (No in the step 6720) or after a value of "mirror level" is set to the operation type of the master table, the necessary number of blocks allocated to Unit 0 of the master table are allocated to the concerned logic area (step 6730). Next, the contents of the master table are reflected in the configuration information table of the storage device (step 6735) and a request for extending the file system is sent to the file system interface program (step 6740). On receipt of the extension completion notification from the file system interface program, use statuses of all logic blocks in the concerned logic area of the master table are set to Use, which indicates that the logic block is in-use (step 6745), and then the process ends.

Figure 69:
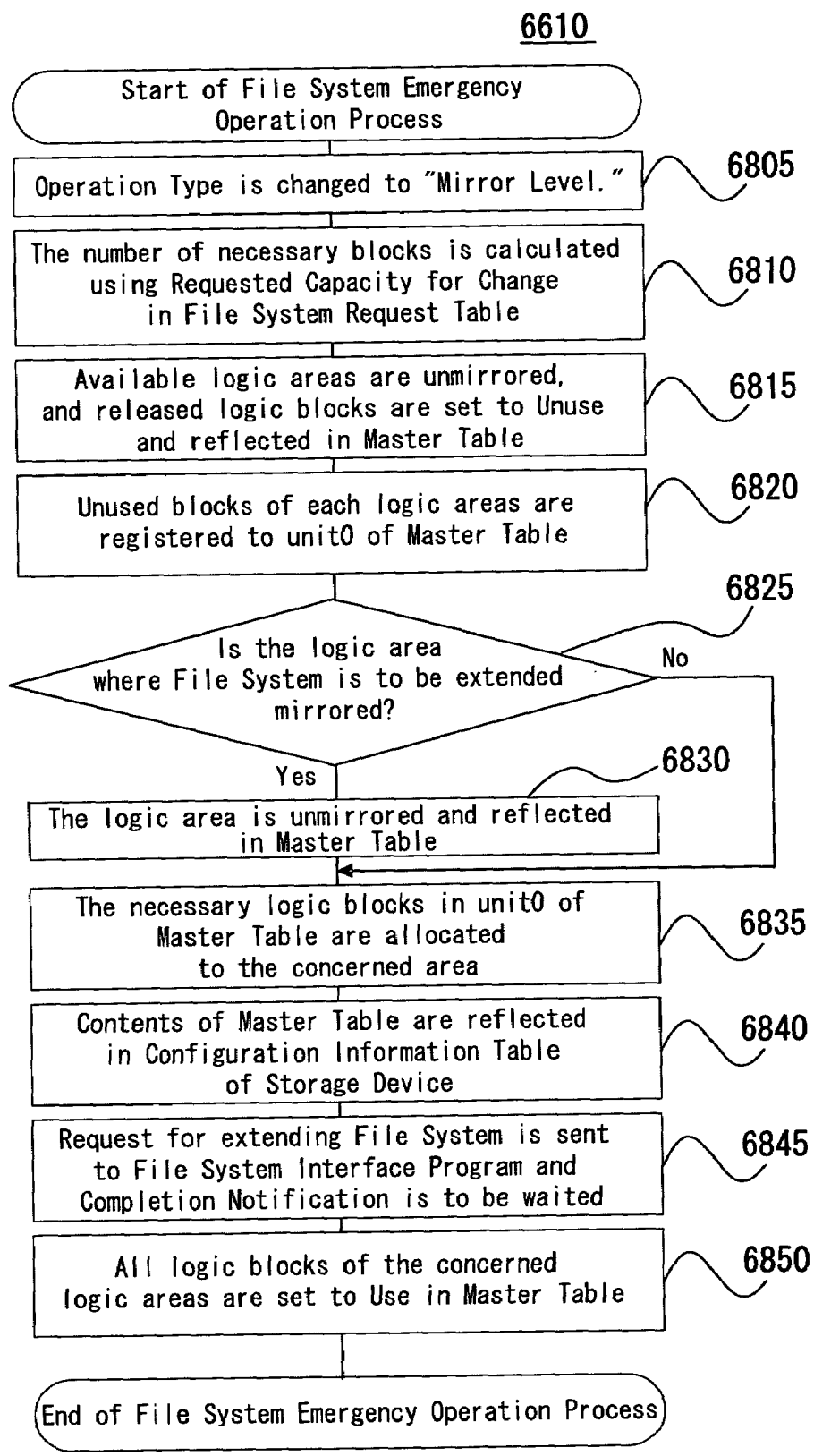
FIG. 69 is a flow chart showing a file system emergency operation process.

FIG. 69 is a flow chart showing a file system emergency operation process in the step 6610. First, operation type of the master table is changed to a value of "mirror level" (step 6805) and the number of necessary blocks is calculated from the requested capacity for change of the file system request table (step 6810). Since a capacity of each logic block is predetermined, the requested capacity for extension can be divided by the capacity of the logic block to obtain the number of necessary blocks. Then, the available logic areas are unmirrored, use statuses of logic blocks in the unmirrored logic areas of the master table are set to "Unuse", which indicates that the logic block is not used (step 6815), and logic blocks with use statuses of Unuse in each logic area are registered in Unit 0 of the master table (step 6820). Next, it is judged whether a logic area having a file system to be extended is mirrored. When the logic area having the file system to be extended is mirrored (Yes in the step 6825), the logic area is unmirrored and the unmirrored logic area is reflected in the master table (step 6830). After the logic area is unmirrored and the unmirrored logic area is reflected in the master table (step 6530) or when a logic area having a file system to be extended is not mirrored (No in the step 6825), the necessary number of logic blocks of Unit 0 in the master table are allocated to the concerned logic area (step 6835). Next, the contents of the master table are reflected in the configuration information table of the storage device (step 6840) and a request for extending the file system is sent to the file system interface program (step 6845). On receipt of completion notification from the file system interface program, use statuses of all logic blocks in the concerned logic area are set to "Use" indicating that the logic block is in-use in the master table (step 6850), and the process ends.

The present invention shall not be restricted to the present embodiment described above. Hardware configurations such as the management server, data structure and flow of processes may be changed in configuration, as long as they do not deviate from the scope and spirit of the present invention.

According to the present invention, it is able to automatically change the configuration of storage areas so as to prevent a shortage of the storage capacity, thereby providing a smooth process.

While the described embodiments represent the preferred forms of the present invention, it is to be distinctly understood that the invention is not limited thereto but may be otherwise variously embodied within the spirit and scope of the following claims.

What is claimed is:

1. A volume management system comprising a storage device which has a plurality of logic areas, a computer which requests processes to the storage device, and a management server which communicates with the storage device and the computer, wherein the management server comprises a memory and a processor, the memory stores an area level indicative of released or unreleased, a priority level indicative of a priority for establishing a redundancy, a use status indicative of used or unused, and a state indicative of presence or absence of redundancies, for each of the plurality of logic areas of the storage device, and wherein when there is a logic area whose capacity is insufficient among the plurality of logic areas of the storage device, the processor of the management server determines availability of one or more released logic areas among the plurality of other logic areas of the storage device by referring to the area levels indicative of released or unreleased in the memory, when there are the one or more released logic areas, the processor allocates capacities of the one or more released logic areas to the logic area whose capacity is insufficient, when there are not enough capacities of the one or more released logic areas, the processor determines availability of one or more other unused logic areas by referring to the use statuses indicative of used or unused in the memory, when there are the one or more other unused logic areas, the processor allocates unused capacities of each of the one or more other unused logic areas to the logic area whose capacity is insufficient, and when there are not enough unused capacities of, the processor specifies one or more other logic areas whose priority levels are below a predetermined upper-limit level of the priority level indicative of a priority for establishing a redundancy by referring to the priority levels and the states indicative of presence or absence of redundancies in the memory, releases redundancies of the one or more other logic areas whose priority levels are below the predetermined upper-limit level of the priority level, and allocates released capacities of the one or more other logic areas whose priority levels are below the predetermined upper-limit level of the priority level, to the logic area whose capacity is insufficient.

2. A volume management system comprising a storage device which has a plurality of logic areas, a computer which requests processes to the storage device, and a management server which communicates with the storage device and the computer, wherein the management server comprises a memory and a processor, the memory stores an upper-limit level of a priority level indicative of a priority for establishing a redundancy, and a state indicative of presence or absence of redundancies for each of the plurality of logic areas of the storage device, and wherein when there is a logic area whose capacity is insufficient among the plurality of logic areas of the storage device, the processor of the management server specifies one or more other logic areas whose priority levels are below a predetermined upper-limit level of the priority level indicative of a priority for establishing a redundancy by referring to the priority levels and the states indicative of presence or absence of redundancies in the memory, releases redundancies of the one or more other logic areas whose priority levels are below the predetermined upper-limit level of the priority level, and allocates released capacities of the one or more other logic areas whose priority levels are below the predetermined upper-limit level of the priority level, to the logic area whose capacity is insufficient.

3. A volume management system comprising a storage device which has a plurality of logic areas consists of one or more physical disks, a computer which requests processes to the storage device, and a management server which communicates with the storage device and the computer, wherein the management server comprises a memory and a processor, the memory stores a lifetime for each of the one or more physical disks and an upper-limit level of a priority level indicative of priority for establishing a redundancy, and wherein, the processor of the management server establishes redundancies for one or more logic areas whose priority levels are below the upper-limit level and which correspond to a physical disk which has been used for time exceeding the lifetime, and the processor allocates capacities of the one or more logic areas for which redundancies are established, to logic areas which correspond to a physical disk which has been used for time not exceeding the lifetime, after the physical disk which has been used for time exceeding the lifetime is removed.

4. A volume management method for use in a computer system including a storage device which has a plurality of logic volume areas which each are a sub-volume of the storage device, a computer which requests processes to the storage device, and a management service which communicates with the storage device and the computer, wherein the management server including a memory and a processor, the memory storing an area level indicative of released or unreleased, a priority level indicative of a priority for establishing a redundancy, a use status indicative of used or unused, a state indicative of presence or absence of redundancies, and an activity ration indicative of a ratio of an used capacity to a whole capacity of each of the plurality of logic volume areas, for each of the plurality of logic volume areas of the storage device, the volume management method comprising:

when there is a logic volume area whose capacity is insufficient among the plurality of logic volume areas of the storage device, determining whether a logic volume area has unused capacities based on its activity ratio stored in the memory; and calculating an unused capacity of each logic volume area having unused capacities based on its activity ratio stored in the memory;

when there are one or more logic volume areas having unused capacity, allocating at least a portion of the unused capacity of at least one logic volume area having the unused capacity, to the logic volume area whose capacity is insufficient;

when there is a logic volume area whose capacity is insufficient among the plurality of logic volume areas of the storage device, specifying one or more other logic volume areas whose priority levels are below a predetermined upper-limit level of the priority level indicative of a priority for establishing a redundancy by referring to an upper-limit level of the priority level indicative of the priority for establishing a redundancy and the states indicative of presence or absence of redundancies stored for each of the plurality of logic volume areas of the storage device in the memory;

releasing redundancies of the one or more other logic volume areas whose priority levels are below the predetermined upper-limit level of the priority level; and allocating released capacities of the one or more other logic volume areas whose priority levels are below the predetermined upper-limit level of the priority level, to the logic volume area whose capacity is insufficient.

5. A volume management method according to claim 4 comprising:

allocating unused capacities of one or more unused blocks of each logic volume area having unused capacity by referring to use statuses stored for each of predetermined blocks of each of the plurality of logic volume areas in the memory.

6. A volume management method according to claim 4 comprising:
estimating a necessary capacity of the logic volume area whose capacity is insufficient, based on change of the activity ratio indicated by a history of the activity ratio in which the activity ratio is stored for a predetermined number of times for each of the plurality of logic volume areas in the memory; and allocating the estimated capacity to the logic volume area whose capacity is insufficient.

7. A volume management method according to claim 4 comprising:
calculating an unused capacity of each logic volume area having unused capacity based on an overlapping multiplicity of redundancy by referring to a state indicative of presence or absence of redundancies.

8. A volume management method for use in a computer system including a storage device which has a plurality of logic volume areas which each are a sub-volume of the storage device, where the plurality of logic volume areas consisting of one or more physical disks in the storage device, a computer which request processes to the storage device, and a management server which communicates with the storage device and the computer, wherein
the management server including a memory and a processor, the memory storing an area level indicative of released or unreleased, a priority level indicative of a priority for establishing a redundancy, a use status indicative of used or unused, a state indicative of presence or absence of redundancies, and an activity ratio indicative of a ratio of an used capacity to a whole capacity of each of the plurality of logic volumes, for each of the plurality of logic volume areas of the storage device, the volume management method comprising:
when there is a logic volume area whose capacity is insufficient among the plurality of logic volume areas of the storage device, determining whether a logic volume area has unused capacity based on its activity ratio stored in the memory; and calculating an unused capacity of each logic volume area having unused capacity based on its activity ratio stored in the memory;
when there are one or more logic volume areas having unused capacities, allocating at least a portion of the unused capacity of at least one logic volume area having the unused capacities, to the logic volume area whose capacity is insufficient;
providing redundancies established logic volume areas by establishing redundancies for logic volume areas whose priority levels are below the upper-limit level and which correspond to a physical disk which has been used for time exceeding a lifetime stored for each of the one or more physical disks in the memory; and
allocating capacities of the redundancies established logic volume areas for which redundancies are established, to logical volume areas which correspond to a physical disk which has been used for time not exceeding the lifetime, after the physical disk which has been used for time exceeding the lifetime is removed.

9. A volume management method according to claim 8, comprising allocating unused capacities of one or more unused blocks of each logic volume area having unused capacity, by referring to use statuses stored for each of predetermined blocks of each of the plurality of logic volume areas in the memory.

10. A volume management method according to claim 8, comprising: estimating a necessary capacity of the logic volume area whose capacity is insufficient, based on change of the activity ratio indicated by a history of the activity ratio in which the activity ratio is stored for a predetermined number of times for each of the plurality of logic volume areas in the memory; and
allocating the estimated capacity to the logic volume area whose capacity is insufficient.

11. A volume management method according to claim 8, comprising: calculating an unused capacity of each logic volume area having unused capacity based on an overlapping multiplicity of redundancy by referring to a state indicative of presence or absence of redundancies.

* * * * *